United States Patent
Okada

(10) Patent No.: US 10,562,814 B2
(45) Date of Patent: Feb. 18, 2020

(54) BARE OPTICAL FIBER COATING DEVICE AND BARE OPTICAL FIBER COATING METHOD

(71) Applicant: FUJIKURA LTD., Koto-ku, Tokyo (JP)

(72) Inventor: Kenji Okada, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 767 days.

(21) Appl. No.: 14/958,178

(22) Filed: Dec. 3, 2015

(65) Prior Publication Data

US 2016/0083293 A1 Mar. 24, 2016

Related U.S. Application Data

(63) Continuation of application No. PCT/JP2014/065008, filed on Jun. 5, 2014.

(30) Foreign Application Priority Data

Jun. 7, 2013 (JP) .................................. 2013-121051

(51) Int. Cl.
*C03C 25/10* (2018.01)
*B05D 5/06* (2006.01)
(Continued)

(52) U.S. Cl.
CPC .............. *C03C 25/10* (2013.01); *B05C 3/125* (2013.01); *B05D 5/06* (2013.01); *C03C 25/1065* (2013.01);
(Continued)

(58) Field of Classification Search
CPC ..... C03C 25/10; C03C 25/1065; C03C 25/18; C03C 25/12; G02B 6/02395; B05C 3/125;
(Continued)

(56) References Cited

U.S. PATENT DOCUMENTS

| | | | | |
|---|---|---|---|---|
| 4,510,884 A | * | 4/1985 | Rosebrooks | ............ C03C 25/18 118/405 |
| 5,160,541 A | * | 11/1992 | Fickling | ................ B29C 47/128 118/405 |
| 5,976,611 A | * | 11/1999 | Okuno | ..................... C03C 25/18 118/405 |
| 6,284,046 B1 | | 9/2001 | Orita et al. | |
| 2002/0166345 A1 | | 11/2002 | Naka et al. | |

FOREIGN PATENT DOCUMENTS

| EP | 1 043 283 A1 | 10/2000 |
|---|---|---|
| JP | 09-086971 A | 3/1997 |

(Continued)

OTHER PUBLICATIONS

Communication dated Feb. 4, 2017, from the State Intellectual Property Office of the P.R.C. in counterpart Chinese application No. 201480031619.7.

(Continued)

*Primary Examiner* — Laura Edwards
(74) *Attorney, Agent, or Firm* — Sughrue Mion, PLLC

(57) ABSTRACT

A bare optical fiber coating device includes: a nipple having a nipple hole through which a bare optical fiber is inserted vertically from above; an intermediate die that has an intermediate die hole through which the bare optical fiber passing through the nipple hole is inserted and that is disposed vertically below the nipple; a first coating die that has a first coating die hole through which the bare optical fiber passing through the intermediate die hole is inserted and that is provided vertically below the intermediate die; and a first resin circulation chamber that is formed by the nipple and the intermediate die, is formed between the nipple hole and the intermediate die hole in an annular shape surrounding the bare optical fiber passing through the nipple hole, and is configured to circulate liquid resin.

28 Claims, 19 Drawing Sheets

(51) Int. Cl.
- *B05C 3/12* (2006.01)
- *G02B 6/02* (2006.01)
- *C03C 25/12* (2006.01)
- *C03C 25/1065* (2018.01)
- *B29C 48/154* (2019.01)
- *B29C 48/18* (2019.01)

(52) U.S. Cl.
CPC .......... *C03C 25/12* (2013.01); *G02B 6/02395* (2013.01); *B29C 48/154* (2019.02); *B29C 48/18* (2019.02)

(58) Field of Classification Search
CPC ....... Y10S 118/18; B05D 5/06; B29C 48/154; B29C 48/18; B29C 48/21; B29C 48/304; B29C 48/34; D01D 5/34
USPC .............. 118/411, 412, 410, 420; 427/163.2, 427/434.2, 434.6, 434.7, 443.2
See application file for complete search history.

FOREIGN PATENT DOCUMENTS

| | | |
|---|---|---|
| JP | 09-132437 A | 5/1997 |
| JP | 09-241042 A | 9/1997 |
| JP | 09-255372 A | 9/1997 |
| JP | 11-060288 A | 3/1999 |
| JP | 3238105 B2 | 12/2001 |
| JP | 2002-274894 A | 9/2002 |
| JP | 2003-002698 A | 1/2003 |
| WO | 99/32415 A1 | 7/1999 |

OTHER PUBLICATIONS

Notice of Allowance dated May 24, 2016 from the Japanese Patent Office issued in corresponding Application No. 2015-521495.

* cited by examiner

AMOUNT OF ECCENTRICITY: Ec=(Lmax -Lmin)/2

PRIOR ART

PRIOR ART

BARE OPTICAL FIBER COATING DEVICE AND BARE OPTICAL FIBER COATING METHOD

CROSS REFERENCE TO RELATED APPLICATIONS

This application is a continuation application based on a PCT Patent Application No. PCT/JP2014/065008, filed Jun. 5, 2014, whose priority is claimed on Japanese Patent Application No. 2013-121051, filed on Jun. 7, 2013.

BACKGROUND OF THE INVENTION

Field of the Invention

The present invention relates to a coating device for manufacturing an optical fiber by applying a resin as a protective coating layer on a bare optical fiber and a method of manufacturing an optical fiber using the coating device, and in particular, to a coating device suitable for applying a resin on the bare optical fiber at a high drawing speed (for example, 2000 m/min or more) and a bare optical fiber coating method using the same.

Description of the Related Art

As is well known, in the manufacture of the optical fiber, resin is applied as a protective coating layer on the surface of the bare optical fiber drawn from the optical fiber preform. In this case, there is a case of applying one-layer resin on the surface of the bare optical fiber and a case of applying two-layer resin on the surface of the bare optical fiber. In recent years, two-layer coating has been adopted in many cases. In the two-layer coating, generally, a first layer (primary layer) using a material with a low Young's modulus is provided on the surface of the bare optical fiber, and a second layer (secondary layer) using a material with a high Young's modulus is provided on the outer side of the first layer.

As a method of applying the two-layer coating, there is a wet on dry coating in which the resin of the primary layer is applied and cured and then the resin of the secondary layer is applied and cured and a wet on wet coating in which the resin of the primary layer and the resin of the secondary layer are collectively applied and cured. Therefore, the independent coating method will be described first herein.

As an apparatus for manufacturing the optical fiber by performing the two-layer coating using the independent coating method, an apparatus shown in FIG. 23 has been widely used. An optical fiber manufacturing apparatus 10 is configured to include a drawing furnace 14, a cooling device 18, a first resin coating device (primary coating device) 20A, a first curing device 22A, a second resin coating device (secondary coating device) 20B, a second curing device 22B, a take-up device 26, and a winding device 27. The drawing furnace 14 heats and melts a preform (optical fiber preform) 12 formed of silica based glass or the like. The cooling device 18 cools a bare optical fiber 16 that is linearly pulled out (drawn) downward from the drawing furnace 14. The first resin coating device 20A coats the cooled bare optical fiber 16 with a resin for first protective coating (primary coating). The first curing device 22A is provided, as necessary, in order to cure the primary coating resin that has been applied by the first resin coating device 20A. The second resin coating device 20B performs coating with a resin for second protective coating (secondary coating). The second curing device 22B is provided, as necessary, in order to cure the secondary coating resin that has been applied by the second resin coating device 20B. The take-up device 26 takes up an optical fiber 24 having the secondary coating resin that has been cured. The winding device 27 winds the optical fiber for which coating has been completed.

When manufacturing the optical fiber using such an optical fiber manufacturing apparatus, the optical fiber preform 12 that is a source of the bare optical fiber 16 is inserted into the drawing furnace 14, and the optical fiber preform 12 is softened and melted by being heated to the temperature of 2000° C. or higher in the drawing furnace 14. Then, the bare optical fiber 16 is pulled out (drawn) downward from the bottom of the drawing furnace 14 while extending the optical fiber preform in a high-temperature state, and the bare optical fiber 16 is cooled to a temperature, at which resin coating is possible, by the cooling device 18. The bare optical fiber 16 has a wire diameter of 125 μm, for example. Then, the bare optical fiber 16 cooled to the required temperature is coated with a primary coating resin by the first resin coating device 20A, and the primary layer is cured by the first curing device 22A. Then, a secondary coating resin is applied on the outer side of the primary layer by the second resin coating device 20B, and the secondary layer is cured by the second curing device. Then, the optical fiber 24 that has been subjected to the two-layer coating is wound on the winding device 27 through the take-up device 26. As the primary coating resin and the secondary coating resin, urethane acrylate based ultraviolet curable resin, silicon based thermoplastic resin, and the like are used. The viscosity of each resin in a liquid state is approximately 0.1 Pa·s to 5 Pa·s at the temperature during the coating.

On the other hand, as an apparatus for manufacturing the optical fiber by performing two-layer coating using the collective coating method, an apparatus shown in FIG. 24 has been widely used.

In this case, one resin coating device 20C capable of performing simultaneous coating of the resin for first protective coating (primary coating) and the resin for second protective coating (secondary coating) is provided for the resin coating. In addition, in order to cure the primary coating resin and the secondary coating resin that have been applied by the resin coating device 20C, one curing device 22C is provided as necessary. The configuration other than these is the same as that of the apparatus shown in FIG. 23, and the same reference numerals are given to the same components as the components shown in FIG. 23.

When manufacturing the optical fiber using the optical fiber manufacturing apparatus shown in FIG. 24, the optical fiber preform 12 is softened and melted by being heated to the temperature of 2000° C. or higher in the drawing furnace 14, in the same manner as described in FIG. 23. Then, the bare optical fiber 16 pulled out from the bottom of the drawing furnace 14 is cooled by the cooling device 18. Then, the bare optical fiber 16 cooled to the required temperature is coated with the primary coating resin and the secondary coating resin by the resin coating device 20C, and the primary layer and the secondary layer are simultaneously cured by the curing device 22C. Then, the optical fiber 24 that has been subjected to the two-layer coating is wound on the winding device 27 through the take-up device 26.

Incidentally, in recent years, in the optical fiber manufacturing process, in order to improve productivity, the drawing speed when manufacturing the optical fiber is set to be significantly higher than that in the related art. Due to the increase in the drawing speed, a coating quality problem is likely to occur when manufacturing the optical fiber by coating the bare optical fiber with a resin. For example, a protective coating layer has an uneven thickness (coating thickness in the circumferential direction in the cross-section of the optical fiber becomes uneven), or variations in thickness deviation in the longitudinal direction of the optical fiber occur, or the outer diameter of the optical fiber after coating becomes uneven (coating thickness in the longitudinal direction of the optical fiber becomes uneven). Therefore, for the resin coating process, various improvements have been conventionally attempted (for example, JAPANESE UNEXAMINED PATENT APPLICATION, FIRST PUBLICATION NO. H9-132437, JAPANESE UNEXAMINED PATENT APPLICATION, FIRST PUBLICATION NO. H9-255372, and JAPANESE PATENT (GRANTED) PUBLICATION NO. 3238105).

JAPANESE UNEXAMINED PATENT APPLICATION, FIRST PUBLICATION NO. H9-132437 discloses making improvements in the coating device in order to make the thickness uniform while sufficiently ensuring the thickness of the coating resin. That is, JAPANESE UNEXAMINED PATENT APPLICATION, FIRST PUBLICATION NO. H9-132437 discloses that, in order to obtain the improved coating quality of the optical fiber even if resin coating is performed at a high drawing speed in a state in which there is slight eccentricity or a slight inclination in a nozzle (die), a plurality (for example, two) of nozzles (dies) are used in the coating device, these nozzles have the same axis, and any (one in the case of two nozzles) of these nozzles has a tapered shape. In addition, for the hole diameters of these nozzles, an optimal relationship therebetween has been derived. In addition, it is disclosed that, by making the coating thickness based on the coating through a die having a tapered portion as small as possible and holding the first and second nozzles coaxially, disturbances due to abnormalities, such as the eccentricity of the tapered portion, are reduced and accordingly the coating resin is applied with a uniform thickness overall.

JAPANESE UNEXAMINED PATENT APPLICATION, FIRST PUBLICATION NO. H9-255372 discloses a coating device for optical fibers that can apply a resin while preventing the occurrence of thickness deviation even if there is slight unevenness in the flow of resin toward the optical fiber in the coating die. That is, in JAPANESE UNEXAMINED PATENT APPLICATION, FIRST PUBLICATION NO. H9-255372, a fiber alignment die is provided between a nipple and the next coating die, a resin supply passage for an alignment die is formed between the nipple and the fiber alignment die, and resin is supplied from the resin supply passage for an alignment die into the die hole of the next coating die through the die hole of the fiber alignment die. Through such a configuration, resin is supplied to the center of the die hole of the coating die from the die hole of the fiber alignment die immediately above the die hole of the coating die. Therefore, it is disclosed that the flow of resin in the circumferential direction of the optical fiber is made to be almost uniform in the die hole of the fiber alignment die. By adopting such a structure, the flow of resin in a merging portion (meniscus) between the optical fiber and the resin and the circulation flow of resin in the tapered portion of the die hole of the coating die can be separated from each other by the fiber alignment die. Accordingly, it is possible to prevent the interference between the upper and lower resin flows. Therefore, it is disclosed that, even if there is slight unevenness in the flow of resin in the die hole of the coating die, the unevenness is canceled, and accordingly, it is possible to apply the resin while preventing the occurrence of thickness deviation.

Additionally, JAPANESE PATENT (GRANTED) PUBLICATION NO. 3238105 discloses making improvements in a method of coating the optical fiber with a resin and a resin coating device for an optical fiber so that it is possible to apply the resin uniformly at high speed. That is, in JAPANESE PATENT (GRANTED) PUBLICATION NO. 3238105, there are provided at least a terminal side coating die having a die hole formed by a tapered hole portion and a land portion, a nipple having a nipple hole, and an intermediate side coating die provided between the coating die and the nipple and having a die hole formed by only a land portion. The terminal side coating die, the intermediate side coating die, and the nipple are provided so as to coaxially overlap each other. The hole diameter of the land portion of the intermediate side coating die is set to be smaller than the inlet diameter of the tapered hole portion. In the combined body thereof, an annular resin reservoir chamber is provided concentrically for the nipple hole. In this state, a resin is applied on the optical fiber while a portion of the resin on the inlet side of the tapered hole portion of the terminal side coating die is returned to the resin reservoir chamber through a resin path provided between the intermediate side coating die and the terminal side coating die.

In this manner, at the time of coating at a high drawing speed, it is possible to suppress the disturbance of the circulation flow in the coating die and to stabilize the meniscus formed in the nipple hole exit. As a result, it is disclosed that it is possible to apply the resin uniformly even at high speed.

The above techniques that have been conventionally proposed have the following points in common.

The intermediate die is provided between the nipple and the coating die.

The hole shapes and hole diameters of the coating die and the intermediate die are optimized.

Resin flows in the resin path between the nipple and the intermediate die (hereinafter, referred to as a "first resin path") and the resin path between the intermediate die and the coating die (hereinafter, referred to as a "second resin path") are improved to stabilize the resin flow, in particular, the circulation flow, in each place.

As described above, in order to prevent the occurrence of problems, such as thickness deviation of the resin coating layer, even at the high drawing speed, improvements in the resin coating device (coating device) have also been made in the conventional techniques disclosed in PTLs 1 to 3. In practice, however, it has been difficult to prevent the occurrence of the problems, such as thickness deviation, at the high drawing speed using the conventional techniques.

That is, in the techniques disclosed in PTLs 1 and 2, it has been difficult in practice to control the resin flow in the first and second resin paths in many cases. In the technique disclosed in JAPANESE PATENT (GRANTED) PUBLICATION NO. 3238105, resin should be returned to the resin reservoir in the second resin path. However, there is a high possibility that the resin will not be returned to the resin reservoir uniformly due to a relationship, such as a pressure difference. In addition, a resin flow difference (difference in the flow rate or the amount of flow) in the circumferential direction in a merging portion of the resin flows in the first and second resin paths and the circulation flows generated in the intermediate die hole and the coating die hole may disturb the circulation flow in the die hole. Due to these influences, especially at the time of high drawing speed, the circulation flow of the resin in the coating die hole that is the most important consideration at the time of resin coating is disturbed and the resin flow becomes unstable and uneven, and accordingly, the resin coating thickness becomes uneven. As a result, problems, such as thickness deviation, variations in thickness deviation in the longitudinal direction of the optical fiber, or non-uniform coating diameter, were likely to occur.

The present invention has been made in view of the situation described above, and it is an object of the present invention to provide a resin coating device and a resin coating method that do not cause the thickness deviation of a coating layer, variations in thickness deviation in the longitudinal direction of the optical fiber, or variations in the fiber diameter even when the bare optical fiber is inserted into the coating device at high speed, that is, even when the bare optical fiber is coated at a high drawing speed.

SUMMARY

In order to achieve the aforementioned object, the present invention provides the followings.

A bare optical fiber coating device according to a first aspect of the present invention includes: a nipple having a nipple hole through which a bare optical fiber is inserted vertically from above; an intermediate die that has an intermediate die hole through which the bare optical fiber passing through the nipple hole is inserted and that is disposed vertically below the nipple; a first coating die that has a first coating die hole through which the bare optical fiber passing through the intermediate die hole is inserted and that is provided vertically below the intermediate die; a first resin circulation chamber that includes the nipple and the intermediate die, is formed between the nipple hole and the intermediate die hole in an annular shape surrounding the bare optical fiber passing through the nipple hole, and is configured to circulate liquid resin; a second resin circulation chamber that includes the intermediate die and the first coating die, is formed between the intermediate die hole and the first coating die hole in an annular shape surrounding the bare optical fiber passing through the intermediate die hole, and is configured to circulate the liquid resin; a first resin supply passage configured to supply the liquid resin to the first resin circulation chamber; and a second resin supply passage configured to supply the liquid resin to the second resin circulation chamber. The first and second resin supply passages are provided separately and independently, and a first resin path from the first resin supply passage to the intermediate die hole through the first resin circulation chamber and a second resin path from the second resin supply passage to the first coating die hole through the second resin circulation chamber are formed independently of each other.

The bare optical fiber coating device may further include: a second coating die that has a second coating die hole through which the bare optical fiber passing through the first coating die hole is inserted and that is provided vertically below the first coating die; a third resin circulation chamber that includes the first coating die and the second coating die, is formed between the first coating die hole and the second coating die hole in an annular shape surrounding the bare optical fiber passing through the first coating die hole, and is configured to circulate the liquid resin; and a third resin supply passage configured to supply the liquid resin to the third resin circulation chamber. The first resin supply passage, the second resin supply passage, and the third resin supply passage may be provided separately and independently from each other, and the first resin path, the second resin path, and a third resin path from the third resin supply passage to the second coating die hole through the third resin circulation chamber may be formed independently of each other.

The bare optical fiber coating device may further include: a first resin reservoir chamber that is provided on an inlet side of the first resin supply passage and that has an annular shape with a center on a traveling position of the bare optical fiber; and a second resin reservoir chamber that is provided on an inlet side of the second resin supply passage and that has an annular shape with a center on the traveling position of the bare optical fiber. A resin inlet through which the liquid resin is introduced from an outside may be formed in each of the first and second resin reservoir chambers, and the first and second resin supply passages may be formed so as to be continuous in an annular shape with a center on the traveling position of the bare optical fiber.

The bare optical fiber coating device may further include: a first resin reservoir chamber that is provided on an inlet side of the first resin supply passage and that has an annular shape with a center on a traveling position of the bare optical fiber; a second resin reservoir chamber that is provided on an inlet side of the second resin supply passage and that has an annular shape with a center on the traveling position of the bare optical fiber; and a third resin reservoir chamber that is provided on an inlet side of the third resin supply passage and that has an annular shape with a center on the traveling position of the bare optical fiber. A resin inlet through which the liquid resin is introduced from an outside may be formed in each of the first resin reservoir chamber, the second resin reservoir chamber, and the third resin reservoir chamber. The first resin supply passage, the second resin supply passage, and the third resin supply passage may be formed so as to be continuous in an annular shape with a center on the traveling position of the bare optical fiber.

A length of the second resin circulation chamber along a traveling direction of the bare optical fiber may be greater than a length of the first resin circulation chamber along the traveling direction of the bare optical fiber.

The length of the first resin circulation chamber along the traveling direction of the bare optical fiber may be 1.5 mm to 10 mm, and the length of the second resin circulation chamber along the traveling direction of the bare optical fiber may be 20 mm to 40 mm.

A length of the third resin circulation chamber along the traveling direction of the bare optical fiber may be 1.0 mm to 2.0 mm.

In a plane perpendicular to a traveling direction of the bare optical fiber, an inner diameter of the first resin circulation chamber may be $\phi 5$ mm±$\phi 2$ mm, and an inner diameter of the second resin circulation chamber may be $\phi 3$ mm±$\phi 1$ mm.

In the plane perpendicular to the traveling direction of the bare optical fiber, an inner diameter of the third resin circulation chamber may be $\phi 15$ mm±$\phi 5$ mm.

Assuming that a hole diameter of an outlet in the nipple hole is $\phi dn$, a hole diameter of an outlet in the intermediate die hole is $\phi dm$, and a hole diameter of an outlet in the first coating die hole is $\phi dc$, the hole diameters may satisfy conditions of $\phi dn > \phi dc > \phi dm$.

Assuming that a hole diameter of an outlet in the nipple hole is $\phi dn$, a hole diameter of an outlet in the intermediate die hole is $\phi dm$, a hole diameter of an outlet in the first coating die hole is $\phi dp$, and a hole diameter of an outlet in the second coating die hole is $\phi ds$, the hole diameters may satisfy conditions of $\phi dn > \phi dc > \phi dm$ and $\phi ds > \phi dp > \phi dm$.

In each of the first and second resin supply passages, an inner size in a direction along a traveling direction of the bare optical fiber may be 0.5 mm±0.2 mm.

In each of the first resin supply passage, the second resin supply passage, and the third resin supply passage, an inner size in a direction along a traveling direction of the bare optical fiber may be 0.5 mm±0.2 mm.

A resin outlet to each of the resin circulation chambers in each of the resin supply passages may be located above each of the resin circulation chambers.

Pressure of the liquid resin supplied to the first resin circulation chamber may be equal to or higher than pressure of the liquid resin supplied to the second resin circulation chamber.

Assuming that the pressure of the liquid resin supplied to the first resin circulation chamber is P1 and the pressure of the liquid resin supplied to the second resin circulation chamber is P2, a resin pressure difference [P1−P2] may be within a range of 0.01 MPa±0.01 MPa.

When performing two-layer coating by forming a first resin coating layer on an outer surface of the bare optical fiber and forming a second resin coating layer on the first resin coating layer while making the bare optical fiber travel, the bare optical fiber coating device may be used as a coating device configured to form the first resin coating layer. A hole diameter of an outlet in the intermediate die hole may be within a range of 0.17 mm to 0.23 mm.

When performing two-layer coating by forming a first resin coating layer on an outer surface of the bare optical fiber and forming a second resin coating layer on the first resin coating layer while making the bare optical fiber travel, the bare optical fiber coating device may be used as a coating device configured to form the second resin coating layer. A hole diameter of an outlet in the intermediate die hole may be within a range of 0.25 mm to 0.27 mm.

When performing two-layer coating collectively by forming a first resin coating layer on an outer surface of the bare optical fiber and forming a second resin coating layer on the first resin coating layer while making the bare optical fiber travel, the bare optical fiber coating device may be used as a coating device configured to form the first and second resin coating layers. A hole diameter of an outlet in the intermediate die hole may be within a range of 0.17 mm to 0.23 mm.

A bare optical fiber coating method according to a second aspect of the present invention performs resin coating on a bare optical fiber using the bare optical fiber coating device described above. In addition, when performing resin coating on the bare optical fiber by making the bare optical fiber pass through the nipple hole, the first resin circulation chamber, the intermediate die hole, the second resin circulation chamber, and the first coating die hole in this order from a side above the nipple and by supplying the liquid resin to the first resin circulation chamber from the first resin supply passage so that the liquid resin in the first resin circulation chamber flows into the intermediate die hole and supplying the liquid resin to the second resin circulation chamber from the second resin supply passage so that the liquid resin in the second resin circulation chamber flows into the first coating die hole, a circulation flow of the liquid resin is caused in each of the first and second resin circulation chambers.

Only a single circulation flow may be caused in each of the first and second resin circulation chambers.

A bare optical fiber coating method according to a third aspect of the present invention performs resin coating on a bare optical fiber using the bare optical fiber coating device described above. In addition, when performing resin coating on the bare optical fiber by making the bare optical fiber pass through the nipple hole, the first resin circulation chamber, the intermediate die hole, the second resin circulation chamber, the first coating die hole, the third resin circulation chamber, and the second coating die hole in this order from a side above the nipple and by supplying the liquid resin to the first resin circulation chamber from the first resin supply passage so that the liquid resin in the first resin circulation chamber flows into the intermediate die hole, supplying the liquid resin to the second resin circulation chamber from the second resin supply passage so that the liquid resin in the second resin circulation chamber flows into the first coating die hole, and supplying the liquid resin to the third resin circulation chamber from the third resin supply passage so that the liquid resin in the third resin circulation chamber flows into the second coating die hole, a circulation flow of the resin is caused in each of the first resin circulation chamber, the second resin circulation chamber, and the third resin circulation chamber.

Only a single circulation flow may be caused in each of the first resin circulation chamber, the second resin circulation chamber, and the third resin circulation chambers.

According to the above aspects of the present invention, it is possible to minimize the thickness deviation of the coating layer, variations in thickness deviation in the longitudinal direction of the optical fiber, or variations in the fiber diameter even when the bare optical fiber is inserted into the coating device at high speed, that is, even when the bare optical fiber is coated at a high drawing speed.

DETAILED DESCRIPTION OF THE PREFERRED EMBODIMENTS

Hereinafter, the configuration of an embodiment of the present invention will be described with reference to the accompanying diagrams.

In the diagrams used in the following explanation, characteristic portions may be shown in an enlarged manner for the sake of convenience so that the features can be easily understood. Accordingly, the scale or the like of each component is not necessarily the same as the actual scale, and can be appropriately changed to be within a range that does not change the gist thereof.

FIGS. 1 to 5 show a coating device of a first embodiment of the present invention. The coating device of the first embodiment is a coating device configured to apply only a single layer of resin on the outer periphery of the bare optical fiber. FIGS. 1 to 5 show a first resin coating device (primary coating device) 20A in the case of performing two-layer coating using an independent coating method. However, this may also be used as a coating device configured to manufacture the optical fiber through the one-layer coating. In addition, this may also be applied as a second resin coating device 20B (secondary coating device) when manufacturing the optical fiber through the two-layer coating using the independent coating method (in the case of FIG. 23). When manufacturing the optical fiber through the two-layer coating, it is desirable that the second resin coating device (secondary coating device) 20B and the first resin coating device (primary coating device) 20A have substantially the same configuration.

Figure 1:
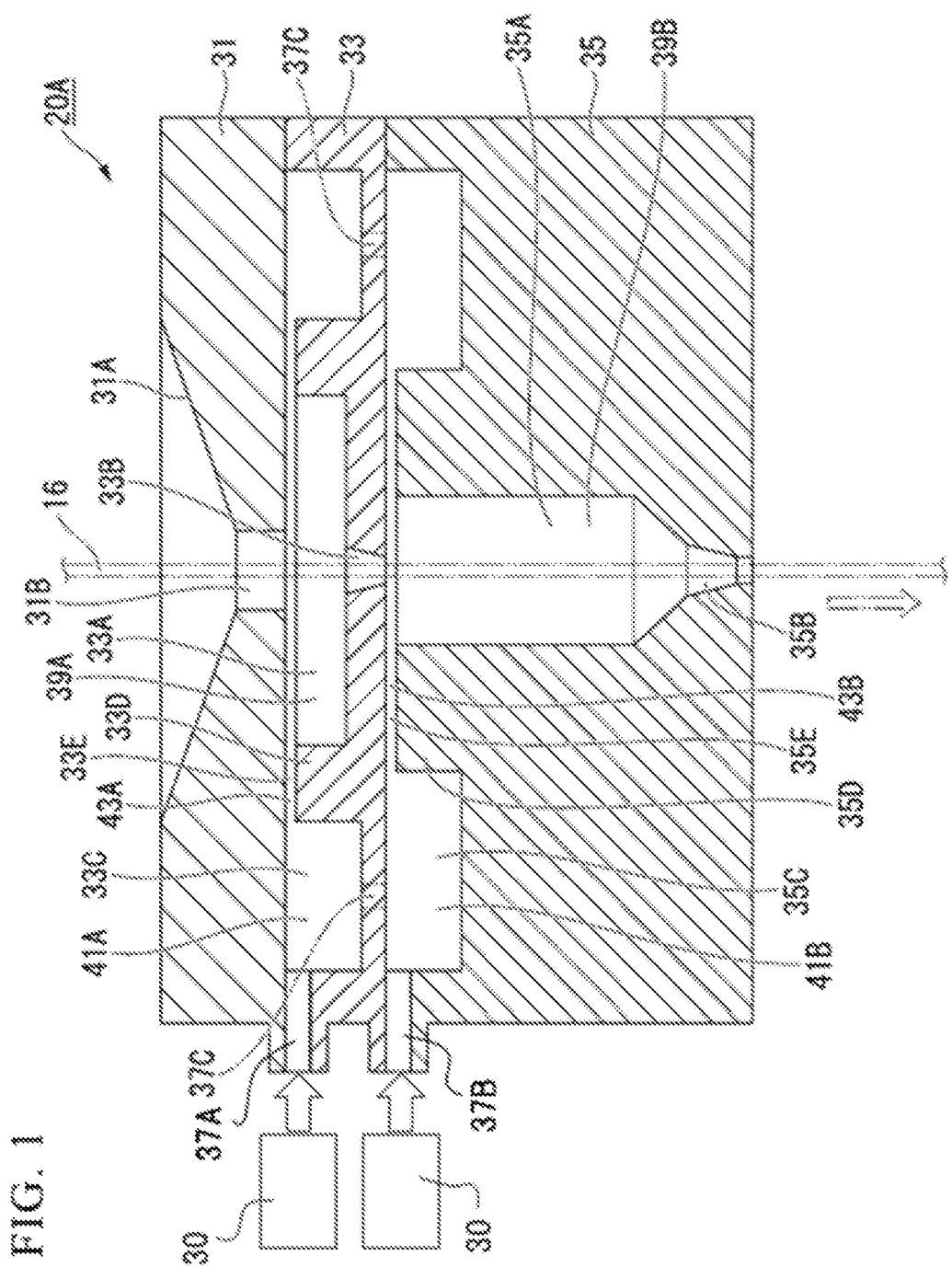
FIG. 1 is a schematic longitudinal sectional view of a coating device of a first embodiment of the present invention.
Figure 2:
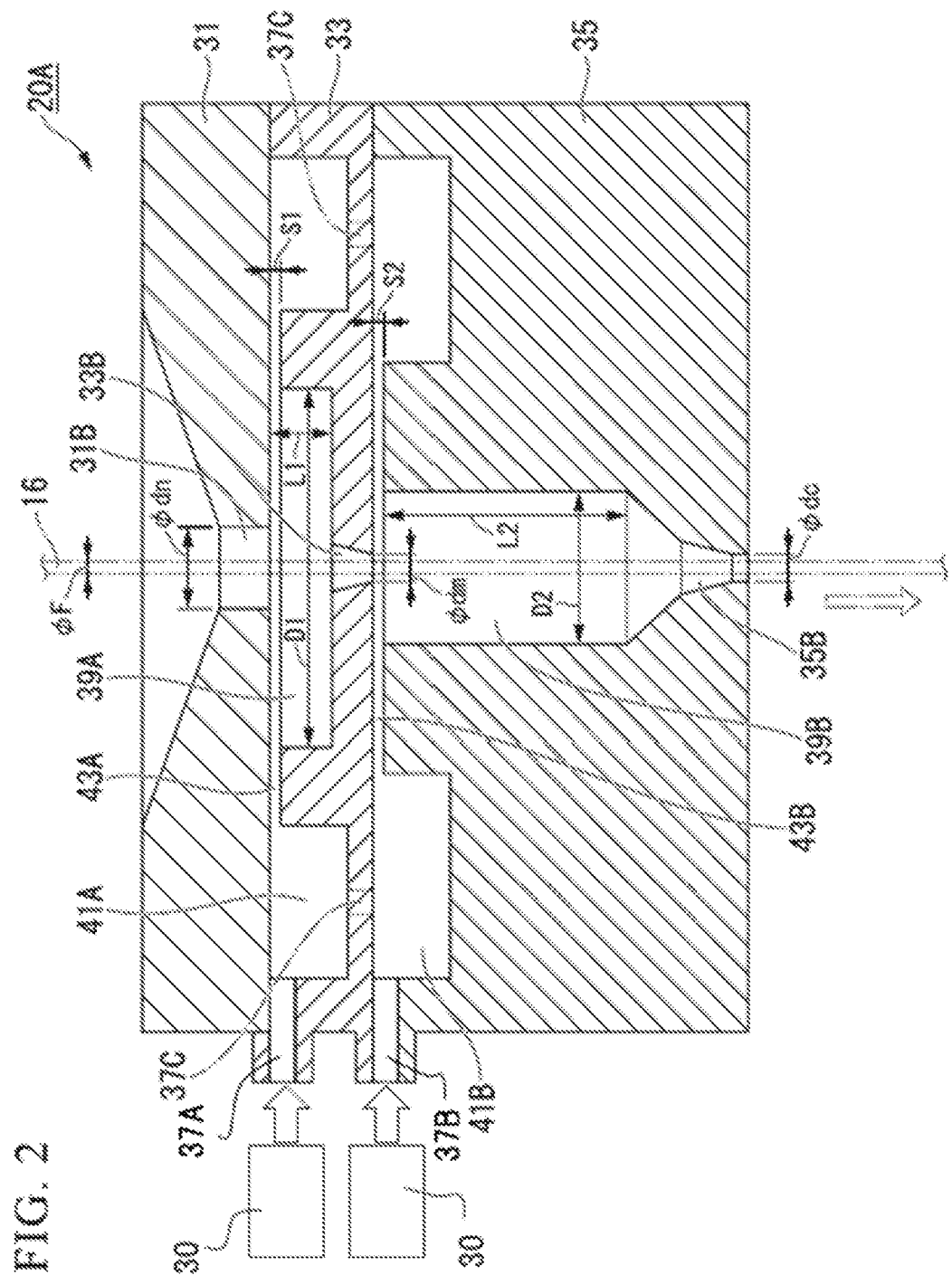
FIG. 2 is a longitudinal sectional view showing the size of each portion of the coating device of the first embodiment shown in FIG. 1.
Figure 3:
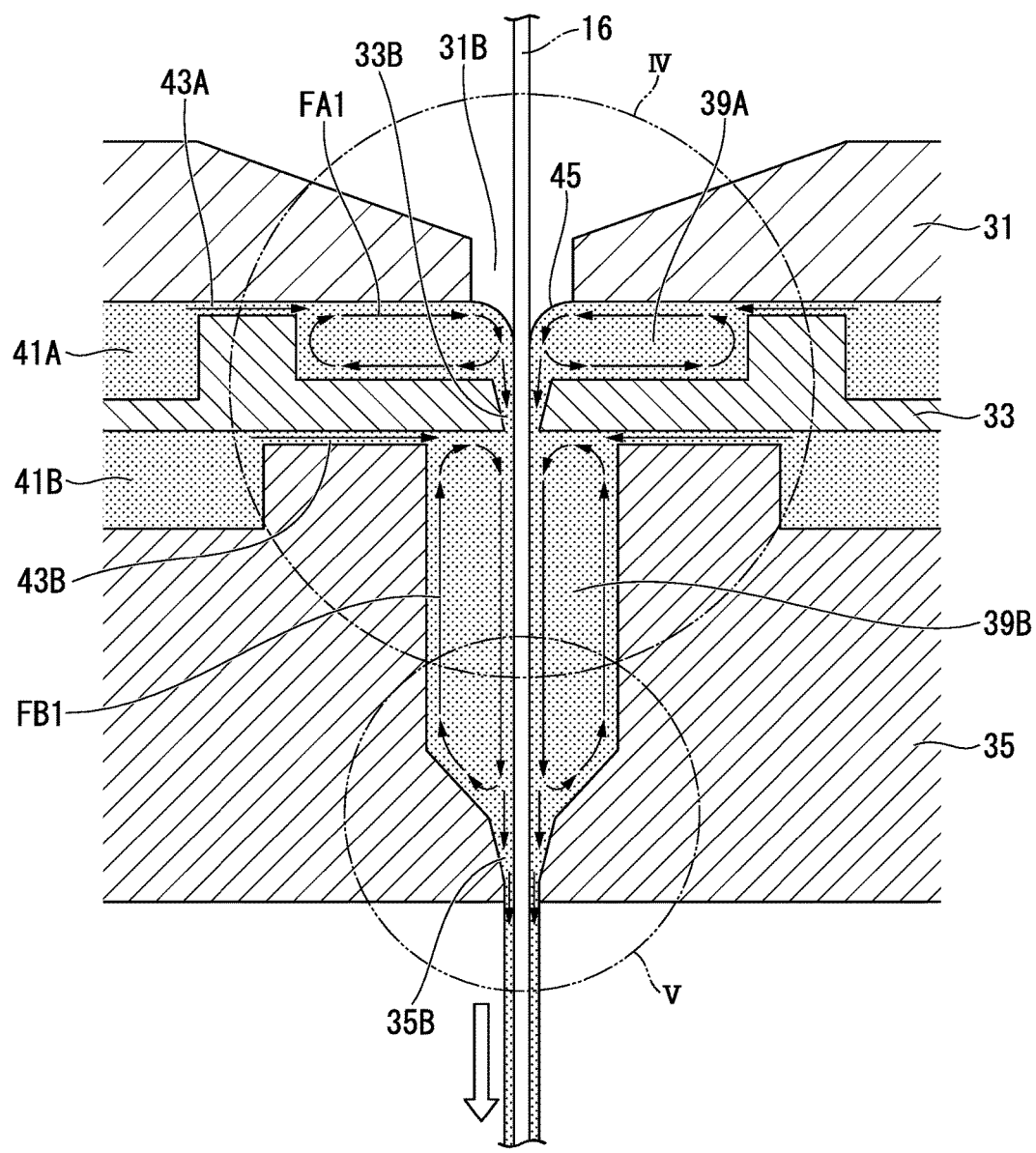
FIG. 3 is a longitudinal sectional view schematically showing the flow of resin in the coating device in a state in which a bare optical fiber is coated using the coating device of the first embodiment shown in FIG. 1.
Figure 4:
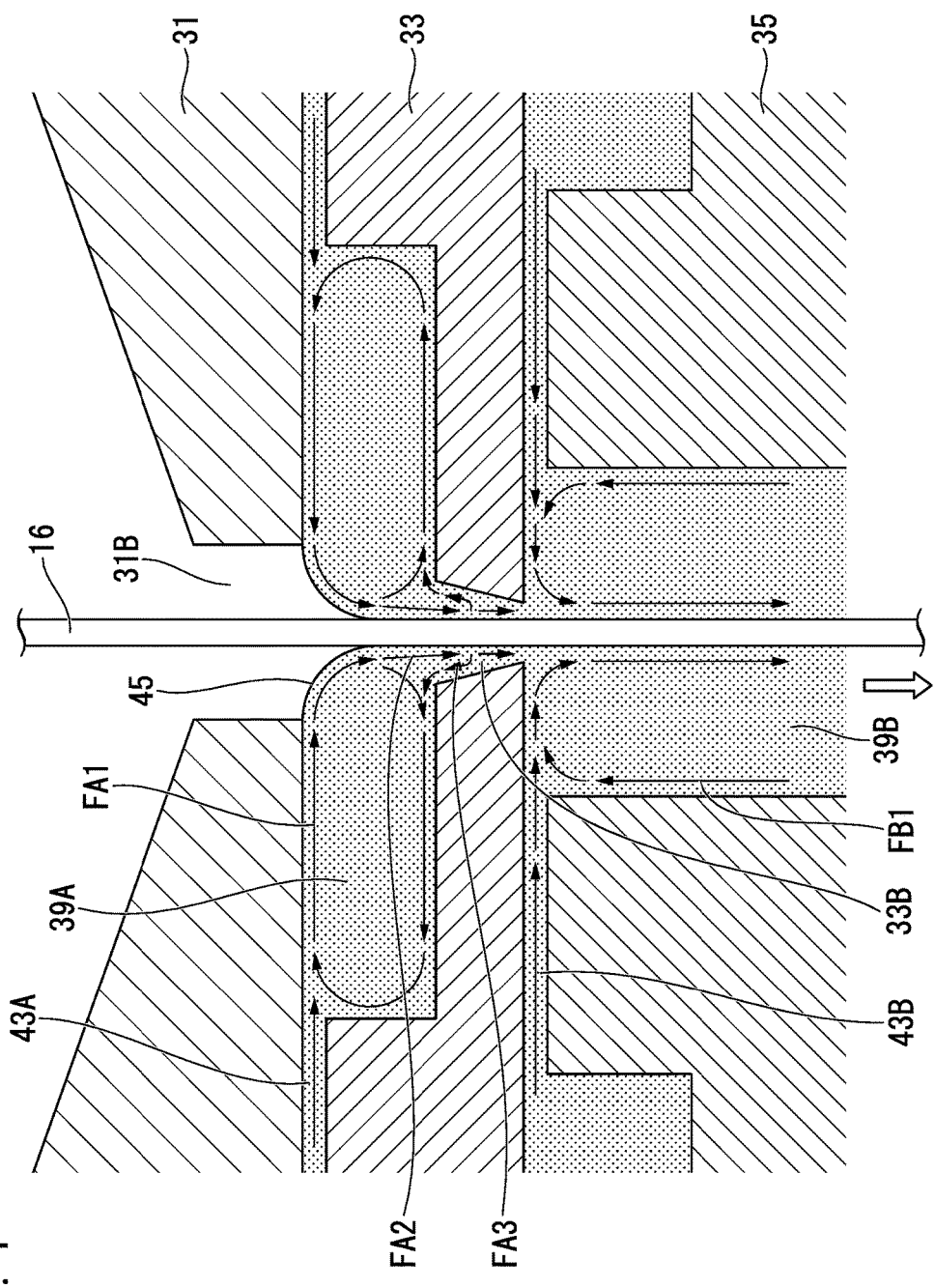
FIG. 4 is a schematic longitudinal sectional view showing a portion IV in FIG. 3 in an enlarged manner.
Figure 5:
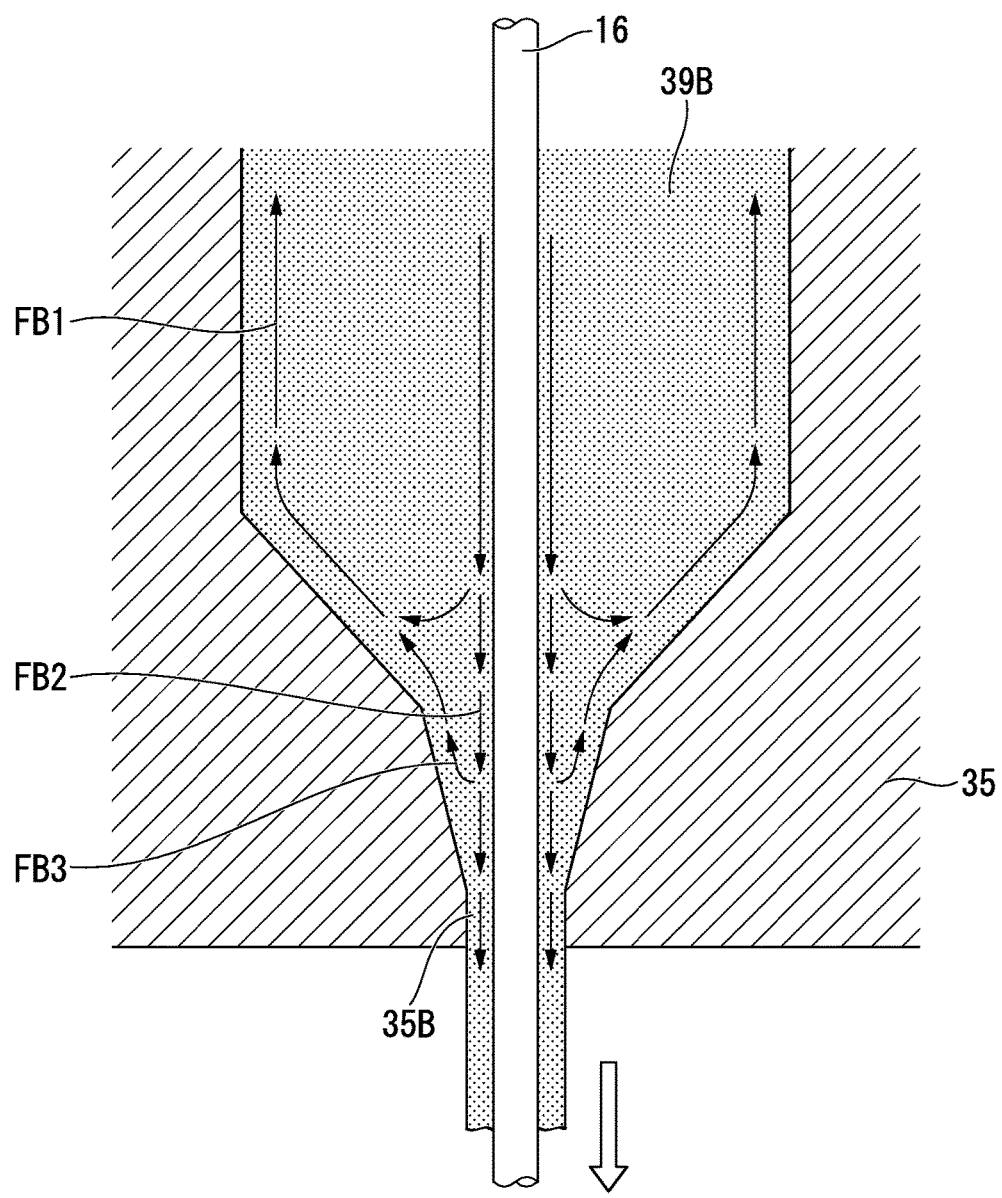
FIG. 5 is a schematic longitudinal sectional view showing a portion V in FIG. 3 in an enlarged manner.

FIG. 1 shows the overall configuration of the coating device 20A of the first embodiment of the present invention. FIG. 2 shows the size of each portion of the coating device 20A. FIG. 3 shows the overall flow of the resin in the coating device 20A. FIGS. 4 and 5 show the details of the flow of resin in a main portion of the coating device 20A in an enlarged manner.

In FIGS. 1 and 2, in the coating device 20A of the first embodiment, a nipple 31 having, for example, a horizontal disk shape overall, an intermediate die 33 having, for example, a similar horizontal disk shape overall, and a first coating die 35 having, for example, a similar horizontal disk shape overall are provided from above so as to be in contact with each other in a vertical direction in this order. The nipple 31, the intermediate die 33, and the first coating die 35 are assembled so as to be in contact with each other in a vertical direction by support means, such as a holding frame (not shown).

In a central portion of the nipple 31, a bare optical fiber introduction portion 31A that is recessed in a tapered shape toward the lower side from the upper surface is formed. In a lower portion at the center of the bare optical fiber introduction portion 31A, a nipple hole 31B through which the bare optical fiber 16 is inserted from above is formed so as to penetrate therethrough in the vertical direction (bare optical fiber traveling direction). In a central portion of the intermediate die 33, a recess 33A that is recessed downward in a circular shape with a larger diameter than the hole diameter $\phi dn$ of the nipple hole 31B is formed. Through the recess 33A, a first resin circulation chamber 39A to be described later is partitioned and formed. In a lower portion at the center of the recess 33A in the intermediate die 33, an intermediate die hole 33B through which the bare optical fiber 16 is inserted is formed so as to penetrate therethrough in the vertical direction. In a central portion of the first coating die 35, a recess 35A that is recessed in a circular shape from the upper surface with a larger diameter than the hole diameter $\phi dm$ of the intermediate die hole 33B is formed. Through the recess 35A, a second resin circulation chamber 39B to be described later is partitioned and formed. In a lower portion at the center of the recess 35A in the first coating die 35, a first coating die hole 35B through which the bare optical fiber 16 is inserted is formed so as to penetrate it in the vertical direction.

In this specification, "upper" means vertically upward, and "lower" means vertically downward unless otherwise stated.

Here, assuming that the hole diameter at the outlet of the nipple hole 31B, that is, the minimum inner diameter, is a nipple hole diameter $\phi dn$, the hole diameter at the outlet of the intermediate die hole 33B, that is, the minimum inner diameter, is an intermediate die hole diameter $\phi dm$, and the hole diameter at the outlet of the first coating die hole 35B, that is, the minimum inner diameter, is a first coating die hole diameter $\phi dc$, these hole diameters $\phi dn$, $\phi dm$, and $\phi dc$ preferably satisfy the relationship of $\phi dn > \phi dc > \phi dm$.

More specifically, it is preferable that, in the case of one-layer coating, the intermediate die hole diameter $\phi dm$ is set to be within a range of 0.17 mm to 0.23 mm in a state in which the above-described relationship is satisfied. When applying the independent coating method for two-layer coating, it is preferable that the intermediate die hole diameter $\phi dm1$ of the coating device for first-stage coating (primary coating) is set to be within a range of 0.17 mm to 0.23 mm. It is preferable that the intermediate die hole diameter $\phi dm2$ of the coating device for second-stage coating (secondary coating) is set to be within a range of 0.25 mm to 0.27 mm.

For the typical bare optical fiber diameter of $\phi 125$ μm, the optimal nipple hole diameter $\phi dn$ is approximately 0.3 mm to 0.5 mm.

It is preferable that the first coating die hole diameter $\phi dc$ is usually set to 0.2 mm to 0.25 mm.

The reason for the setting of the desirable ranges of the hole diameters will be described again later.

On the outer side of the recess 33A in the intermediate die 33A, a recessed groove portion 33C that is recessed continuously from the upper surface in an annular shape in the circumferential direction is formed. Through the recessed groove portion 33C, a first resin reservoir chamber 41A to be described later is partitioned and formed. A gap 33E is formed between the upper surface of a wall portion (hereinafter, referred to as an intermediate wall portion since this also corresponds to a wall portion on the inner peripheral side of the groove portion 33C) 33D on the outer peripheral side of the recess 33A and the lower surface of the nipple 31. The gap 33E forms a first resin supply passage 43A to be described later. One or more first resin inlets 37A for introducing the resin into the recessed groove portion 33C (first resin reservoir chamber 41A) are formed at appropriate positions on the outer peripheral side of the recessed groove portion 33C. In FIGS. 1 and 2, the first resin inlet 37A is shown in only one place. In practice, however, in order to introduce the resin into the first resin reservoir chamber 41A as evenly as possible in the circumferential direction, it is desirable to provide the first resin inlet 37A in a plurality of places at equal distances in the circumferential direction.

Also on the outer side of the recess 35A in the first coating die 35, a recessed groove portion 35C that is recessed continuously from the upper surface in an annular shape in the circumferential direction is formed. Through the recessed groove portion 35C, a second resin reservoir chamber 41B to be described later is partitioned and formed. A gap 35E is formed between the upper surface of a wall portion (hereinafter, referred to as an intermediate wall portion since this also corresponds to a wall portion on the inner peripheral side of the groove portion 35C) 35D on the outer peripheral side of the recess 35A and the lower surface of the intermediate die 33. The gap 35E forms a second resin supply passage 43B to be described later. One or more second resin inlets 37B for introducing the resin into the recessed groove portion 35C (second resin reservoir chamber 41B) are formed at appropriate positions on the outer peripheral side of the recessed groove portion 35C. The second resin inlet 37B is also shown in only one place in FIGS. 1 and 2. In practice, however, in order to introduce the resin into the second resin reservoir chamber 41B as evenly as possible in the circumferential direction, it is preferable to provide the second resin inlet 37B in a plurality of places at equal distances in the circumferential direction. Instead of the second resin inlet 37B, as shown by a two-dot chain line in FIGS. 1 and 2, a third resin inlet 37C communicating into the second resin reservoir chamber 41B in the recessed groove portion 35C of the first coating die 35 from the first resin reservoir chamber 41A in the recessed groove portion 33C may be formed in a bottom wall portion of the recessed groove portion 33C in the intermediate die 33. In this case, resin in the first resin reservoir chamber 41A is supplied to the second resin reservoir chamber 41B through the third resin inlet 37C.

Here, as shown in FIG. 2, it is desirable that a length L1 along the bare optical fiber traveling direction (vertical direction) in the first resin circulation chamber 39A is larger than a length L2 along the bare optical fiber traveling direction (vertical direction) in the second resin circulation chamber 39B. More specifically, it is preferable that the length L2 of the second resin circulation chamber 39B is 20 mm to 40 mm and the length L1 of the first resin circulation chamber 39A is 1.5 mm to 10 mm. Here, L1 corresponds to a distance between the lower surface of the nipple 31 and the bottom surface of the recess 33A of the intermediate die 33, and L2 corresponds to a distance from the lower surface of the intermediate die 33 to the bottom portion of the recess 35A of the first coating die 35.

It is preferable that an inner diameter (inner diameter within the horizontal plane around the traveling position of the bare optical fiber 16) D1 of the first resin circulation chamber 39A is set to 5 mm±2 mm. It is preferable that an inner diameter (inner diameter within the horizontal plane around the traveling position of the bare optical fiber 16) D2 of the second resin circulation chamber 39B is set to 3 mm±1 mm.

The reason for the setting of the desirable ranges of the lengths L1 and L2 and the inner diameters D1 and D2 of the first and second resin circulation chambers 39A and 39B will be described again later.

It is preferable that a gap S1 of the first resin supply passage 43A and a gap S2 of the second resin supply passage 43B are set to 0.3 mm to 0.7 mm (that is, 0.5 mm±0.2 mm). Here, the gap S1 of the first resin supply passage 43A corresponds to the size (gap size in a direction along the traveling direction of the bare optical fiber) of the gap 33E between the lower surface of the nipple 31 and the intermediate wall portion 33D of the intermediate die 33. The gap S2 of the second resin supply passage 43B corresponds to the size (gap size in a direction along the traveling direction of the bare optical fiber) of the gap 35E between the lower surface of the intermediate die 33 and the intermediate wall portion 35D of the first coating die 35.

The reason for the setting of the desirable ranges of the gaps S1 and S2 will be described again later.

When performing resin coating on the bare optical fiber 16 during the optical fiber manufacturing process using the coating device 20A of the first embodiment described above, the bare optical fiber 16 is inserted into the nipple hole 31B from the side above the nipple 31, and is inserted into the intermediate die hole 33B through the first resin circulation chamber 39A. In addition, the bare optical fiber 16 is inserted into the first coating die hole 35B through the second resin circulation chamber 39B from the intermediate die hole 33B, and is pulled out downward from the lower end of the first coating die hole 35B.

On the other hand, coating resin is introduced into the coating device 20A from the first and second resin inlets 37A and 37B in a liquid state.

Here, the types of the resin introduced from the first resin inlet 37A and the resin introduced from the second resin inlet 37B are usually the same. A supply source 30 of the resin introduced from the first resin inlet 37A and a supply source 30 of the resin introduced from the second resin inlet 37B may be different. In general, however, it is simple to guide the resin to the first and second resin inlets 37A and 37B by diverting (branching) the resin supply line outside the coating device using the same supply source 30. When forming the third resin inlet 37C instead of the second resin inlet 37B, the resin supplied to the first resin reservoir chamber 41A is diverted into the second resin circulation chamber 39B.

The resin introduced into the coating device 20 from the first resin inlet 37A is supplied into the first resin reservoir chamber 41A that is partitioned and formed by the lower surface of the nipple 31 and the recess 33A of the intermediate die 33. The resin in the first resin reservoir chamber 41A is guided into the first resin circulation chamber 39A through the first resin supply passage 43A formed by the gap 33E between the lower surface of the nipple 31 and the intermediate wall portion 33D of the intermediate die 33. The first resin supply passage 43A formed by the gap 33E is continuous in the circumferential direction.

The resin in the first resin circulation chamber 39A flows into the intermediate die hole 33B. Thus, the path of resin from the first resin inlet 37A into the intermediate die hole 33B through the first resin reservoir chamber 41A, the first resin supply passage 43A, and the first resin circulation chamber 39A is referred to as a first resin path herein. The resin in the first resin circulation chamber 39A is drawn out downward with the downward (vertical direction) traveling of the bare optical fiber 16, and reaches the second resin circulation chamber 39B through a gap between the inner surface of the intermediate die hole 33B and the outer peripheral surface of the bare optical fiber 16.

On the other hand, the resin introduced into the coating device 20 from the second resin inlet 37B is supplied into the second resin reservoir chamber 41B that is partitioned and formed by the lower surface of the intermediate die 33 and the recess 35A of the first coating die 35. When forming the third resin inlet 37C instead of the second resin inlet 37B, a portion of the resin in the first resin reservoir chamber 41A is supplied to the second resin reservoir chamber 41B through the third resin inlet 37C.

The resin in the second resin reservoir chamber 41B is guided into the second resin circulation chamber 39B through the second resin supply passage 43B formed by the gap 35E between the lower surface of the intermediate die 33 and the intermediate wall portion 35D of the first coating die 35. The second resin supply passage 43B formed by the gap 35E is continuous in the circumferential direction.

The resin in the second resin circulation chamber 39B flows into the first coating die hole 35B. Thus, the path of resin from the second resin inlet 37B (or from the third resin inlet 37C) into the first coating die hole 35B through the second resin reservoir chamber 41B, the second resin supply passage 43B, and the second resin circulation chamber 39B is referred to as a second resin path herein. The resin in the second resin circulation chamber 39B is drawn out downward (vertical direction) with the downward traveling of the bare optical fiber 16, and is drawn downward to the outside of the coating device 20 through a gap between the inner surface of the first coating die hole 35B and the outer peripheral surface of the bare optical fiber 16. That is, the resin is drawn to the downward outside of the coating device 20 in a state in which the bare optical fiber 16 is coated with resin.

Accordingly, the first and second resin paths described above are independent from each other.

The flow of resin in each portion in the coating device 20A in the above first embodiment will be described in more detail with reference to FIGS. 3 to 5.

In the first resin circulation chamber 39A, resin is drawn out downward with the downward traveling of the bare optical fiber 16 by viscous resistance between the resin and the surface of the bare optical fiber 16. As a result, a resin liquid surface corresponding to the inner side of the nipple hole 31B is in a downwardly recessed state. That is, a so-called meniscus 45 having a liquid surface recessed downward with the bare optical fiber 16 as the center is formed in a lower opening portion of the nipple hole 31B. At the same time, a circulation flow FA1 of the resin is formed in the first resin circulation chamber 39A. In the intermediate die hole 33B, as shown in detail in FIG. 4, a flow FA2 that is drawn out to the surface of the descending bare optical fiber 16 and moves toward the second resin circulation chamber 39B from the first resin circulation chamber 39A is formed. At the same time as the formation of FA2, a portion of the resin drawn into the intermediate die hole 33B returns from the intermediate die hole 33B to the first resin circulation chamber 39A (return flow FA3). These flows can also be referred to as a kind of circulation flow (circulation flow in the intermediate die hole 33B). Hereinafter, these flows FA2 and FA3 may also be referred to as circulation flows FA2 and FA3.

On the other hand, in the second resin circulation chamber 39B, with the lowering of the bare optical fiber 16, resin convects due to viscous resistance between the resin and the surface of the bare optical fiber 16 to form a circulation flow FB1 of the resin. In the coating die hole 35B, as shown in detail in FIG. 5, the flow FB2 that is drawn out to the surface of the descending bare optical fiber 16 and moves toward the lower opening end of the first coating die hole 35B from the second resin circulation chamber 39B is formed. At the same time, a portion of the resin drawn into the first coating die hole 35B returns into the second resin circulation chamber 39B from the first coating die hole 35B (flow FB3). These flows FB2 and FB3 can also be referred to as a kind of circulation flow (circulation flow in the first coating die hole 35B). Hereinafter, these flows FB2 and FB3 may also be referred to as circulation flows FB2 and FB3.

Here, the circulation flows FA2 and FA3 of the resin in the intermediate die hole 33B and the circulation flows FB2 and FB3 of the resin in the first coating die hole 35B have a large influence on the variations in the coating thickness and the occurrence of thickness deviation. That is, if the circulation flows FA2 and FA3 in the intermediate die hole 33B and the circulation flows FB2 and FB3 in the first coating die hole 35B are stable over time and are uniform in the circumferential direction, variations in the coating thickness and the occurrence of thickness deviation can be limited.

Conversely, if the circulation flow of resin in the intermediate die hole 33B and the coating die hole 35B is disturbed (changes with time) or is uneven, the risk of the occurrence of variations in the coating thickness and thickness deviation is increased. That is, in the intermediate die hole and the first coating die hole, the resin is drawn out by the descending bare optical fiber surface, and a flow from the upper side to the lower side of the first coating die hole occurs. However, a portion of the resin drawn into the first coating die hole returns to the upstream and circulates (circulation flow is generated). In this case, a resin flow (resin supply stream) from the resin supply passage merges with the flow from the upper side to the lower side of the first coating die hole and some circulation flow that returns to the upstream. In this case, if the flow direction or the flow disturbance (flow rate or pressure in the circumferential direction is not uniform) of the resin supply stream at the merging point influences the circulation flow described above, the circulation flow changes with time (circulation flow is disturbed), and is not uniform. Accordingly, variations in the coating diameter or variations in thickness deviation in the optical fiber length direction occur.

That is, in the present embodiment, circulation flows (FA1 and FB1) are caused by newly providing two circulation chambers (first and second resin circulation chambers 39A and 39B) independently of each other. Therefore, it is possible to avoid a situation where the resin supply stream from the resin supply passage (first and second resin supply passages 43A and 43B) directly acts on the circulation flows FA2 and FA3 generated in the intermediate die hole 33B and the circulation flows FB2 and FB3 generated in the first coating die hole 35B. In this manner, interaction among the flows of [flow of resin supply stream from each resin supply passage]→[new circulation flow in each resin circulation chamber]→[circulation flow in the first coating die hole] occurs. Therefore, since the influence of the resin supply stream on the circulation flow in the intermediate die hole 33B and the first coating die hole 35B, which is the most important consideration, is reduced, the circulation flow in the intermediate die hole 33B and the first coating die hole 35B is stabilized. That is, by causing the circulation flow newly, even if there is a slight variation or unevenness in the direction, flow rate, or pressure of the flow of the resin supply stream from the resin supply passage, such variations or unevenness can be corrected by the new circulation flow in each resin circulation chamber. Accordingly, disturbance in the circulation flow in the intermediate die hole 33B and the first coating die hole 35B is prevented. When the resin circulation chamber (first and second resin circulation chambers 39A and 39B) is provided in order to cause a new circulation flow, the boundary conditions of the circulation flow are determined by the size and shape of the resin circulation chamber. Therefore, the circulation flows FA1 and FB1 in the respective resin circulation chambers can be stabilized by appropriately determining the size and shape of each resin circulation chamber. In addition, by appropriately determining the size and shape of each resin circulation chamber, it becomes easy to make the circulation flows FA2 and FA3 in the intermediate die hole and the circulation flows FB2 and FB3 in the first coating die hole 35B stable and uniform.

Thus, in the present embodiment, resin circulation chambers (first and second resin circulation chambers 39A and 39B) are provided on the upstream sides of the inlet of the intermediate die hole 33B and the inlet of the first coating die hole 35B. In addition, other circulation flows FA1 and FB1 that are different from the circulation flows FA2 and FA3 generated in the intermediate die hole 33B and the circulation flows FB2 and FB3 generated in the first coating die hole 35B are caused on the upstream side of the intermediate die hole inlet and the first coating die hole inlet. Therefore, since the circulation flows FA2 and FA3 in the intermediate die hole 33B and the circulation flows FB2 and FB3 in the first coating die hole are made to be stable and uniform, it is possible to minimize the variations in the coating thickness, thickness deviation, and its variation.

In the present embodiment, the merging point of the resin from the first resin supply passage 43A to the first resin circulation chamber 39A, that is, the resin outlet of the first resin supply passage 43A is located above the first resin circulation chamber 39A. For this reason, the flow direction of the resin flowing into the first resin circulation chamber 39A from the first resin supply passage 43A is a direction along the circulation flow FA1 in the first resin circulation chamber 39A. As a result, since the flow of the resin flowing into the first resin circulation chamber 39A disturbs the circulation flow FA1 in the first resin circulation chamber 39A less, it is possible to stabilize the circulation flow FA1 in the first resin circulation chamber 39A. In the present embodiment, the merging point of the resin from the second resin supply passage 43B to the second resin circulation chamber 39B, that is, the resin outlet of the second resin supply passage 43B is located above the second resin circulation chamber 39B. For this reason, the flow direction of the resin flowing from the second resin supply passage 43B to the second resin circulation chamber 39B is a direction along the circulation flow FB1 in the second resin circulation chamber 39B. As a result, since the flow of the resin flowing into the second resin circulation chamber 39B disturbs the circulation flow FB1 in the second resin circulation chamber 39B less, it is possible to stabilize the circulation flow FB1 in the second resin circulation chamber 39B.

In the coating device 20A of the present embodiment, in a place where the circulation flows FA2 and FA3 from the intermediate die hole 33B merge with the circulation flow FA1 in the first resin circulation chamber 39A, the direction of the circulation flow FA2 into the intermediate die hole 33B and the direction of the circulation flow FA3 from the intermediate die hole 33B are directions along the flow of the circulation flow FA1 in the first resin circulation chamber 39A. Therefore, the circulation flows FA2 and FA3 are prevented from being disturbed at the merging point. The direction of the circulation flow FB2 into the first coating die hole 35B and the direction of the circulation flow FB3 from the first coating die hole 35B are directions along the flow of the circulation flow FB1 in the second resin circulation chamber 39B. Therefore, it is effectively prevented that the circulation flows FB2 and FB3 are disturbed at the merging point.

Assuming that the direction of the resin flow toward the die holes 33B and 35B is toward a downstream side, in the coating device 20A of the present embodiment, the annular resin reservoir chambers 41A and 41B are provided on the upstream sides of the resin circulation chambers 39A and 39B and the resin supply passages 43A and 43B that are throttle portions facing the resin circulation chambers 39A and 39B. That is, in the present embodiment, resin is stored in the resin reservoir chambers 41A and 41B having a uniform (annular) shape in the circumferential direction before the resin is supplied to the resin supply passages 43A and 43B.

By providing the resin reservoir chambers 41A and 41B, the resin that is supplied in the circumferential direction from the resin inlets 37A and 37B in a non-uniform state can be stored in the resin reservoir chambers 41A and 41B (for example, when the resin flows from each of the cylindrical resin inlets arranged at equal distances of 90° in four directions). Accordingly, it is possible to evenly distribute the pressure in the circumferential direction by disturbing the flow, which has a non-uniform resin flow rate distribution or pressure distribution, in the resin reservoir chambers 41A and 41B. In addition, the flow in the circumferential direction can be made to be uniform with good reproducibility in the resin supply passages 43A and 43B provided after the resin reservoir chambers 41A and 41B.

When supplying the resin into the second resin circulation chamber 39B from the second resin inlet 37B through the second resin reservoir chamber 41B and the second resin supply passage 43B while supplying the resin into the first resin circulation chamber 39A from the first resin inlet 37A through the first resin reservoir chamber 41A and the first resin supply passage 43A, it is desirable to set the pressure applied to the first resin circulation chamber 39A to be equal to or greater than the pressure applied to the second resin circulation chamber 39B. That is, it is desirable to satisfy the relationship of [pressure of the first resin circulation chamber 39A]≥[pressure of the second resin circulation chamber 39B]. More preferably, it is desirable to set the pressure difference, which is calculated by [pressure of first resin circulation chamber] minus [pressure of second resin circulation chamber], within a range of 0 MPa to 0.02 MPa (that is, 0.01 MPa±0.01 MPa).

Thus, in order to cause a pressure difference between the first resin circulation chamber 39A and the second resin circulation chamber 39B, when supplying the resin from separate resin supply sources 30, it is preferable to cause a difference in the resin supply pressure of the resin supply sources 30. When supplying the resin from the same resin supply source 30, pressure adjustment means in the resin flow path before the supply of resin to the resin supply passage is preferably provided after the branch location in the supply line from the one resin supply source 30. Alternatively, the flow path sectional area or the flow path length may be changed in the resin flow path before the supply of resin to the resin supply passage (mainly until the resin reservoir chamber) similarly after the branch location. The reason why it is desirable to cause a pressure difference as described above will be described again later Next, desirable conditions and the reasons for the size, shape, and pressure in each portion in the coating device 20A of the first embodiment will be described.

For the length L1 of the first resin circulation chamber 39A and the length L2 of the second resin circulation chamber 39B, it is desirable to set the length L2 of the second resin circulation chamber 39B to be larger than the length L1 of the first resin circulation chamber 39A. More specifically, it is preferable that the length L2 of the second resin circulation chamber 39B is 20 mm to 40 mm and the length L1 of the first resin circulation chamber 39A is 1.5 mm to 10 mm. The reason is as follows.

The circulation flow FA1 caused in the first resin circulation chamber 39A generates an interface (meniscus 45), which is recessed in a recessed shape, between the nipple hole 31B, the external atmosphere (gas), and the bare optical fiber surface. If the meniscus 45 is unstable, variations in the coating diameter or variations may be caused in thickness deviation in the longitudinal direction of the optical fiber. Since the meniscus becomes unstable as the length increases and becomes stable as the length decreases, it is desirable that the meniscus be as short as possible. In particular, in the case of high drawing speed, the resin surface is strongly pulled toward the bare optical fiber surface. Accordingly, the meniscus becomes long. Here, if the distance between the lower outlet of the nipple hole 31B and the upper inlet of the intermediate die hole 33B (accordingly, the length L1 of the first resin circulation chamber) is short, resin pressure when the resin flow passes through the intermediate die hole 33B is increased. Therefore, action to shorten the meniscus occurs. Accordingly, especially in the case of high drawing speed, it is desirable that the length L1 of the first resin circulation chamber 39A is set to be as small as possible in order to shorten the meniscus. However, if the length L1 of the first resin circulation chamber 39A is too small, there is a possibility that the circulation flow FA1 cannot be formed in the first resin circulation chamber 39A. In this case, as shown in Example 1 to be described later, the optimal length L1 of the first resin circulation chamber 39A is 1.5 mm to 10 mm. The circulation flow FA1 is not generated if L1 is less than 1.5 mm, and the meniscus becomes unstable if L1 is larger than 10 mm.

On the other hand, the second resin circulation chamber 39B between the lower outlet of the intermediate die hole 33B and the upper inlet of the coating die hole 35B is not relevant to the meniscus generation. In order to stabilize the circulation flow FB1 in the second resin circulation chamber 39B, if the length L2 of the second resin circulation chamber 39B is large, the flow of resin is sufficiently developed, and the circulation flow FB1 in the second resin circulation chamber 39B becomes stable. In this case, as shown in Example 2 to be described later, the circulation flow FB1 in the second resin circulation chamber 39B becomes stable when L2 is 20 mm or more. Conversely, if L2 is larger than 40 mm, an adverse effect is increased when concentricity deviation or inclination occurs for the die holes 33B and 35B when the intermediate die 33 and the first coating die 35 are assembled. Therefore, it is not desirable because a high degree of manufacturing accuracy is required.

The inner diameter D1 of the first resin circulation chamber 39A is preferably set to 5 mm±2 mm, and the inner diameter D2 of the second resin circulation chamber 39B is preferably set to 3 mm±1 mm. The reason is as follows.

In order to stabilize the circulation flow FA1 in the first resin circulation chamber 39A and the circulation flow FB1 in the second resin circulation chamber 39B, it is desirable to ensure that only one circulation flow is generated in each of the chambers. When two or more circulation flows are generated in one resin circulation chamber, the circulation flows are generated in an unstable state. Accordingly, the shape or distribution of each circulation flow is changed due to disturbances, such as variations in the bare fiber diameter, and this has an adverse effect on the circulation flow in each of the die holes 33B and 35B. Specifically, the coating diameter changes suddenly, or the amount of thickness deviation changes. In particular, when the inner diameters D1 and D2 of the resin circulation chambers 39A and 39B are large, two or more circulation flows are likely to be generated in an unstable state. In this case, as shown in Example 2 to be described later, in order to cause only one circulation flow in the first resin circulation chamber 39A, it is preferable that the inner diameter D1 of the first resin circulation chamber 39A be set to 5 mm±2 mm. In addition, in order to cause only one circulation flow in the second resin circulation chamber 39B, it is preferable that the inner diameter D2 of the second resin circulation chamber 39B is set to 3 mm±1 mm.

For the optimal ranges of the nipple hole diameter $\phi dn$, the intermediate die hole diameter $\phi dm$, and the first coating die hole diameter $\phi dc$, it is desirable to satisfy the relationship of $\phi dn > \phi dc > \phi dm$. In particular, by making the intermediate die hole diameter $\phi dm$ smaller than the first coating die hole diameter $\phi dc$, it is possible to forcibly shorten the meniscus. The first coating die hole diameter $\phi dc$ is determined by the coating diameter of the product. On the other hand, in order to avoid the risk of contact with the bare optical fiber, it is necessary to set the nipple hole diameter $\phi dn$ to a relatively large diameter. In this case, the nipple hole diameter $\phi dn$ is usually set to be larger than the first coating die hole diameter $\phi dc$.

As specific optimal ranges of these hole diameters, it is preferable that, in the case of one-layer coating, the intermediate die hole diameter $\phi dm$ is set to be within a range of 0.17 mm to 0.23 mm in a state in which the above-described relationship is satisfied. When applying the independent coating method for two-layer coating, it is preferable that the intermediate die hole diameter $\phi dm1$ of the coating device for first-stage coating (primary coating) be set to be within a range of 0.17 mm to 0.23 mm and the intermediate die hole diameter $\phi dm2$ of the coating device for second-stage coating (secondary coating) is set to be within a range of 0.25 mm to 0.27 mm. By setting the intermediate die hole diameters $\phi dm1$ and $\phi dm2$ within the above range, as shown in Example 6 to be described later, good coating conditions can be obtained by limiting the amount of eccentricity including variation to less than 5 μm.

The nipple hole diameter φdn may be appropriately determined according to the bare optical fiber diameter. That is, if the nipple hole diameter φdn is too small, there is a possibility of contact with the bare optical fiber. Accordingly, for the typical bare optical fiber diameter of φ125 μm, the optimal nipple hole diameter φdn is approximately 0.3 mm to 0.5 mm, as shown in Example 6.

The first coating die hole diameter φdc may be appropriately selected according to the characteristics (viscosity) of the resin to be used, bare optical fiber diameter, bare optical fiber temperature, and drawing speed. It is preferable that the first coating die hole diameter φdc is usually set to 0.20 mm to 0.25 mm.

It is preferable that the gap S1 of the first resin supply passage 43A and the gap S2 of the second resin supply passage 43B are set to be within a range of 0.3 mm to 0.7 mm (that is, 0.5 mm±0.2 mm). The reason is as follows.

The resin supply passages 43A and 43B serve as throttle portions that make uniform the flow of the resin in the circumferential direction when the resin flows into the resin circulation chambers 39A and 39B by uniformly squeezing the flow of the resin when supplying the resin to the resin circulation chambers 39A and 39B. In order for the circulation flows FA1 and FB1 in the resin circulation chambers 39A and 39B to be disturbed as little as possible when the resin flows into the resin circulation chambers 39A and 39B from the resin supply passages 43A and 43B, it is desirable that no circulation flow is generated in the resin supply passages 43A and 43B. For the same reason, it is desirable that the resin circulation chamber side opening positions (positions of resin flows to the resin circulation chambers 39A and 39B) of the resin supply passages 43A and 43B are above the resin circulation chambers 39A and 39B as already described.

Here, if the gaps S1 and S2 of the resin supply passages 43A and 43B are too narrow, not only is the pressure loss of the resin passing therethrough increased, but also the pressure distribution and flow rate distribution of the resin in the circumferential direction become uneven. In addition, if the gaps S1 and S2 are too wide, action to make uniform the pressure and flow of the resin in the circumferential direction is reduced. Accordingly, there is a possibility that the non-uniformity of the flow of the resin in the circumferential direction occurring on the upstream side will be reflected as it is. When the gaps S1 and S2 are too wide, a circulation flow is generated in the resin supply passages 43A and 43B. As a result, the circulation flow and the circulation flows FA1 and FB1 in the resin circulation chambers 39A and 39B interact with each other, and the flow of the resin in the resin circulation chambers 39A and 39B is likely to be disturbed in the circumferential direction. Specifically, the optimal gap size is 0.5 mm±0.2 mm. In this case, as shown in Example 4 to be described later, if the gaps S1 and S2 of the resin supply passages 43A and 43B are within a range of 0.3 mm to 0.7 mm (that is, 0.5 mm±0.2 mm), the circulation flows FA1 and FB1 in the resin circulation chambers 39A and 39B can be stabilized without causing the adverse effects described above.

For the resin pressure in the resin circulation chambers 39A and 39B, it is desirable that the pressure applied to the first resin circulation chamber 39A is set to be equal to or greater than the pressure applied to the second resin circulation chamber 39B. That is, it is desirable to satisfy the relationship of [pressure of the first resin circulation chamber 39A]≥[pressure of the second resin circulation chamber 39B]. More preferably, as shown in Example 4 to be described later, it is desirable to set the pressure difference, which is calculated by [pressure of first resin circulation chamber]minus [pressure of second resin circulation chamber], within a range of 0 MPa to 0.02 MPa (that is, 0.01 MPa±0.01 MPa).

By setting the pressure difference between the resin circulation chambers 39A and 39B in this manner, the pressure of the first resin circulation chamber 39A on a side where a meniscus is caused becomes slightly higher than the pressure of the second resin circulation chamber 39B. Therefore, it is possible to shorten the meniscus. It is possible to prevent the occurrence of a resin flow that flows back (returns) into the first resin circulation chamber 39 from the second resin circulation chamber 39B through the intermediate die hole 33B.

Hereinafter, Examples 1 to 6 as a basis that has led to the setting of the above desirable condition ranges for the size or the pressure of each portion in the coating device 20A of the first embodiment will be described.

Example 1

Example 1 is an example to examine the influence of the length L1 of the first resin circulation chamber 39A and the length L2 of the second resin circulation chamber 39B.

Figure 23:
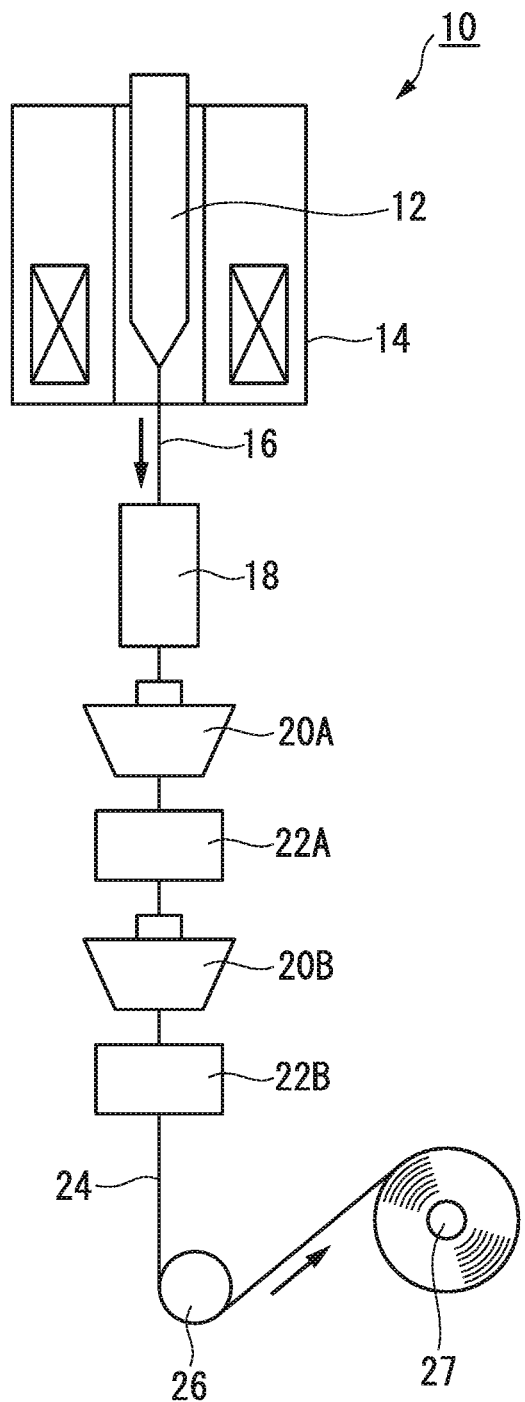
FIG. 23 is a schematic diagram showing an example of an optical fiber manufacturing apparatus including a coating device.

When manufacturing the optical fiber 24 using the optical fiber manufacturing apparatus shown in FIG. 23, the device shown in FIG. 1 was used as the coating devices 20A and 20B. For resin coating, as shown in FIG. 23, an independent coating method for two-layer coating was applied in which coating and curing were performed at two places using the two resin coating devices 20A and 20B and the two UV curing devices 22A and 22B. That is, the optical fiber preform 12 was heated and melted in the heating furnace and the bare optical fiber 16 of φ125 μm was pulled out, and then the bare optical fiber was cooled to the appropriate temperature by the cooling device 18. Then, first-stage coating (primary coating) was performed by coating the bare optical fiber with an ultraviolet curable resin using the first-stage coating device 20A, and the primary layer was cured by the first curing device 22A. Then, second-stage coating (secondary coating) was performed by coating the bare optical fiber with an ultraviolet curable resin using the second-stage coating device 20B, and the secondary layer was cured by the second curing device 22B, thereby manufacturing the optical fiber 24.

Parameters of the coating devices 20A and 20B that are common in Examples 1 to 6 are shown in Table 1. In Table 1, conditions other than the intermediate die hole diameter and the coating die hole diameter were the same in the first-stage coating device 20A for primary coating and the second-stage coating device 20B for secondary coating. In addition, the drawing speed was set to 2500 m/min, and the coating diameters were set to φ200/φ250 μm in the primary layer/secondary layer.

TABLE 1

| Experimental example NO. | Inner diameter of first circulation chamber: D1 [mm] | Length of first circulation chamber: L1 [mm] | Inner diameter of second circulation chamber: D2 [mm] | Length of second circulation chamber: L2 [mm] | (Pressure of first circulation chamber) – (pressure of second circulation chamber) [MPa] | Nipple hole diameter: φdn [mm] | Intermediate die hole diameter: φdm1/φdm2 [mm] | Coating die hole diameter: φdc [mm] | First resin supply passage gap: S1 [mm] | Second resin supply passage gap: S2 [mm] | First resin reservoir chamber | Second resin reservoir chamber |
|---|---|---|---|---|---|---|---|---|---|---|---|---|
| 1 | 5 | 0.5~20 | 3 | 0.5~50 | 0.01 | 0.4 | 0.2/0.25 | 0.25/0.35 | 0.5 | 0.5 | present | present |
| 2 | 2~10 | 2 | 1-10 | 30 | 0.01 | 0.4 | 0.2/0.25 | 0.25/0.35 | 0.5 | 0.5 | present | present |
| 3 | 5 | 2 | 3 | 30 | −0.1~+0.1 | 0.4 | 0.2/0.25 | 0.25/0.35 | 0.5 | 0.5 | present | present |
| 4 | 5 | 2 | 3 | 30 | 0.01 | 0.4 | 0.2/0.25 | 0.25/0.35 | 0.1~2 | 0.1~2 | present | present |
| 5 | 5 | 2 | 3 | 30 | 0.01 | 0.4 | 0.2/0.25 | 0.25/0.35 | 0.5 | 0.5 | present/none | present/none |
| 6 | 5 | 2 | 3 | 30 | 0.01 | 0.15~0.6 | 0.15~0.3/0.21~0.3 | 0.25/0.35 | 0.5 | 0.5 | present | present |

Note: intermediate die hole diameter φdm1 indicates an intermediate die hole diameter of a primary resin coating device, and φdm2 indicates an intermediate die diameter of a secondary resin coating device.

Figure 6:
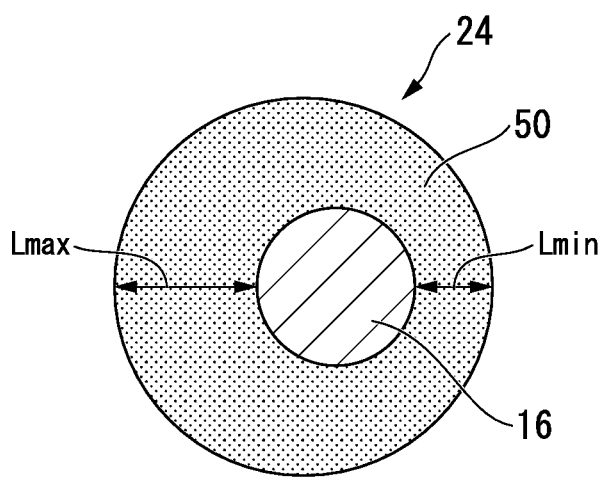
FIG. 6 is an enlarged sectional view of an optical fiber for explaining the amount of eccentricity.

In Example 1, relative merits regarding the coating condition when changing the lengths L1 and L2 of the first and second resin circulation chambers 39A and 39B were determined. As a method of evaluating the coating conditions, as shown in FIG. 6, a difference between the maximum thickness Lmax and the minimum thickness Lmin of a coating layer 50 in the cross-section of the optical fiber 24 obtained by forming the coating layer 50 on the bare optical fiber 16 was set as the amount of eccentricity Ec [μm], and the evaluation was performed based on the amount of eccentricity Ec. Here, the amount of eccentricity Ec indicates that the coating layer is applied in a state close to the full concentric state with respect to the bare optical fiber as the value decreases. Since the present invention is intended to improve the stability of the amount of eccentricity in the longitudinal direction of the optical fiber in particular, the value of the amount of eccentricity of the manufactured optical fiber was 100-m measured at intervals of 1 m (accordingly, measured a total of 100 times) in the following Examples including Example 1. In addition, the standard deviation of the values of the amount of eccentricity in the 100 measurements was calculated, and the variation in the amount of eccentricity was evaluated based on the standard deviation. PK2401 made by photonkinetics Co. was used for measurement.

In Example 1, the lengths L1 and L2 of the first and second resin circulation chambers 39A and 39B were changed independently in order to check the optimal ranges. That is, the length L1 of the first resin circulation chamber 39A was changed to be within a range of 0.5 mm to 20 mm in a state in which the length L2 of the second resin circulation chamber 39B was fixed to 30 mm, and the length L2 of the second resin circulation chamber 39B was changed to be within a range of 0.5 mm to 50 mm in a state in which the length L1 of the first resin circulation chamber 39A was fixed to 2 mm.

Figure 7:
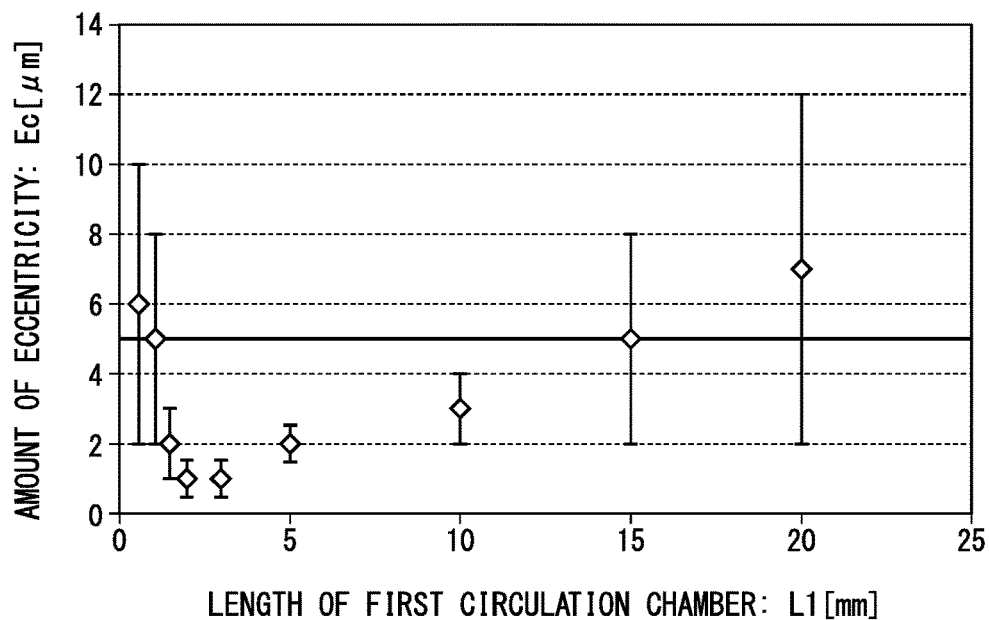
FIG. 7 is a graph showing the relationship between the length L1 of a first resin circulation chamber and the amount of eccentricity in the experimental results in Example 1.
Figure 8:
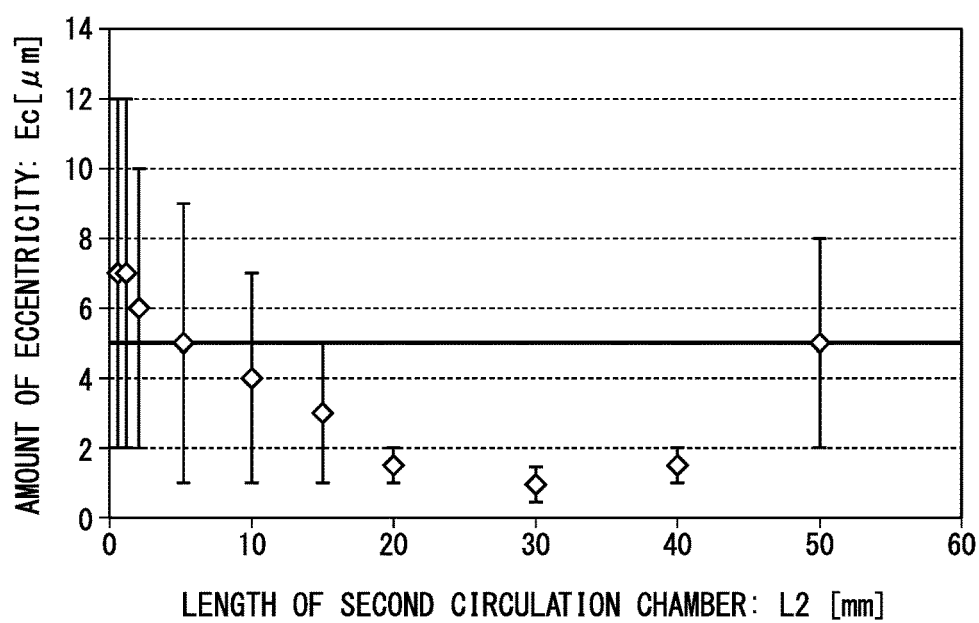
FIG. 8 is a graph showing the relationship between the length L2 of a second resin circulation chamber and the amount of eccentricity in the experimental results in Example 1.

FIG. 7 shows the measurement results of the amount of eccentricity Ec when changing the length L1 of the first resin circulation chamber 39A in a state in which the length L2 of the second resin circulation chamber 39B was fixed. FIG. 8 shows the measurement results of the amount of eccentricity Ec when changing the length L2 of the second resin circulation chamber 39B in a state in which the length L1 of the first resin circulation chamber 39A was fixed. Although these results are described only for the primary layer, the same results are obtained for the secondary layer.

Thick solid lines in FIGS. 7 and 8 indicate positions where the amount of eccentricity is 5 μm. If the amount of eccentricity including a variation is 5 μm or more, the concentricity between the bare optical fiber and the primary layer is poor. For this reason, an influence, such as the degradation of the lateral pressure characteristics with respect to the optical fiber (influence on the loss when applying stress from the optical fiber side surface), occurs. Therefore, as evaluation criteria, a state in which the amount of eccentricity in consideration of variation was less than 5 μm was determined to be a good coating condition.

As shown in FIG. 7, it became clear that, when the length L1 of the first resin circulation chamber 39A was within a range of 1.5 mm to 10 mm, the amount of eccentricity including a variation was less than 5 μm and accordingly good coating was possible. On the other hand, it became clear that, when the length L1 of the first resin circulation chamber 39A was within a range of less than 1.5 mm and a range of more than 10 mm, the amount of eccentricity including variation was 5 μm or more and accordingly the coating conditions became worse. Here, when the length L1 of the first resin circulation chamber 39A is 0.5 mm, the length L1 is the same as the gap S1 of the first resin supply passage 43A. This is a state in which substantially no first resin circulation chamber 39A is provided, and corresponds to a conventional example. At the high drawing speed, such as a drawing speed of 2500 m/min, when there is no substantial circulation chamber, if there is a difference even slightly in the flow of the resin in the circumferential direction, the influence on the amount of eccentricity is increased. Accordingly, the amount of eccentricity including variation becomes worse. A large variation in the amount of eccentricity indicates the amount of eccentricity changes in the longitudinal direction of the optical fiber. That is, this means that coating that is stable with time (in the longitudinal direction of the optical fiber) has not been performed.

On the other hand, as shown in FIG. 8, it became clear that, when the length L2 of the second resin circulation chamber 39B was within a range of 20 mm to 40 mm, the amount of eccentricity including variation was less than 5 μm and accordingly good coating was possible. In contrast, it became clear that, when the length L2 of the second resin circulation chamber 39B was less than 20 mm and when the length L2 of the second resin circulation chamber 39B was larger than 40 mm, the amount of eccentricity including variation was 5 μm or more and accordingly the coating conditions became worse. When the length L2 of the second resin circulation chamber 39B is less than 20 mm, the circulation flow is not stable due to the influence of high drawing speed since the circulation chamber is too short. Therefore, it is thought that the amount of eccentricity including variation becomes worse. When the length L2 of the second resin circulation chamber 39B is larger than 40 mm, there is an influence on the die manufacturing accuracy since the distance of the circulation chamber is too long. Therefore, it is thought that the coating conditions become worse. Here, when the length L2 is 0.5 mm, the second resin circulation chamber 39B also becomes the same as the gap of the second resin supply passage 43B. Therefore, this case can be said to be a state in which there is no substantial circulation chamber (correspond to a conventional example). Also in this case, at the high drawing speed, such as a drawing speed of 2500 m/min, when there is no substantial circulation chamber, if there is a difference even slightly in the flow of the resin in the circumferential direction, the influence on the amount of eccentricity is increased. Accordingly, the amount of eccentricity including variation becomes worse.

From Example 1 described above, it became clear that the optimal range of the length L1 of the first resin circulation chamber 39A was within a range of 1.5 mm to 10 mm and the optimal range of the length L2 of the second resin circulation chamber 39B was within a range of 20 mm to 40 mm.

Example 2

Example 2 is an example to examine the influence of the inner diameter D1 of the first resin circulation chamber 39A and the inner diameter D2 of the second resin circulation chamber 39B.

From Example 1 described above, the optimal ranges of the lengths L1 and L2 of the respective circulation chambers were obtained. Therefore, in Example 2, the inner diameters D1 and D2 of the first and second resin circulation chambers 39A and 39B were changed independently in order to check the optimal ranges. That is, the inner diameter D1 of the first resin circulation chamber 39A was changed to be within a range of 2 mm to 10 mm in a state in which the inner diameter D2 of the second resin circulation chamber 39B was fixed to φ3 mm. The inner diameter D2 of the second resin circulation chamber 39B was changed to be within a range of 1 mm to 10 mm in a state in which the inner diameter D1 of the first resin circulation chamber 39A was fixed to φ5 mm. Other drawing conditions and evaluation items were the same as those in Example 1.

Figure 9:
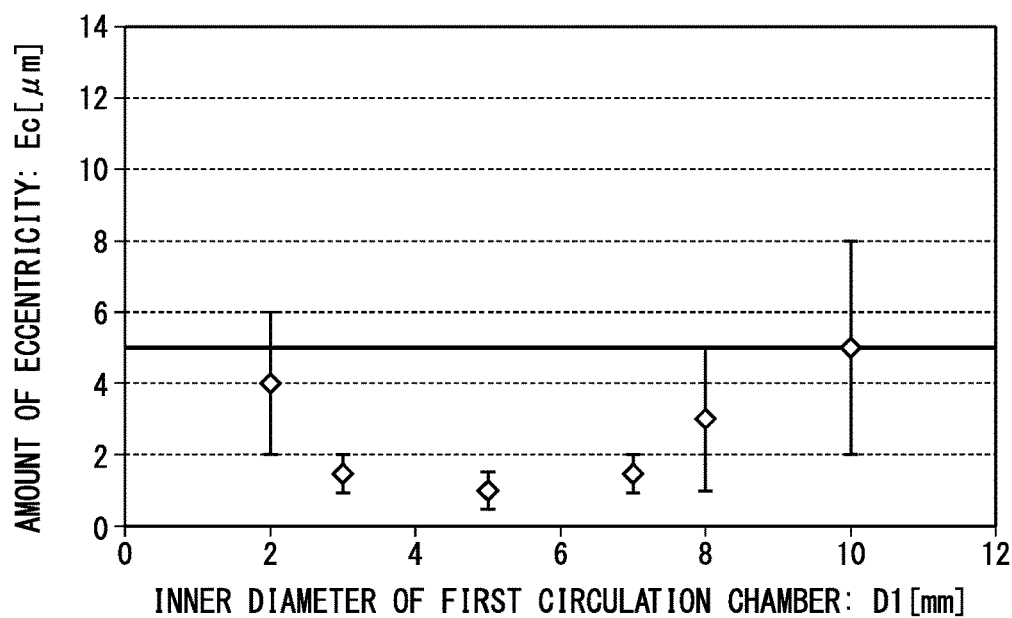
FIG. 9 is a graph showing the relationship between the inner diameter D1 of the first resin circulation chamber and the amount of eccentricity in the experimental results in Example 2.
Figure 10:
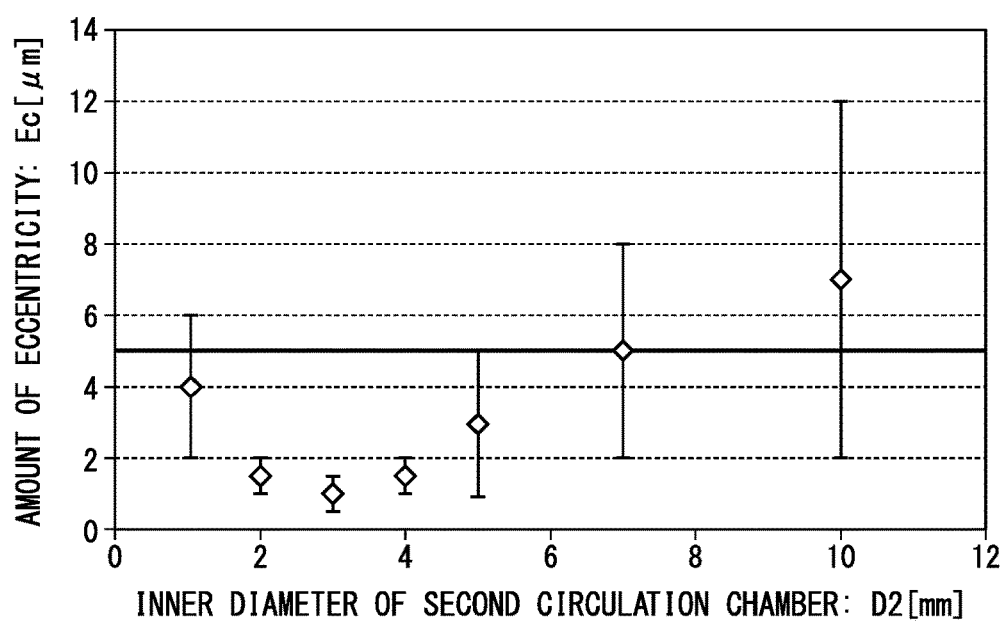
FIG. 10 is a graph showing the relationship between the inner diameter D2 of the second resin circulation chamber and the amount of eccentricity in the experimental results in Example 2.

FIG. 9 shows the measurement results of the amount of eccentricity Ec when changing the inner diameter D1 of the first resin circulation chamber 39A in a state in which the inner diameter D2 of the second resin circulation chamber 39B was fixed. FIG. 10 shows the measurement results of the amount of eccentricity Ec when changing the inner diameter D2 of the second resin circulation chamber 39B in a state in which the inner diameter D1 of the first resin circulation chamber 39A was fixed. Although these results are described only for the primary layer, the same results are obtained for the secondary layer.

As shown in FIG. 9, it became clear that, when the inner diameter D1 of the first resin circulation chamber 39A was within a range of 3 mm to 7 mm (that is, φ5 mm±φ2 mm), the amount of eccentricity including variation was less than 5 μm and accordingly good coating conditions were obtained. On the other hand, it became clear that, when the inner diameter D1 of the first resin circulation chamber 39A was less than 3 mm and when the inner diameter D1 of the first resin circulation chamber 39A was larger than 7 mm, the amount of eccentricity including variation was 5 μm or more and accordingly the coating conditions became worse. When the inner diameter D1 of the first resin circulation chamber 39A is less than 3 mm, the amount of the circulation flow is small. Accordingly, it is thought that resistance against the circulation is increased and this has an influence on the unstable circulation. On the other hand, when the inner diameter D1 of the first resin circulation chamber 39A is larger than 7 mm, it is thought that the circulation flow becomes unstable since the circulation chamber is too large. In some cases, it can also be considered that two circulation flows are generated in the first resin circulation chamber 39A.

On the other hand, it became clear from FIG. 10 that, when the inner diameter D2 of the second resin circulation chamber 39B was within a range of 2 mm to 4 mm (that is, φ3 mm±φ1 mm), the amount of eccentricity including variation was less than 5 μm and accordingly good coating conditions were obtained. In contrast, it became clear that, when the inner diameter D2 of the second resin circulation chamber 39B was less than φ2 mm and when the inner diameter D2 of the second resin circulation chamber 39B exceeded φ4 mm, the amount of eccentricity including variation was 5 μm or more and accordingly the coating conditions became worse. When the inner diameter D2 of the second resin circulation chamber 39B is less than 2 mm, the amount of the circulation flow is small. Accordingly, resistance against the circulation is increased, and this has an influence on the unstable circulation. When the inner diameter D2 of the second resin circulation chamber 39B is larger than 4 mm, it is thought that the circulation flow becomes unstable since the circulation chamber is too large. In some cases, it can also be considered that two circulation flows are generated in the second resin circulation chamber 39B.

From Example 2 described above, it became clear that the optimal range of the inner diameter D1 of the first resin circulation chamber 39A was within a range of 3 mm to 7 mm (that is, φ5 mm±φ2 mm) and the optimal range of the inner diameter D2 of the second resin circulation chamber 39B was within a range of 2 mm to 4 mm (that is, φ3 mm±φ1 mm).

Example 3

Example 3 is an example used to examine the influence of the internal pressure of the first and second resin circulation chambers 39A and 39B.

That is, in the optimal size of each circulation chamber determined in Examples 1 and 2 described above, the amount of eccentricity and the variation when changing the difference between the resin pressure applied to the first circulation chamber and the resin pressure applied to the second circulation chamber were examined.

Here, a system was used that supplied a resin toward the first and second resin circulation chambers 39A and 39B in the resin coating device from the same resin supply source 30 and supplied the resin to each of the resin circulation chambers 39A and 39B through branching in the resin coating device. Resin supply pressure to the first resin circulation chamber 39A and resin supply pressure to the second resin circulation chamber 39B were adjusted by causing a pressure loss intentionally by adjusting the flow path sectional area or the flow path length in the resin flow path before the supply of resin to the resin supply passage (mainly until the resin reservoir chamber). Common coating parameters are shown in Table 1. Other drawing conditions and evaluation items were the same as those in Example 1. The changeable range of resin pressure was set such that the pressure difference P1, that is, the value of P1, which is calculated by [pressure of first resin circulation chamber 39A] minus [pressure of second resin circulation chamber 39B], was within a range of −0.1 MPa to 0.1 MPa. The result is shown in FIG. 11.

Figure 11:
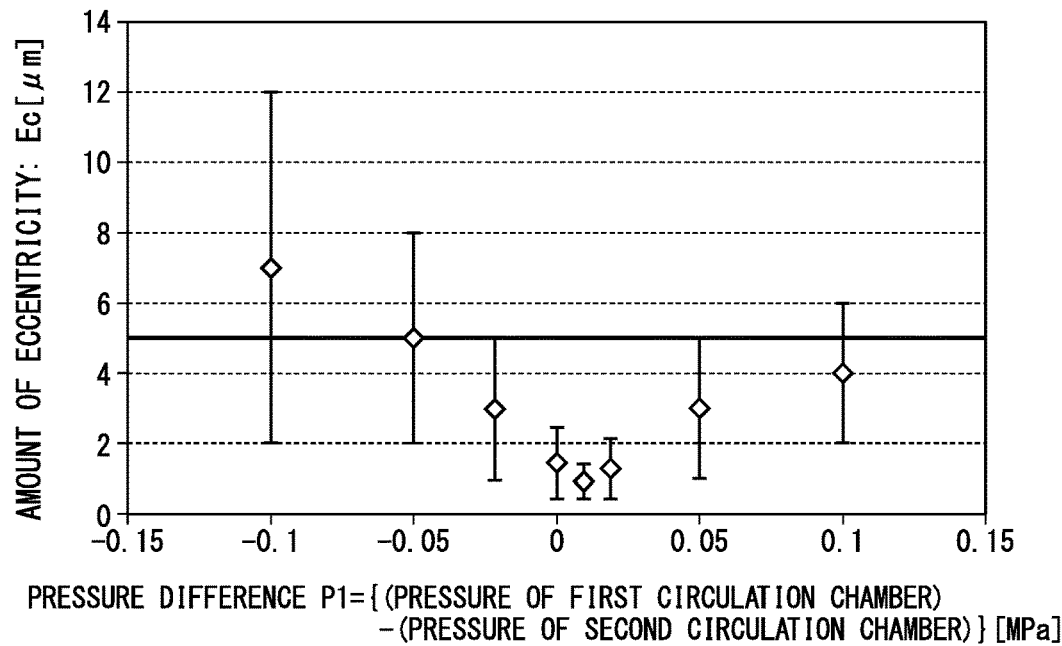
FIG. 11 is a graph showing the relationship between the value of (pressure of first resin circulation chamber) minus (pressure of second resin circulation chamber) and the amount of eccentricity as experimental results in Example 3.

From FIG. 11, it can be seen that, when the value of the pressure difference P1 is within a range of 0 MPa to 0.02 MPa (that is, 0.01 MPa±0.01 MPa), the amount of eccentricity including variation was less than 5 μm and accordingly good coating conditions were obtained.

On the other hand, when the above-described pressure difference P1 is negative, the supply of resin to the second resin circulation chamber 39B becomes larger than the supply of resin to the first resin circulation chamber 39A, and the amount of resin flow passing through the intermediate die hole 33B is reduced. As a result, the effect of shortening the meniscus is reduced. Therefore, it is thought that the amount of eccentricity including a variation becomes worse. On the other hand, for a region where the above-described pressure difference P1 exceeds 0.02 MPa on the positive side, the pressure to the first resin circulation chamber 39A side is increased, and accordingly, the amount of resin supply to the first resin circulation chamber 39A is also increased. Therefore, the effect of shortening the meniscus is sufficiently exhibited. However, the balance between the amount of resin supply to the first resin circulation chamber 39A and the amount of resin supply to the second resin circulation chamber 39B after passing through the intermediate die 33 is poor. For this reason, it is thought that the amount of eccentricity including variation becomes large.

From Example 3 described above, it became clear that the optimal range of the pressure difference P1, which is calculated by [pressure of first resin circulation chamber 39A] minus [pressure of second resin circulation chamber 39B], was within a range of 0 MPa to 0.02 MPa (that is, 0.01 MPa±0.01 MPa).

Example 4

Example 4 is an example used to examine the influence of the gap S1 of the first resin supply passage 43A and the gap S2 of the second resin supply passage 43B. In Example 4, in the optimal size of each circulation chamber determined in Examples 1 and 2 described above, the amount of eccentricity and the variation when changing the gap S1 of the first resin supply passage 43A and the gap S2 of the second resin supply passage 43B were examined. Here, the gap S1 of the first resin supply passage 43A and the gap S2 of the second resin supply passage 43B are independent from each other. For this reason, both the gaps were set to have the same size, and the changeable range was set to be within a range of 0.1 mm to 2 mm. Common parameters are shown in Table 1. Other drawing conditions and evaluation items were the same as those in Example 1. The result is shown in FIG. 12.

Figure 12:
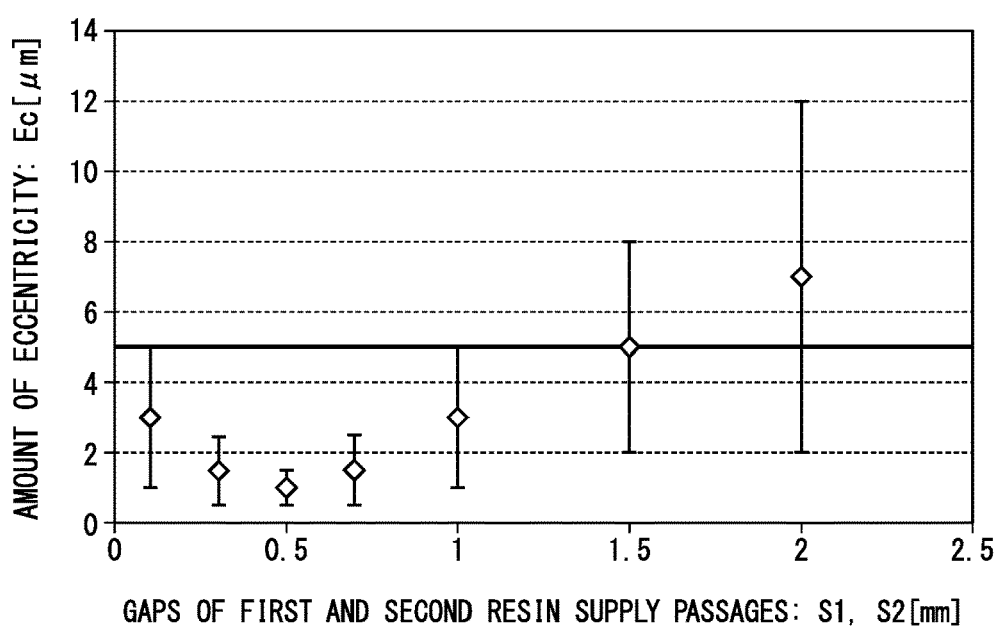
FIG. 12 is a graph showing the relationship between gaps S1 and S2 of the first and second resin supply passages and the amount of eccentricity as experimental results in Example 4.

From FIG. 12, it became clear that, when the gaps S1 and S2 of the first and second resin supply passages 43A and 43B were within a range of 0.3 mm to 0.7 mm (that is, 0.5 mm±0.2 mm), the amount of eccentricity including a variation was less than 5 μm and accordingly good coating conditions were obtained. On the other hand, when the gaps S1 and S2 of the first and second resin supply passages 43A and 43B were less than 0.3 mm and when the gaps S1 and S2 of the first and second resin supply passages 43A and 43B exceeded 0.7 mm, it was found that the amount of eccentricity including a variation became large. When the gaps S1 and S2 of the first and second resin supply passages 43A and 43B are less than 0.3 mm, a pressure loss when the resin passes through the gaps is increased. For this reason, the pressure distribution in the circumferential direction becomes non-uniform, and the non-uniformity of the pressure distribution is thought to be the cause of an increase in the amount of eccentricity including variation. On the other hand, when the gaps S1 and S2 of the first and second resin supply passages 43A and 43B exceed 0.7 mm, the pressure loss when the resin flows into each circulation chamber is too small. For this reason, the effect of making the flow of the resin in the circumferential direction uniform in each resin supply passage is reduced, and accordingly, the flow rate distribution in the circumferential direction becomes non-uniform. The non-uniformity of the flow rate distribution is thought to be the cause of an increase in the amount of eccentricity including a variation.

From Example 4 described above, it became clear that the optimal ranges of the gaps S1 and S2 of the first and second resin supply passages 43A and 43B were within a range of 0.3 mm to 0.7 mm (that is, 0.5 mm±0.2 mm).

Example 5

Example 5 is an example used to examine the influence of the presence of the first and second resin reservoir chambers 41A and 41B.

That is, the amount of eccentricity and the variation were examined for a case where the first and second resin reservoir chambers 41A and 41B were provided and a case where the first and second resin reservoir chambers 41A and 41B were not provided. Common coating parameters are shown in Table 1. Other drawing conditions and evaluation items were the same as those in Example 1.

As a result, when the resin reservoir chambers 41A and 41B were provided, the amount of eccentricity of approximately 1 μm including a variation of a standard deviation of approximately 0.5 μm was obtained in the same manner as in each Example described above. In contrast, when the resin reservoir chambers 41A and 41B were not provided, the amount of eccentricity of approximately 3 μm including a variation of a standard deviation of approximately 2 μm was obtained. Each of the resin reservoir chambers 41A and 41B has an effect of dispersing the non-uniform resin pressure before the resin reservoir chamber. Accordingly, the uniformity of the pressure in each of the resin supply passages 43A and 43B is further achieved by forming the resin reservoir chambers 41A and 41B.

Example 6

Example 6 is an example used to examine the influence of the nipple hole diameter φdn and the intermediate die hole diameter φdm.

The nipple hole diameter φdn and the intermediate die hole diameters φdm1 and φdm2 (note: φdm1 is a primary intermediate die hole diameter, and φdm2 is a secondary intermediate die hole diameter) were changed independently in order to check the optimal ranges. The coating die hole diameter φdc depends on the characteristics (viscosity) of the resin to be used, bare optical fiber diameter, bare optical fiber temperature, and drawing speed. For this reason, the above diameters are limited by the target product diameter, and cannot be arbitrarily selected. Therefore, in Example 6, as fiber diameter/primary diameter/secondary diameter, ϕ125/200/250 μm was set as the finish target, and the target finish outer diameter was finished with each coating die hole diameter ϕdc as 0.25/0.35 mm.

Common coating parameters are shown in Table 1. Other drawing conditions and evaluation items were the same as those in Example 1.

Specifically, first, the primary intermediate die hole diameter ϕdm1 was fixed to ϕ0.2 mm and the secondary intermediate die hole diameter ϕdm2 was fixed to ϕ0.25 mm, and the nipple hole diameter ϕdn was changed in a range of ϕ0.15 mm to ϕ0.6 mm. The result is shown in FIG. 13.

Figure 13:
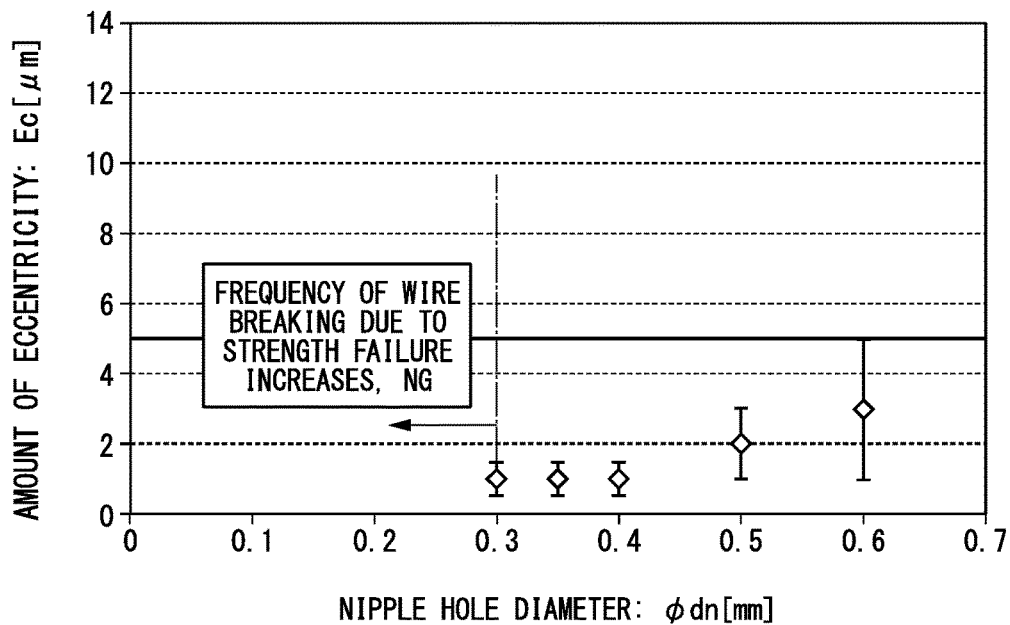
FIG. 13 is a graph showing the relationship between the nipple hole diameter and the amount of eccentricity as experimental results in Example 6.

As is apparent from FIG. 13, it became clear that, when the nipple hole diameter ϕdn was within a range of ϕ0.3 mm to ϕ0.5 mm, the amount of eccentricity including a variation was less than 5 μm and accordingly good coating conditions were obtained. On the other hand, when the nipple hole diameter ϕdn was less than ϕ0.3 mm, the bare optical fiber was in contact with the inner wall of the nipple hole 31B due to blurring of the bare optical fiber according to high-speed fiber drawing, and a phenomenon that the bare optical fiber was broken during the fiber drawing was seen. Accordingly, it became clear that this range was not desirable in terms of manufacturability. On the other hand, when the nipple hole diameter ϕdn exceeded ϕ0.5 mm, the stability of the meniscus became worse since the upper surface of the meniscus became wide. As a result, the amount of eccentricity including a variation became 5 μm or more, which was a bad result.

Then, the nipple hole diameter ϕdn was fixed to ϕ0.4 mm and the secondary intermediate die hole diameter ϕdm2 was fixed to ϕ0.26 mm, and the primary intermediate die hole diameter ϕdm1 was changed in a range of ϕ0.15 mm to ϕ0.3 mm. The result is shown in FIG. 14.

Figure 14:
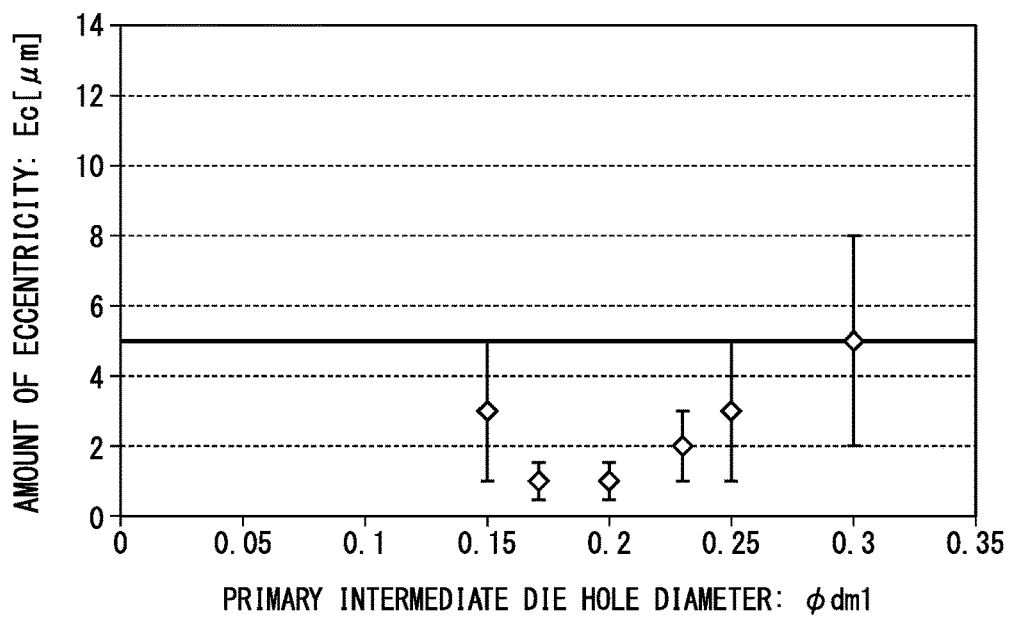
FIG. 14 is a graph showing the relationship between the primary intermediate die hole diameter and the amount of eccentricity as experimental results in Example 6.

As is apparent from FIG. 14, it became clear that, when the primary intermediate die hole diameter ϕdm1 was within a range of ϕ0.17 mm to ϕ0.23 mm (that is, ϕ0.2 mm±ϕ0.03 mm), the amount of eccentricity including a variation was less than 5 μm and accordingly good coating conditions were obtained. On the other hand, when the primary intermediate die hole diameter ϕdm1 was less than ϕ0.17 mm and when the primary intermediate die hole diameter ϕdm1 exceeded ϕ0.23 mm, the amount of eccentricity including a variation became 5 μm or more, which was a bad result.

In addition, the nipple hole diameter ϕdn was fixed to ϕ0.4 mm and the primary intermediate die hole diameter ϕdm1 was fixed to ϕ0.2 mm, and the secondary intermediate die hole diameter ϕdm2 was changed in the range of ϕ0.21 mm to ϕ0.3 mm. The result is shown in FIG. 15.

Figure 15:
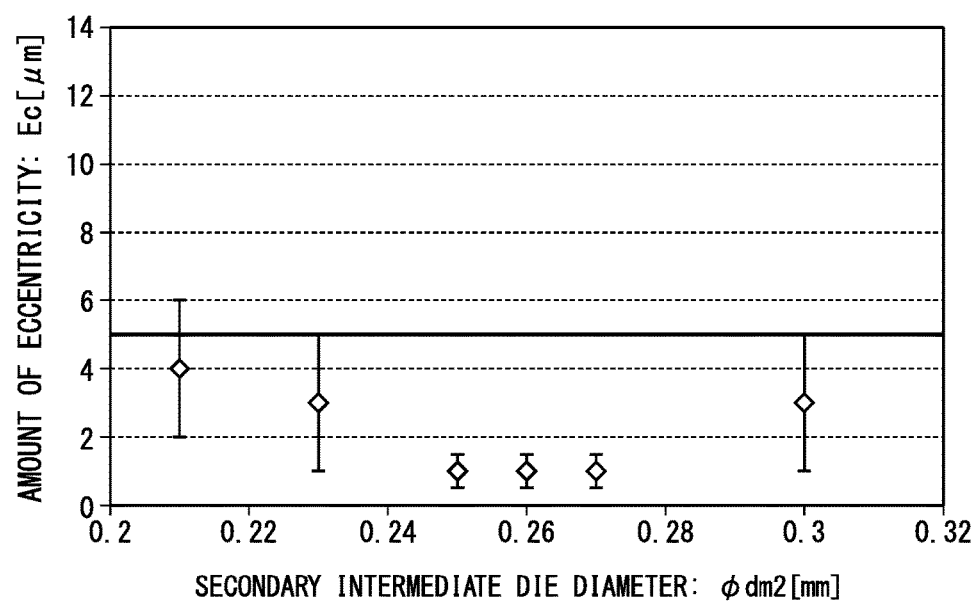
FIG. 15 is a graph showing the relationship between the secondary intermediate die hole diameter and the amount of eccentricity as experimental results in Example 6.

As is apparent from FIG. 15, it became clear that, when the secondary intermediate die hole diameter ϕdm2 was within a range of ϕ0.25 mm to ϕ0.27 mm (that is, ϕ0.26 mm±ϕ0.01 mm), the amount of eccentricity including a variation was less than 5 μm and accordingly good coating conditions were obtained. On the other hand, when the secondary intermediate die hole diameter ϕdm2 was less than ϕ0.25 mm and when the second intermediate die hole diameter ϕdm2 exceeded ϕ0.27 mm, the amount of eccentricity including a variation became 5 μm or more, which was a bad result.

From Example 6 described above, it became clear that the optimal range of the nipple hole diameter ϕdn was within a range of ϕ0.3 mm to ϕ0.5 mm, the optimal range of the primary intermediate die hole diameter ϕdm1 was within a range of ϕ0.17 mm to ϕ0.23 mm (that is, ϕ0.2 mm±ϕ0.03 mm), and the optimal range of the secondary intermediate die hole diameter ϕdm2 was within a range of ϕ0.25 mm to ϕ0.27 mm (that is, ϕ0.26 mm±ϕ0.01 mm).

Figure 24:
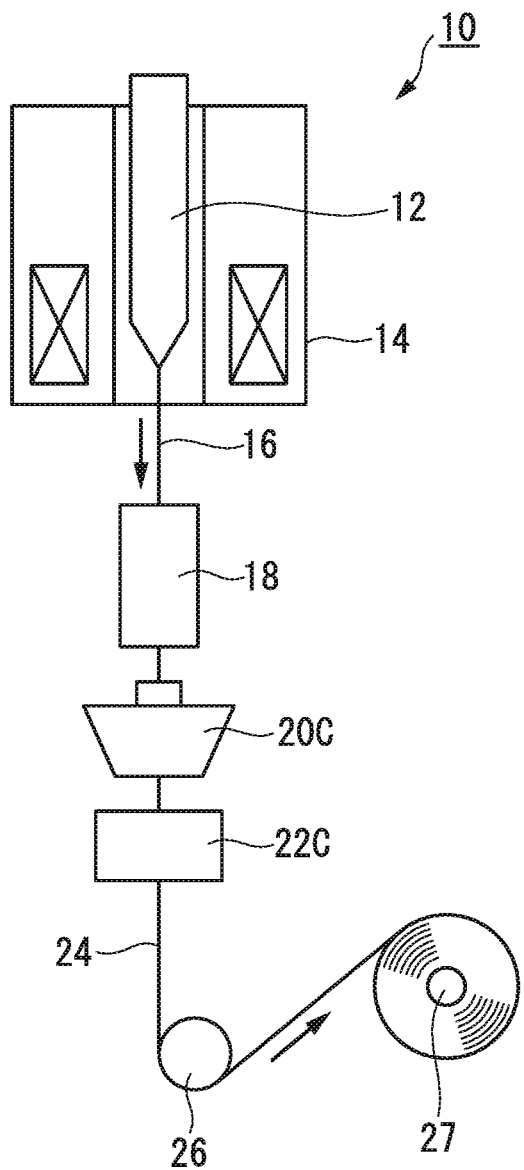
FIG. 24 is a schematic diagram showing another example of the optical fiber manufacturing apparatus including a coating device.

Next, FIGS. 16 to 19 show a coating device of a second embodiment of the present invention. The coating device of the second embodiment is the resin coating device 20C for manufacturing the optical fiber by performing two-layer coating based on a collective coating method as shown in FIG. 24. That is, the resin coating device 20C of the second embodiment is a device for collectively coating the resin for first protective coating (primary coating) and the resin for second protective coating (secondary coating) using one resin coating device.

Figure 16:
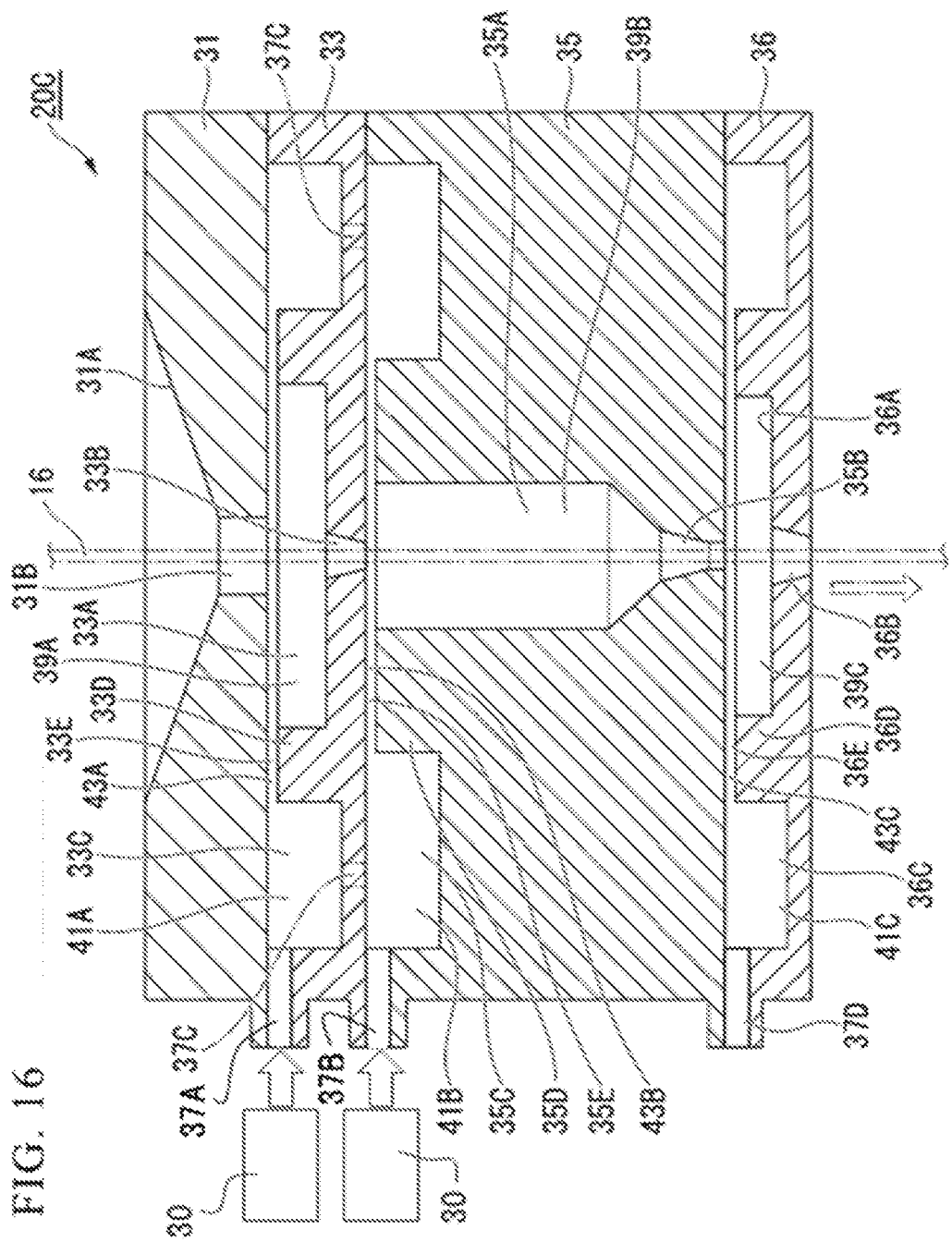
FIG. 16 is a schematic longitudinal sectional view of a coating device of a second embodiment of the present invention.
Figure 17:
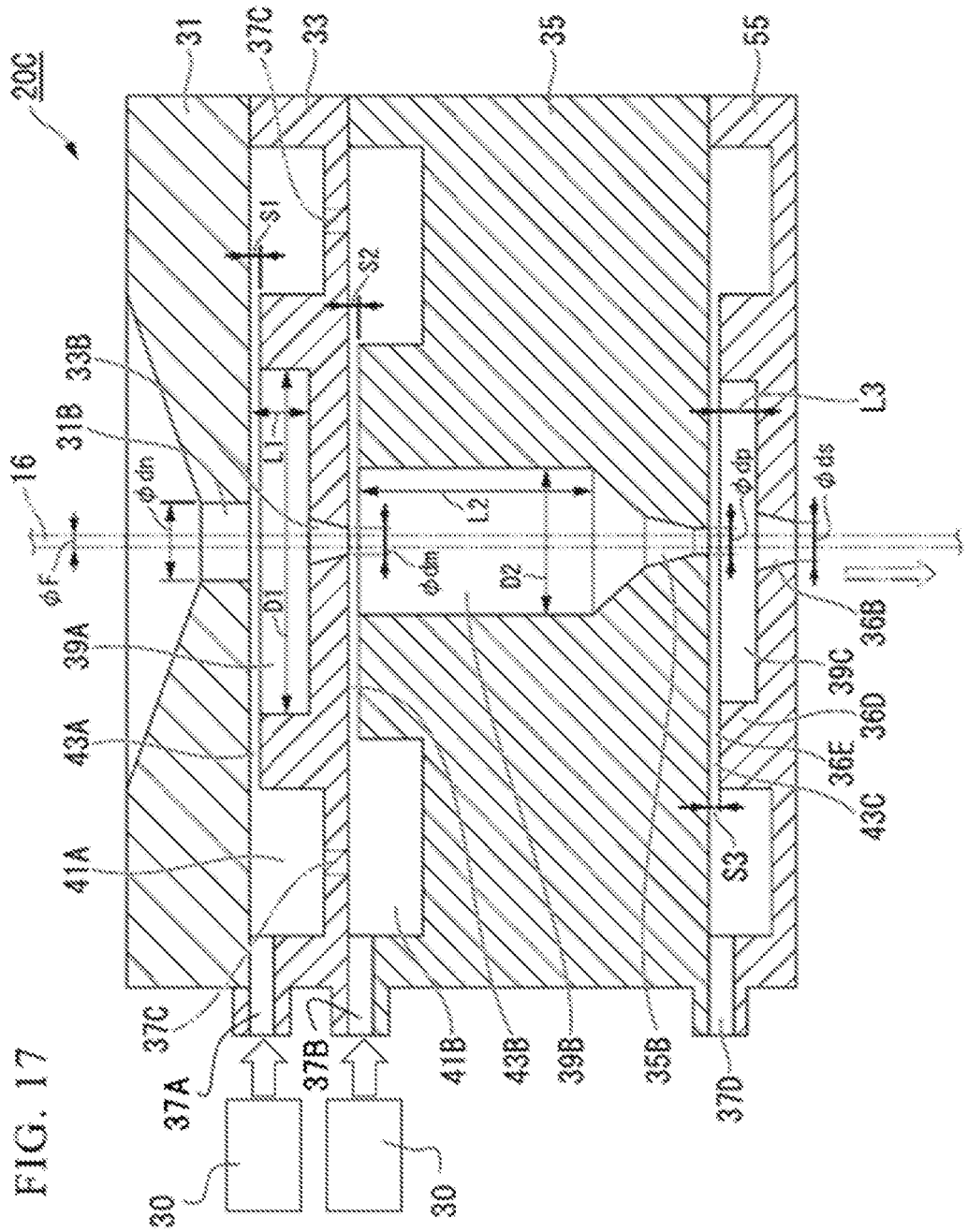
FIG. 17 is a longitudinal sectional view showing the size of each portion of the coating device of the second embodiment shown in FIG. 16.
Figure 18:
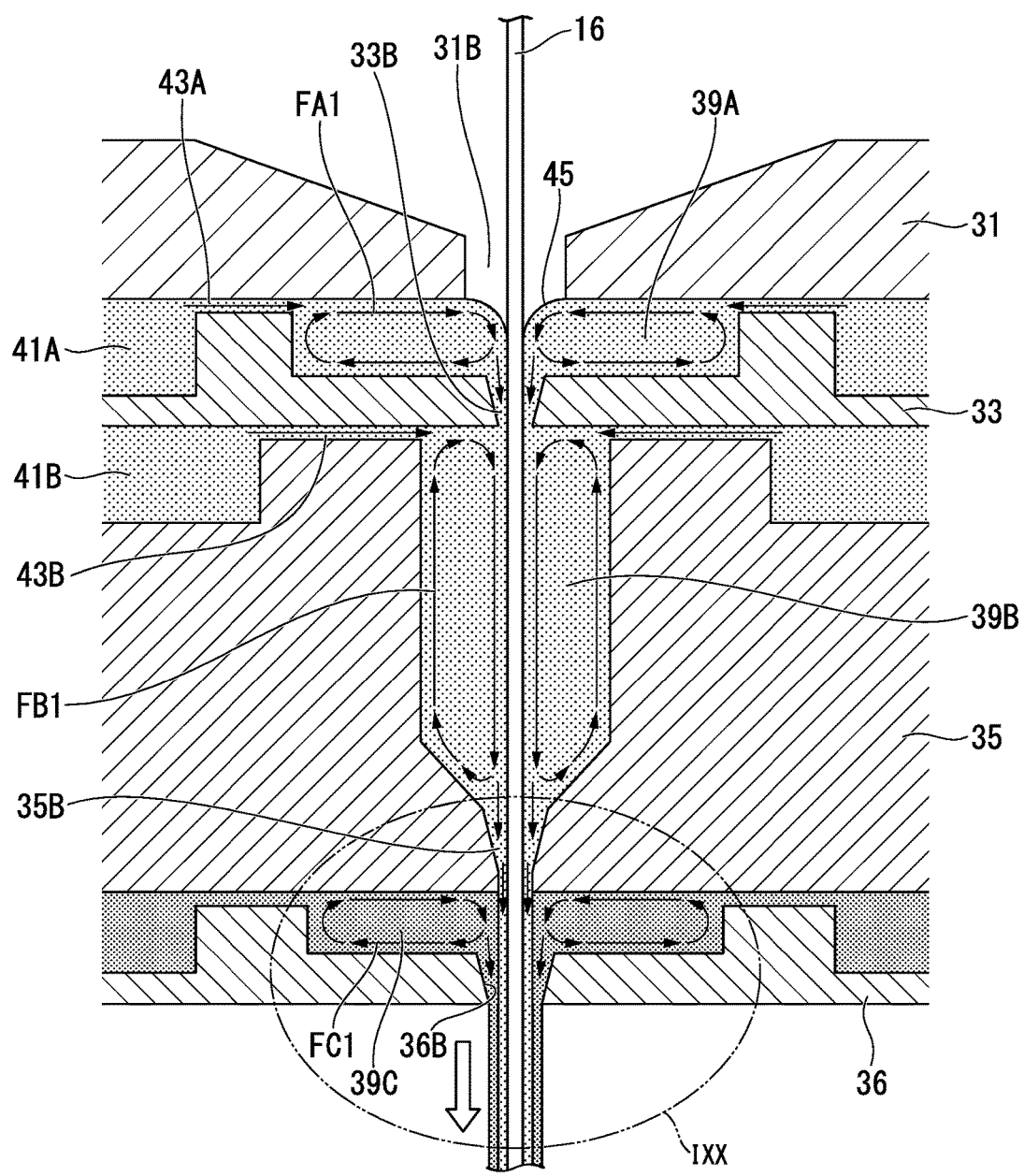
FIG. 18 is a longitudinal sectional view schematically showing the flow of resin in the coating device in a state in which a bare optical fiber is coated using the coating device of the second embodiment shown in FIG. 16.
Figure 19:
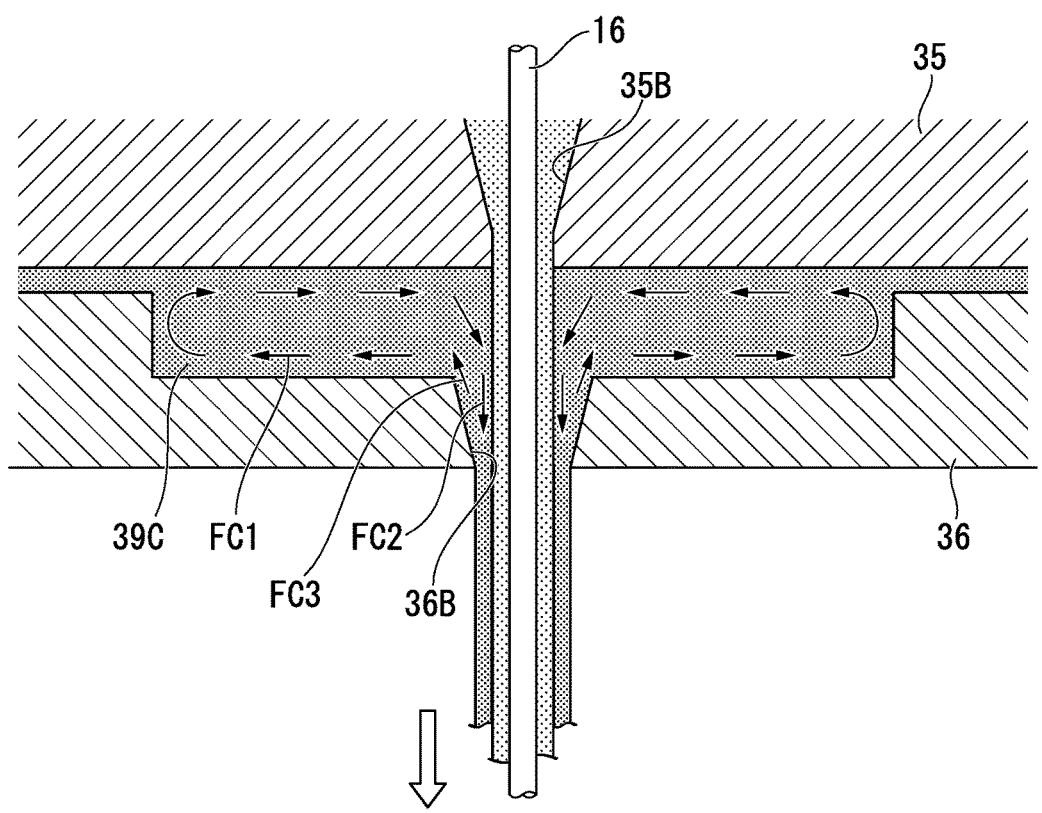
FIG. 19 is a schematic longitudinal sectional view showing a portion IXX in FIG. 16 in an enlarged manner.

FIG. 16 shows the overall configuration of the coating device 20C of the second embodiment of the present invention. FIG. 17 shows the size of each portion of the resin coating device 20C. FIG. 18 shows the overall flow of the resin in the resin coating device 20C. FIG. 19 shows the details of the flow of resin near the second coating die in the resin coating device 20C in an enlarged manner. In the following second embodiment, the same reference numerals as in the first embodiment are given to the same components as in the first embodiment shown in FIGS. 1 to 5.

In FIGS. 16 and 17, in the resin coating device 20C of the second embodiment, a nipple 31 having, for example, a horizontal disk shape overall, an intermediate die 33 having, for example, a similar horizontal disk shape overall, a first coating die 35 having, for example, a similar horizontal disk shape overall, and a second coating die 36 having, for example, a similar horizontal disk shape overall are provided from above so as to be in contact with each other in a vertical direction in this order. The nipple 31, the intermediate die 33, the first coating die 35, and the second coating die 36 are assembled so as to be in contact with each other in a vertical direction by support means, such as a holding frame (not shown), overall.

The nipple 31, the intermediate die 33, and the first coating die 35 are substantially the same as those in the case of the first embodiment already described. That is, in a central portion of the nipple 31, a bare optical fiber introduction portion 31A that is recessed in a tapered shape toward the lower side from the upper surface is formed. In a lower portion at the center of the bare optical fiber introduction portion 31A, a nipple hole 31B through which the bare optical fiber 16 is inserted from above is formed so as to penetrate it in the vertical direction.

In a central portion of the intermediate die 33, a recess 33A that is recessed downward in a circular shape with a larger diameter than the hole diameter ϕdn of the nipple hole 31B is formed. Through the recess 33A, a first resin circulation chamber 39A to be described later is partitioned and formed. In a lower portion at the center of the recess 33A in the intermediate die 33, an intermediate die hole 33B through which the bare optical fiber 16 is inserted is formed so as to penetrate therethrough in the vertical direction.

In a central portion of the first coating die 35, a recess 35A that is recessed in a circular shape from the upper surface with a larger diameter than the hole diameter ϕdm of the intermediate die hole 33B is formed. Through the recess 35A, a second resin circulation chamber 39B to be described later is partitioned and formed. In a lower portion at the center of the recess 35A in the first coating die 35, a first coating die hole 35B through which the bare optical fiber 16 is inserted is formed so as to penetrate it in the vertical direction.

In a central portion of the second coating die 36, a recess 36A that is recessed in a circular shape from the upper surface with a larger diameter than the hole diameter ϕdp of the first coating die hole 35B is formed. Through the recess

36A, a third resin circulation chamber 39C to be described later is partitioned and formed.

In a lower portion at the center of the recess 36A in the second coating die 36, a second coating die hole 36B through which the bare optical fiber 16 is inserted is formed so as to penetrate therethrough in the vertical direction.

Here, the hole diameter at the outlet of the nipple hole 31B, that is, the minimum inner diameter of the nipple hole 31B is set to a nipple hole diameter φdn. The hole diameter at the outlet of the intermediate die hole 33B, that is, the minimum inner diameter of the intermediate die hole 33B is additionally set to an intermediate die hole diameter φdm. The hole diameter at the outlet of the first coating die hole 35B, that is, the minimum inner diameter of the first coating die hole 35B, is set to a first coating die hole diameter φdp. The hole diameter at the outlet of the second coating die hole 36B, that is, the minimum inner diameter of the second coating die hole 36B, is set to a second coating die hole diameter φds. In this case, it is preferable that these hole diameters φdn, φdm, φdp, and φds satisfy the relationship of φdn>φdp>φdm and φds>φdp>φdm. More specifically, it is preferable that the intermediate die hole diameter φdm is set to be within a range of 0.17 mm to 0.23 mm in a state in which the above-described relationship is satisfied.

For the typical bare optical fiber diameter of φ125 μm, the optimal nipple hole diameter φdn is approximately 0.3 mm to 0.5 mm.

It is preferable that the first coating die hole diameter φdp is usually set to 0.2 mm to 0.25 mm.

It is preferable that the second coating die hole diameter φds is usually set to 0.26 mm to 0.45 mm.

The reason for the setting of the desirable ranges of the hole diameters will be described again later.

On the outer side of the recess 33A in the intermediate die 33, a recessed groove portion 33C that is recessed continuously from the upper surface in an annular shape in the circumferential direction is formed. Through the recessed groove portion 33C, a first resin reservoir chamber 41A is partitioned and formed. A gap 33E is formed between the upper surface of a wall portion (hereinafter, referred to as an intermediate wall portion since this also corresponds to a wall portion on the inner peripheral side of the groove portion 33C) 33D on the outer peripheral side of the recess 33A and the lower surface of the nipple 31. The gap 33E forms a first resin supply passage 43A to be described later. One or more first resin inlets 37A for introducing the resin into the recessed groove portion 33C (first resin reservoir chamber 41A) are formed at appropriate positions on the outer peripheral side of the recessed groove portion 33C. The first resin inlet 37A is shown in only one place in FIGS. 16 and 17. In practice, however, in order to introduce the resin into the first resin reservoir chamber 41A as evenly as possible in the circumferential direction, it is desirable to provide the first resin inlet 37A in a plurality of places at equal distances in the circumferential direction.

Also on the outer side of the recess 35A in the first coating die 35, a recessed groove portion 35C that is recessed continuously from the upper surface in an annular shape in the circumferential direction is formed. Through the recessed groove portion 35C, a second resin reservoir chamber 41B to be described later is partitioned and formed. A gap 35E is formed between the upper surface of a wall portion (hereinafter, referred to as an intermediate wall portion since this also corresponds to a wall portion on the inner peripheral side of the recessed groove portion 35C) 35D on the outer peripheral side of the recess 35A and the lower surface of the intermediate die 33. The gap 35E forms the second resin supply passage 43B. One or more second resin inlets 37B configured to introduce the resin into the recessed groove portion 35C (second resin reservoir chamber 41B) are formed at appropriate positions on the outer peripheral side of the recessed groove portion 35C. The second resin inlet 37B is also shown in only one place in FIGS. 16 and 17. In practice, however, in order to introduce the resin into the second resin reservoir chamber 41B as evenly as possible in the circumferential direction, it is desirable to provide the second resin inlet 37B in a plurality of places at equal distances in the circumferential direction. Instead of the second resin inlet 37B, as shown by a two-dot chain line in FIGS. 16 and 17, a fourth resin inlet 37D communicating into the second resin reservoir chamber 41B in the recessed groove portion 35C of the coating die 35 from the first resin reservoir chamber 41A in the recessed groove portion 33C may be formed in a bottom wall portion of the recessed groove portion 33C in the intermediate die 33. In this case, resin in the first resin reservoir chamber 41A is supplied to the second resin reservoir chamber 41B through the fourth resin inlet 37D.

Also on the outer side of the recess 36A in the second coating die 36, a recessed groove portion 36C that is recessed continuously from the upper surface in an annular shape in the circumferential direction is formed. By the recessed groove portion 36C, a third resin reservoir chamber 41B to be described later is partitioned and formed. A gap 36E is formed between the upper surface of a wall portion (hereinafter, referred to as an intermediate wall portion since this also corresponds to a wall portion on the inner peripheral side of the groove portion 36C) 36D on the outer peripheral side of the recess 36A and the lower surface of the first coating die 35. The gap 36E forms a third resin supply passage 43C to be described later. One or more fourth resin inlets 37D for introducing the resin into the recessed groove portion 36C (third resin reservoir chamber 41C) are formed at appropriate positions on the outer peripheral side of the recessed groove portion 36C. The fourth resin inlet 37D is also shown in only one place in FIGS. 16 and 17. In practice, however, in order to introduce the resin into the third resin reservoir chamber 41C as evenly as possible in the circumferential direction, it is desirable to provide the fourth resin inlet 37D in a plurality of places at equal distances in the circumferential direction.

Here, as shown in FIG. 2, it is desirable that a length L2 along the bare optical fiber traveling direction (vertical direction) in the second resin circulation chamber 39B is larger than a length L1 along the bare optical fiber traveling direction (vertical direction) in the first resin circulation chamber 39A. More specifically, it is preferable that the length L2 of the second resin circulation chamber 39B is 20 mm to 40 mm and the length L1 of the first resin circulation chamber 39A is 1.5 mm to 10 mm. Here, L1 corresponds to a distance between the lower surface of the nipple 31 and the bottom surface of the recess 33A of the intermediate die 33, and L2 corresponds to a distance from the lower surface of the intermediate die 33 to the bottom portion of the recess 35A of the first coating die 35.

As shown in FIG. 17, a distance between the lower surface of the first coating die 35 and the bottom surface of the recess 36A of the second coating die 36, that is, a length L3 along the bare optical fiber traveling direction (vertical direction) in the third resin circulation chamber 39C is preferably set to be as short as possible. More specifically, it is preferable that the length L3 of the third resin circulation chamber 39C is 1.0 mm to 2.0 mm.

The reason for the setting of the desirable ranges of the lengths L1, L2, and L3 and the inner diameters D1, D2, and D3 of the first resin circulation chamber 39A, the second resin circulation chamber 39B, and the third resin circulation chamber 39C will be described again later.

It is preferable that a gap S1 of the first resin supply passage 43A, a gap S2 of the second resin supply passage 43B, and a gap S3 of the third resin supply passages 43C are set within a range of 0.3 mm to 0.7 mm (that is, 0.5 mm±0.2 mm). Here, the gap S1 of the first resin supply passage 43A corresponds to the size (gap size in a direction along the traveling direction of the bare optical fiber) of the gap 33E between the lower surface of the nipple 31 and the intermediate wall portion 33D of the intermediate die 33. The gap S2 of the second resin supply passage 43B corresponds to the size (gap size in a direction along the traveling direction of the bare optical fiber) of the gap 35E between the lower surface of the intermediate die 33 and the intermediate wall portion 35D of the first coating die 35. The gap S3 of the third resin supply passage 43C corresponds to the size (gap size in a direction along the traveling direction of the bare optical fiber) of the gap 36E between the lower surface of the first coating die 35 and the intermediate wall portion 36D of the second coating die 36.

The reason for the setting of the desirable ranges of the gaps S1, S2, and S3 will be described again later.

When performing resin coating on the bare optical fiber 16 during the optical fiber manufacturing process using the resin coating device 20C of the embodiment described above, the bare optical fiber 16 is inserted into the nipple hole 31B from the side above the nipple 31, and is inserted into the intermediate die hole 33B through the first resin circulation chamber 39A. In addition, the bare optical fiber 16 is inserted into the first coating die hole 35B through the second resin circulation chamber 39B from the intermediate die hole 33B. In addition, the bare optical fiber 16 is inserted into the second coating die hole 36B through the third resin circulation chamber 39C from the first coating die hole 35B, and is pulled out downward from the lower end of the second coating die hole 36B.

On the other hand, in the coating resin, primary coating resin is introduced into the resin coating device 20C from the first and second resin inlets 37A and 37B in a liquid state, and secondary coating resin is introduced into the coating device 20 from the fourth resin inlet 37D in a liquid state.

Here, the types of the primary coating resin introduced from the first resin inlet 37A and the primary coating resin introduced from the second resin inlet 37B are usually the same. A supply source 30 of the resin introduced from the first resin inlet 37A and a supply source 30 of the resin introduced from the second resin inlet 37B may be different sources. In general, however, it is simple to guide the resin to the first and second resin inlets 37A and 37B by diverting (branching) the resin supply line outside the coating device using the same supply source 30. When forming the third resin inlet 37C instead of the second resin inlet 37B, the resin supplied to the first resin reservoir chamber 41A is diverted into the second resin circulation chamber 39B.

On the other hand, it is preferable to collectively coat two types of resin (primary coating resin and secondary coating resin) in two layers by using the secondary coating resin introduced from the fourth resin inlet 37D that is usually different from the resin introduced from the first resin inlet 37A and the primary coating resin introduced from the second resin inlet 37B.

The primary coating resin introduced into the coating device 20 from the first resin inlet 37A is supplied into the first resin reservoir chamber 41A that is partitioned and formed by the lower surface of the nipple 31 and the recessed groove portion 33A of the intermediate die 33. The resin in the first resin reservoir chamber 41A is guided into the first resin circulation chamber 39A through the first resin supply passage 43A formed by the gap 33E between the lower surface of the nipple 31 and the intermediate wall portion 33D of the intermediate die 33. The first resin supply passage 43A formed by the gap 33E is continuous in the circumferential direction.

The primary coating resin in the first resin circulation chamber 39A flows into the intermediate die hole 33B. Thus, the path of primary coating resin from the first resin inlet 37A into the intermediate die hole 33B through the first resin reservoir chamber 41A, the first resin supply passage 43A, and the first resin circulation chamber 39A is referred to as a first resin path. The primary coating resin in the first resin circulation chamber 39A is drawn out downward with the downward (vertical direction) traveling of the bare optical fiber 16, and reaches the second resin circulation chamber 39B through a gap between the inner surface of the intermediate die hole 33B and the outer peripheral surface of the bare optical fiber 16.

On the other hand, the primary coating resin introduced into the coating device 20 from the second resin inlet 37B is supplied into the second resin reservoir chamber 41B that is partitioned and formed by the lower surface of the intermediate die 33 and the recess 35A of the first coating die 35. When forming the third resin inlet 37C instead of the second resin inlet 37B, a part of primary coating resin in the first resin reservoir chamber 41A is supplied to the second resin reservoir chamber 41B through the third resin inlet 37C.

The primary coating resin in the second resin reservoir chamber 41B is guided into the second resin circulation chamber 39B through the second resin supply passage 43B formed by the gap 35E between the lower surface of the intermediate die 33 and the intermediate wall portion 35D of the first coating die 35. The second resin supply passage 43B formed by the gap 35E is continuous in the circumferential direction.

The primary coating resin in the second resin circulation chamber 39B flows into the first coating die hole 35B. Thus, the path of primary coating resin from the second resin inlet 37B (or from the third resin inlet 37C) into the coating die hole 35B through the second resin reservoir chamber 41B, the second resin supply passage 43B, and the second resin circulation chamber 39B is referred to as a second resin path. The primary coating resin in the second resin circulation chamber 39B is drawn out downward (vertical direction) with the downward traveling of the bare optical fiber 16, and is drawn into the third resin circulation chamber 39C in a secondary resin coating region of the lower portion in the resin coating device 20C through a gap between the inner surface of the first coating die hole 35B and the outer peripheral surface of the bare optical fiber 16. In other words, the bare optical fiber 16 is drawn into the secondary resin coating region of the lower portion in the resin coating device 20C in a state in which the bare optical fiber 16 is coated with resin.

Here, the first and second resin paths described above are independent from each other.

The secondary coating resin introduced into the resin coating device 20C from the fourth resin inlet 37D is supplied into the third resin reservoir chamber 41C that is partitioned and formed by the lower surface of the first coating die 35 and the recess 36A of the second coating die 36.

The secondary coating resin in the third resin reservoir chamber 41C is guided into the third resin supply passage 43C through the third resin circulation chamber 39C formed by the gap 36E between the lower surface of the first coating die 35 and the intermediate wall portion 35D of the second coating die 36. The third resin supply passage 43C formed by the gap 36E is continuous in the circumferential direction.

The secondary coating resin in the third resin circulation chamber 39C flows into the second coating die hole 36B. Thus, the path of secondary coating resin from the fourth resin inlet 37D into the coating die hole 36B through the third resin reservoir chamber 41C, the third resin supply passage 43C, and the third resin circulation chamber 39C is referred to as a third resin path herein. The secondary coating resin in the third resin circulation chamber 39C is drawn out downward with the downward traveling of the bare optical fiber 16, and is drawn to the downward outside of the resin coating device 20C through a gap between the inner surface of the second coating die hole 36B and the outer peripheral surface of the bare optical fiber 16. That is, the secondary coating resin is drawn to the downward outside of the resin coating device 20C in a state in which the bare optical fiber 16 is coated with the primary resin and the secondary resin.

Here, the first resin path, the second resin path, and the third resin path described above are independent from each other.

The flow of resin in each portion in the resin coating device 20C in the above second embodiment will be described in more detail with reference to FIGS. 18 and 19. In addition, for the same flow (flow of the primary coating resin) as the flow of the resin of each portion in the coating device 20A of the first embodiment described above, the same reference numerals as in FIGS. 3 to 5 are given.

As shown in FIG. 18, in the first resin circulation chamber 39A, the primary coating resin is drawn out downward with the downward traveling of the bare optical fiber 16 by viscous resistance between the primary coating resin and the surface of the bare optical fiber 16. As a result, a liquid surface of the primary coating resin corresponding to the inner side of the nipple hole 31B is in a downwardly recessed state. That is, a so-called meniscus 45 having a liquid surface recessed downward with the bare optical fiber 16 as the center is formed in a lower opening portion of the nipple hole 31B. At the same time, a circulation flow FA1 of the primary coating resin is formed in the first resin circulation chamber 39A. In the intermediate die hole 33B, as shown in detail in FIG. 4 already described, a flow FA2 that is drawn out to the surface of the descending bare optical fiber 16 and moves toward the second resin circulation chamber 39B from the first resin circulation chamber 39A is formed. At the same time, a part of primary coating resin drawn into the intermediate die hole 33B returns from the intermediate die hole 33B to the first resin circulation chamber 39A (return flow FA3). These flows can also be referred to as a kind of circulation flow (circulation flow in the intermediate die hole 33B). These flows FA2 and FA3 may also be referred to as circulation flows FA2 and FA3.

On the other hand, in the second resin circulation chamber 39B, with the lowering of the bare optical fiber 16, the primary coating resin convects due to viscous resistance between the primary coating resin and the surface of the bare optical fiber 16 to form a circulation flow FB1 of the primary coating resin. In the coating die hole 35B, as shown in detail in FIG. 5 already described, the flow FB2 that is drawn out to the surface of the descending bare optical fiber 16 and moves toward the lower opening end of the first coating die hole 35B from the second resin circulation chamber 39B is formed. At the same time, a part of the primary coating resin drawn into the first coating die hole 35B returns into the second resin circulation chamber 39B from the first coating die hole 35B (flow FB3). These flows FB2 and FB3 can also be referred to as a kind of circulation flow (circulation flow in the first coating die hole 35B). Hereinafter, these flows FB2 and FB3 may also be referred to as circulation flows FB2 and FB3.

In the third resin circulation chamber 39C, with the lowering of the bare optical fiber 16, the second coating resin convects due to viscous resistance between the secondary coating resin and the primary resin layer of the surface of the bare optical fiber 16 to form a circulation flow FC1 of the secondary coating resin. In the second coating die hole 36B, as shown in detail in FIG. 19, a flow FC2 that is drawn out to the surface of the descending bare optical fiber 16 and moves toward the lower opening end of the second coating die hole 36B from the third resin circulation chamber 39C is formed. At the same time, a part of the secondary coating resin drawn into the second coating die hole 36B returns into the third resin circulation chamber 39C from the second coating die hole 36B (flow FC3). These flows FC2 and FC3 can also be referred to as a kind of circulation flow (circulation flow in the second coating die hole 36B).

Here, the circulation flows FA2 and FA3 of the resin in the intermediate die hole 33B, the circulation flows FB2 and FB3 of the primary coating resin in the first coating die hole 35B, and the circulation flows FC2 and FC3 of the secondary coating resin in the second coating die hole 36B have a large influence on the variations in the coating thickness and the occurrence of thickness deviation. That is, if the circulation flows FA2 and FA3 in the intermediate die hole 33B, the circulation flows FB2 and FB3 in the first coating die hole 35B, and the circulation flows FC2 and FC3 in the second coating die hole 36B are stable over time and are uniform in the circumferential direction, variations in the coating thickness and the occurrence of thickness deviation can be limited.

Conversely, if the circulation flow of resin in the intermediate die hole 33B, the first coating die hole 35B, and the second coating die hole 36B is disturbed (changes with time) or is uneven, the risk of the occurrence of variations in the coating thickness and thickness deviation is increased. That is, in the intermediate die hole 33B, the first coating die hole 35B, and the second coating die hole 36B, the resin is drawn out by the descending bare optical fiber surface, and a flow from the upper side to the lower side of each die hole occurs. However, a portion of the resin drawn into each die hole returns to the upstream and circulates (circulation flow is generated). In this case, a resin flow (resin supply stream) from the resin supply passage merges with the flow from the upper side to the lower side of each die hole and some circulation flow that returns to the upstream. In this case, if the flow direction or the flow disturbance (flow rate or pressure in the circumferential direction is not uniform) of the resin supply stream at the merging point influences the circulation flow described above, the circulation flow changes with time (circulation flow is disturbed), and is not uniform. Accordingly, variations in the coating diameter or variations in thickness deviation in the optical fiber length direction occur.

However, in the present embodiment, circulation flows (FA1, FB1, FC1) are caused by newly providing three circulation chambers (the first resin circulation chamber 39A, the second resin circulation chamber 39B, and the third resin circulation chamber 39C) independently of each other. Therefore, it is possible to avoid a situation where the resin supply stream from the resin supply passage (the first resin supply passage 43A, the second resin supply passage 43B, and the third resin supply passage 43C) directly acts on the circulation flows FA2 and FA3 generated in the intermediate die hole 33B, the circulation flows FB2 and FB3 generated in the first coating die hole 35B, and the circulation flows FC2 and FC3 generated in the second coating die hole 36B. In this manner, interaction among the flows of [flow of resin supply stream from each resin supply passage]→[new circulation flow in each resin circulation chamber]→[circulation flow in the coating die hole] occurs. Therefore, since the influence of the resin supply stream on the circulation flow in the intermediate die hole 33B, the first coating die hole 35B, and the second coating die hole 36B, which is the most important consideration, is reduced, the circulation flow in the intermediate die hole 33B, the first coating die hole 35B, and the second coating die hole 36B is stabilized. That is, by causing each circulation flow newly, even if there is a slight variation or unevenness in the direction, flow rate, or pressure of the flow of the resin supply stream from each resin supply passage, such variations or unevenness can be corrected by the new circulation flow in each resin circulation chamber. Accordingly, it is prevented that disturbance of the circulation flow in the intermediate die hole 33B, the first coating die hole 35B, and the second coating die hole 36B is prevented. When the resin circulation chamber (the first resin circulation chamber 39A, the second resin circulation chamber 39B, the third resin circulation chamber 39C) is provided in order to cause a new circulation flow, the boundary conditions of the circulation flow are determined by the size and shape of each resin circulation chamber. Therefore, the circulation flows FA1, FB1, and FC1 in the respective resin circulation chambers can be stabilized by appropriately determining the size and shape of each resin circulation chamber. In addition, by appropriately determining the size and shape of each resin circulation chamber, it becomes easy to stabilize and equalize the circulation flows FA2 and FA3 in the intermediate die hole 33B, the circulation flows FB2 and FB3 in the first coating die hole 35B, and the circulation flows FC2 and FC3 in the second coating die hole 36B.

Thus, in the present embodiment, resin circulation chambers (the first resin circulation chamber 39A, the second resin circulation chamber 39B, the third resin circulation chamber 39C) are provided on the upstream sides of the inlet of the intermediate die hole 33B, the inlet of the first coating die hole 35B, and the inlet of the second coating die hole 36B. In addition, other circulation flows FA1, FB1, and FC1 that are different from the circulation flows FA2 and FA3 generated in the intermediate die hole 33B, the circulation flows FB2 and FB3 generated in the first coating die hole 35B, and the circulation flows FC2 and FC3 generated in the second coating die hole 36B are caused on the upstream side of the intermediate die hole inlet, the inlet of the first primary coating die hole inlet, and the second coating die hole inlet. Therefore, since the circulation flows FA2 and FA3 in the intermediate die hole 33B, the circulation flows FB2 and FB3 in the first coating die hole, and the circulation flows FC2 and FC3 in the second coating die hole are made to be stable and uniform, it is possible to minimize the variations in the coating thickness, thickness deviation, and its variation.

In the present embodiment, the merging point of the primary coating resin from the first resin supply passage 43A to the first resin circulation chamber 39A, that is, the resin outlet of the first resin supply passage 43A is located above the first resin circulation chamber 39A. For this reason, the flow direction of the primary coating resin flowing into the first resin circulation chamber 39A from the first resin supply passage 43A is a direction along the circulation flow FA1 in the first resin circulation chamber 39A. As a result, since the flow of the primary coating resin flowing into the first resin circulation chamber 39A disturbs the circulation flow FA1 in the first resin circulation chamber 39A less, it is possible to stabilize the circulation flow FA1 in the first resin circulation chamber 39A. In the present embodiment, the merging point of the primary coating resin from the second resin supply passage 43B to the second resin circulation chamber 39B, that is, the resin outlet of the second resin supply passage 43B is located above the second resin circulation chamber 39B. For this reason, the flow direction of the primary coating resin flowing from the second resin supply passage 43B to the second resin circulation chamber 39B is a direction along the circulation flow FB1 in the second resin circulation chamber 39B. As a result, since the flow of the primary coating resin flowing into the second resin circulation chamber 39B disturbs the circulation flow FB1 in the second resin circulation chamber 39B less, it is possible to stabilize the circulation flow FB1 in the second resin circulation chamber 39B.

In addition, the merging point of the secondary coating resin from the third resin supply passage 43C to the third resin circulation chamber 39C, that is, the resin outlet of the third resin supply passage 43C is located above the third resin circulation chamber 39C. For this reason, the flow direction of the secondary coating resin flowing into the third resin circulation chamber 39C from the third resin supply passage 43C is a direction along the circulation flow FC1 in the third resin circulation chamber 39C. As a result, since the flow of the secondary coating resin flowing into the third resin circulation chamber 39C disturbs the circulation flow FC1 in the third resin circulation chamber 39C less, it is possible to stabilize the circulation flow FC1 in the third resin circulation chamber 39C.

In the coating device of the present embodiment, in a place where the circulation flows FA2 and FA3 from the intermediate die hole 33B merges with the circulation flow FA1 in the first resin circulation chamber 39A, the direction of the circulation flow FA2 into the intermediate die hole 33B and the direction of the circulation flow FA3 from the intermediate die hole 33B are directions along the flow of the circulation flow FA1 in the first resin circulation chamber 39A. Therefore, disturbance of the circulation flows FA2 and FA3 at the merging point is effectively prevented. The direction of the circulation flow FB2 into the coating die hole 35B and the direction of the circulation flow FB3 from the coating die hole 35B are directions along the flow of the circulation flow FB1 in the second resin circulation chamber 39B. Therefore, the circulation flows FB2 and FB3 are effectively prevented from being disturbed at the merging point. The direction of the circulation flow FC2 into the coating die hole 35B and the direction of the circulation flow FC3 from the coating die hole 35B are directions along the flow of the circulation flow FC1 in the third resin circulation chamber 39C. Therefore, disturbance of the circulation flows FC2 and FC3 at the merging point is effectively prevented.

Assuming that the direction of the resin flow toward the die holes 33B, 35B, and 36B is toward a downstream side, in the coating device of the present embodiment, the annular resin reservoir chambers 41A, 41B, and 41C are provided on the upstream sides of the resin circulation chambers 39A, 39B, and 39C and the resin supply passages 43A, 43B, and 43C that are throttle portions toward the resin circulation chambers 39A, 39B, and 39C. That is, in the present embodiment, resin is stored in the resin reservoir chambers 41A, 41B, and 41C having a uniform (annular) shape in the circumferential direction before the resin is supplied to the resin supply passages 43A, 43B, and 43C.

By providing the resin reservoir chambers 41A, 41B, and 41C, the resin that is supplied in the circumferential direction from the resin inlets 37A, 37B, and 37D in a non-uniform state can be stored in the resin reservoir chambers 41A, 41B, and 41C (for example, when the resin flows from each of the cylindrical resin inlets arranged at four directions 90° apart). Accordingly, it is possible to evenly distribute the pressure in the circumferential direction by disturbing the flow, which has a non-uniform resin flow rate distribution or pressure distribution, in the resin reservoir chambers 41A, 41B, and 41C. In addition, the flow in the circumferential direction can be made to be uniform with good reproducibility in the resin supply passages 43A, 43B, and 43C provided after the resin reservoir chambers 41A, 41B, and 41C.

When supplying the primary coating resin into the second resin circulation chamber 39B from the second resin inlet 37B through the second resin reservoir chamber 41B and the second resin supply passage 43B while supplying the resin into the first resin circulation chamber 39A from the first resin inlet 37A through the first resin reservoir chamber 41A and the first resin supply passage 43A, it is desirable to set the pressure applied to the first resin circulation chamber 39A to be equal to or greater than the pressure applied to the second resin circulation chamber 39B in the same manner as in the first embodiment described above. That is, it is desirable to satisfy the relationship of [pressure of the first resin circulation chamber 39A]≥[pressure of the second resin circulation chamber 39B]. More preferably, it is desirable to set the pressure difference, which is calculated by [pressure of first resin circulation chamber] minus [pressure of second resin circulation chamber], within a range of 0 MPa to 0.02 MPa (that is, 0.01 MPa±0.01 MPa).

Thus, in order to cause a pressure difference between the first resin circulation chamber 39A and the second resin circulation chamber 39B, when supplying the primary 15 coating resin from separate resin supply sources 30, it is preferable to cause a difference in the resin supply pressure between the primary coating resin supply sources 30. When supplying the resin from the same primary coating resin supply source 30, pressure adjustment means in the resin flow path before the supply of resin to the resin supply passage is preferably provided after the branch location in the supply line from the one 20 primary coating resin supply source 30. Alternatively, the flow path sectional area or the flow path length may be changed in the resin flow path before the supply of resin to the resin supply passage (mainly until the resin reservoir chamber) similarly after the branch location. The reason why it is desirable to cause a pressure difference as described above will be described again later.

Next, desirable conditions and the reasons for the size, shape, and pressure in each portion in the coating device of the second embodiment will be described.

For the length L1 of the first resin circulation chamber 39A and the length L2 of the second resin circulation chamber 39B, it is desirable to set the length L2 of the second resin circulation chamber 39B to be larger than the length L1 of the first resin circulation chamber 39A in the same manner as in the first embodiment described above.

More specifically, it is preferable that the length L2 of the second resin circulation chamber 39B is 20 mm to 40 mm and the length L1 of the first resin circulation chamber 39A is 1.5 mm to 10 mm. The reason is the same as already described in the first embodiment.

In addition, it is preferable to set the length L3 of the third resin circulation chamber 39C as short as possible. More specifically, it is preferable that the length L3 of the third resin circulation chamber 39C is 1.0 mm to 2.0 mm. The reason is as follows.

The third resin circulation chamber 39C between the lower outlet of the first coating die hole 35B and the upper inlet of the second coating die hole 36B is not relevant to the meniscus generation. However, the inside of the third resin circulation chamber 39C is also a region, through which a primary resin coating layer in a liquid state before the curing passes, in the second resin coating region. For this reason, even a slight disturbance of the resin flow influences the primary resin coating layer after coating. In order to reduce the influence on the primary resin coating layer, it is preferable to set the length L3 of the third resin circulation chamber 39C to be short. In this case, as shown in Example 8 to be described later, if L3 is 2.0 mm or less, the influence of the primary resin coating layer on the flow of the circulation flow FC1 in the third resin circulation chamber 39C is small. In contrast, if L3 is shorter than 1.0 mm, the length of contact between the liquid primary resin coating layer and the liquid secondary resin in the secondary resin coating region becomes too short. Therefore, since it becomes difficult to perform stable coating, this is not desirable.

It is preferable to set the inner diameter D1 of the first resin circulation chamber 39A to 5 mm±2 mm. It is preferable to set the inner diameter D2 of the second resin circulation chamber 39B to 3 mm±1 mm. It is preferable to set the inner diameter D3 of the third resin circulation chamber 39C to 15 mm±5 mm. The reason is as follows.

In order to stabilize the circulation flow FA1 in the first resin circulation chamber 39A, the circulation flow FB1 in the second resin circulation chamber 39B, and the circulation flow FC1 in the third resin circulation chamber 39C, it is desirable to ensure that only one circulation flow is generated in each of the chambers. When two or more circulation flows are generated in one resin circulation chamber, the circulation flows are generated in an unstable state. Accordingly, the shape or distribution of each circulation flow is changed due to disturbances, such as variations in the bare fiber diameter, and this has an adverse effect on the circulation flow in each of the die holes 33B, 35B, and 36B. Specifically, the coating diameter changes suddenly, or the amount of thickness deviation changes. In particular, when the inner diameters D1, D2, and D3 of the resin circulation chambers 39A, 39B, and 39C are large, two or more circulation flows are likely to be generated in an unstable state. In this case, as shown in Examples 9 and 10 to be described later, in order to cause only one circulation flow in the first resin circulation chamber 39A, it is preferable that the inner diameter D1 of the first resin circulation chamber 39A be set to 5 mm±2 mm. In addition, in order to cause only one circulation flow in the second resin circulation chamber 39B, it is preferable that the inner diameter D2 of the second resin circulation chamber 39B be set to 3 mm±1 mm. In addition, in order to cause only one circulation flow in the third resin circulation chamber 39C, it is preferable that the inner diameter D3 of the third resin circulation chamber 39C be set to 15 mm±5 mm.

For the optimal ranges of the nipple hole diameter ϕdn, the intermediate die hole diameter ϕdm, the first coating die hole diameter ϕdp, and the second coating die hole diameter ϕds, it is desirable to satisfy the relationship of ϕdn>ϕdp>ϕdm and ϕds>ϕdp>ϕdm. In particular, by making the intermediate die hole diameter ϕdm smaller than the first coating die hole diameter ϕdp, it is possible to forcibly shorten the meniscus. The first coating die hole diameter ϕdc is determined by the primary coating diameter according to the diameter of the coating diameter of the product. On the other hand, in order to avoid the risk of contact with the bare optical fiber, it is necessary to set the nipple hole diameter ϕdn to a relatively large diameter. In this case, the nipple hole diameter ϕdn is usually set to be larger than the first coating die hole diameter ϕdp. Although the second coating die hole diameter ϕds is determined by the coating diameter of the product, ϕds>ϕdp is assumed since the secondary coating diameter is usually larger than the primary coating diameter.

As specific optimal ranges of these hole diameters, it is preferable that the intermediate die hole diameter ϕdm is set to be within a range of 0.17 mm to 0.23 mm in a state in which the above-described relationship is satisfied. By setting the intermediate die hole diameter ϕdm within the above range, as shown in Example 15 to be described later, good coating conditions can be obtained by limiting the amount of eccentricity including a variation to less than 5 μm.

The nipple hole diameter ϕdn may be appropriately determined according to the bare optical fiber diameter. That is, if the nipple hole diameter ϕdn is too small, there is a possibility of contact with the bare optical fiber. Accordingly, for the typical bare optical fiber diameter of ϕ125 μm, the optimal nipple hole diameter ϕdn is approximately 0.3 mm to 0.5 mm, as shown in Example 15.

The first coating die hole diameter ϕdp may be appropriately selected according to the characteristics (mainly, viscosity) of the resin to be used, bare optical fiber diameter, bare optical fiber temperature, and drawing speed. It is preferable that the first coating die hole diameter ϕdp is usually set to 0.20 mm to 0.25 mm. Similarly, the second coating die hole diameter ϕds may also be appropriately selected according to the characteristics (mainly, viscosity) of the resin to be used, bare optical fiber diameter, bare optical fiber temperature, and drawing speed. It is preferable that the second coating die hole diameter ϕds is usually set to 0.26 mm to 0.45 mm.

It is preferable that a gap S1 of the first resin supply passage 43A, a gap S2 of the second resin supply passage 43B, and a gap S3 of the third resin supply passages 43C are set within a range of 0.3 mm to 0.7 mm (that is, 0.5 mm±0.2 mm). The reason is as follows.

The resin supply passages 43A, 43B, and 43C serve as throttle portions that make the flow of the resin uniform in the circumferential direction when the resin flows into the resin circulation chambers 39A, 39B, and 39C by uniformly squeezing the flow of the resin when supplying the resin to the resin circulation chambers 39A, 39B, and 39C. In order for the circulation flows FA1, FB1, and FC1 in the resin circulation chambers 39A, 39B, and 39C to be disturbed as little as possible when the resin flows into the resin circulation chambers 39A, 39B, and 39C from the resin supply passages 43A, 43B, and 43C, it is desirable that no circulation flow be generated in the resin supply passages 43A, 43B, and 43C. For the same reason, it is desirable that the resin circulation chamber side opening positions (positions of resin flows to the resin circulation chambers 39A, 39B, and 39C) of the resin supply passages 43A, 43B, and 43C are above the resin circulation chambers 39A, 39B, and 39C as already described.

Here, if the gaps S1, S2, and S3 of the resin supply passages 43A, 43B, and 43C are too narrow, not only is the pressure loss of the resin passing therethrough increased, but also the pressure distribution and flow rate distribution of the resin in the circumferential direction become uneven. In addition, if the gaps S1, S2, and S3 are too wide, action that makes the pressure and flow of the resin uniform in the circumferential direction is reduced. Accordingly, there is a possibility that the non-uniformity of the flow of the resin in the circumferential direction occurring on the upstream side will be reflected as it is. When the gaps S1, S2, and S3 are too wide, a circulation flow is generated in the resin supply passages 43A, 43B, and 43C. As a result, the circulation flow and the circulation flows FA1, FB1, and FC1 in the resin circulation chambers 39A, 39B, and 39C interact with each other, and the flow of the resin in the resin circulation chambers 39A, 39B, and 39C is likely to be disturbed in the circumferential direction. Specifically, the optical range of each gap is 0.5 mm±0.2 mm. In this case, as shown in Example 12 to be described later, if the gaps S1, S2, and S3 of the resin supply passages 43A, 43B, and 43C are within a range of 0.3 mm to 0.7 mm (that is, 0.5 mm±0.2 mm), the circulation flows FA1, FB1, and FC1 in the resin circulation chambers 39A, 39B, and 39C can be stabilized without causing the adverse effects described above.

Regarding the resin pressure in the resin circulation chambers 39A and 39B, it is desirable that the pressure applied to the first resin circulation chamber 39A is set to be equal to or greater than the pressure applied to the second resin circulation chamber 39B in the same manner as in the first embodiment described above. That is, it is desirable to satisfy the relationship of [pressure of the first resin circulation chamber 39A]≥[pressure of the second resin circulation chamber 39B]. More preferably, as shown in Example 11 to be described later, it is desirable to set the pressure difference, which is calculated by [pressure of first resin circulation chamber] minus [pressure of second resin circulation chamber], within a range of 0 MPa to 0.02 MPa (that is, 0.01 MPa±0.01 MPa).

By setting the pressure difference between the resin circulation chambers 39A and 39B in this manner, the pressure of the first resin circulation chamber 39A on a side where a meniscus is caused becomes slightly higher than the pressure of the second resin circulation chamber 39B. Therefore, it is possible to shorten the meniscus. It is possible to prevent the occurrence of a resin flow that flows back (returns) into the first resin circulation chamber 39 from the second resin circulation chamber 39B through the intermediate die hole 33B.

Hereinafter, Examples 7 to 15 as a basis that has led to the setting of the above desirable condition ranges for the size or the pressure of each portion in the coating device of the second embodiment will be described.

Example 7

Example 7 is an example used to examine the influence of the length L1 of the first resin circulation chamber 39A and the length L2 of the second resin circulation chamber 39B. When manufacturing the optical fiber 24 using the optical fiber manufacturing apparatus shown in FIG. 24, the device shown in FIG. 24 was used as the coating device 20C. That is, as shown in FIG. 24, a two-layer collective coating method was applied in which coating and curing were performed in one place using one resin coating device 20C and one UV curing device 22C. That is, the optical fiber preform was heated and melted in the heating furnace and the bare optical fiber of ϕ125 μm was pulled out, and then the bare optical fiber was cooled to the appropriate temperature by the cooling device. Then, first layer coating (primary coating) and second layer coating (secondary coating) were collectively performed by coating the bare optical fiber with an ultraviolet curable resin using a coating device, and the primary resin coating layer and the secondary resin coating layer were collectively cured, thereby manufacturing the optical fiber.

Coating parameters that are common in Examples 7 to 15 are shown in Tables 2 and 3. In addition, the drawing speed was set to 2500 m/min, and the coating diameters were set to ϕ200 μm/ϕ250 μm in the primary resin layer/secondary resin layer.

coating method, and the value of the amount of eccentricity of the primary resin coating layer in the manufactured optical fiber was 100-m measured at intervals of 1 m (accordingly, measured a total of 100 times). In addition, the standard deviation of the values of the amount of eccentricity in the 100 measurements was calculated, and the variation in the amount of eccentricity was evaluated based on the standard deviation. PK2401 made by photonkinetics Co. was used for measurement.

In Example 7, in the same manner as in Example 1, the lengths L1 and L2 of the first and second resin circulation chambers 39A and 39B were changed independently in order to check the optimal ranges. That is, the length L1 of the first resin circulation chamber 39A was changed to be within a range of 0.5 mm to 20 mm in a state in which the length L2 of the second resin circulation chamber 39B was fixed to 30 mm, and the length L2 of the second resin

TABLE 2

| Experimental example NO. | Inner diameter of first circulation chamber: D1 [mm] | Length of first circulation chamber: L1 [mm] | Inner diameter of second circulation chamber: D2 [mm] | Length of second circulation chamber: L2 [mm] | Inner diameter of third circulation chamber: D3 [mm] | Length of third circulation chamber: L3 [mm] | (Pressure of first circulation chamber) − (pressure of second circulation chamber) [MPa] |
|---|---|---|---|---|---|---|---|
| 11 | 5 | 0.5~20 | 3 | 0.5~50 | 15 | 1 | 0.01 |
| 12 | 2~10 | 2 | 1~10 | 30 | 15 | 1 | 0.01 |
| 13 | 5 | 2 | 3 | 30 | 15 | 1 | −0.01~+0.01 |
| 14 | 5 | 2 | 3 | 30 | 15 | 1 | 0.01 |
| 15 | 5 | 2 | 3 | 30 | 15 | 1 | 0.01 |
| 16 | 5 | 2 | 3 | 30 | 15 | 1 | 0.01 |
| 17 | 5 | 2 | 3 | 30 | 15 | 0.3~5.0 | 0.01 |
| 18 | 5 | 2 | 3 | 30 | 5~25 | 1 | 0.01 |
| 19 | 5 | 2 | 3 | 30 | 15 | 1 | 0.01 |

TABLE 3

| Experimental example NO. | Nipple hole diameter: ϕdn [mm] | Intermediate die hole diameter: ϕdm [mm] | Coating die hole diameter: P/S [mm] | First resin supply passage gap: S1 [mm] | Second resin supply passage gap: S2 [mm] | Third resin supply passage gap: S3 [mm] | First resin reservoir chamber | Second resin reservoir chamber | Third resin reservoir chamber |
|---|---|---|---|---|---|---|---|---|---|
| 11 | 0.4 | 0.2 | 0.25/0.35 | 0.5 | 0.5 | 0.5 | present | present | present |
| 12 | 0.4 | 0.2 | 0.25/0.35 | 0.5 | 0.5 | 0.5 | present | present | present |
| 13 | 0.4 | 0.2 | 0.25/0.35 | 0.5 | 0.5 | 0.5 | present | present | present |
| 14 | 0.4 | 0.2 | 0.25/0.35 | 0.1~2 | 0.1~2 | 0.1~2 | present | present | present |
| 15 | 0.4 | 0.2 | 0.25/0.35 | 0.5 | 0.5 | 0.5 | present/none | present/none | present |
| 16 | 0.15~0.6 | 0.15~0.3 | 0.25/0.35 | 0.5 | 0.5 | 0.5 | present | present | present |
| 17 | 0.4 | 0.2 | 0.25/0.35 | 0.5 | 0.5 | 0.5 | present | present | present |
| 18 | 0.4 | 0.2 | 0.25/0.35 | 0.5 | 0.5 | 0.5 | present | present | present |
| 19 | 0.4 | 0.2 | 0.25/0.35 | 0.5 | 0.5 | 0.5 | present | present | present/none |

In Example 7, relative merits regarding the coating condition of the primary resin coating when changing the lengths L1 and L2 of the first and second resin circulation chambers 39A and 39B were evaluated.

As a method of evaluating the coating conditions of the primary resin coating, a difference between the maximum thickness and the minimum thickness of a primary resin coating layer 50 in the cross-section of the optical fiber obtained by forming the coating layer of two-layer coating on the bare optical fiber was set as the amount of eccentricity [μm], and the evaluation was performed based on the amount of eccentricity.

The specific experiment method was the same as in Example 1 in the first embodiment for the independent circulation chamber 39B was changed to be within a range of 0.5 mm to 50 mm in a state in which the length L1 of the first resin circulation chamber 39A was fixed to 2 mm.

The measurement results of the amount of eccentricity of the primary resin coating layer when changing the length L1 of the first resin circulation chamber 39A in a state in which the length L2 of the second resin circulation chamber 39B was fixed were substantially the same as the result of Example 1 shown in FIG. 7. In addition, the measurement results of the amount of eccentricity when changing the length L2 of the second resin circulation chamber 39B in a state in which the length L1 of the first resin circulation chamber 39A was fixed were substantially the same as the results of Example 1 shown in FIG. 8.

Therefore, according to Example 7, similar to the evaluation in Example 1 of the first embodiment for the independent coating method, also in the second embodiment for the two-layer collective coating method, it became clear that the optimal range of the length L1 of the first resin circulation chamber 39A was within a range of 1.5 mm to 10 mm and the optimal range of the length L2 of the second resin circulation chamber 39B was within a range of 20 mm to 40 mm.

Example 8

Example 8 is an example used to examine the influence of the length L3 of the third resin circulation chamber 39A.

Figure 20:
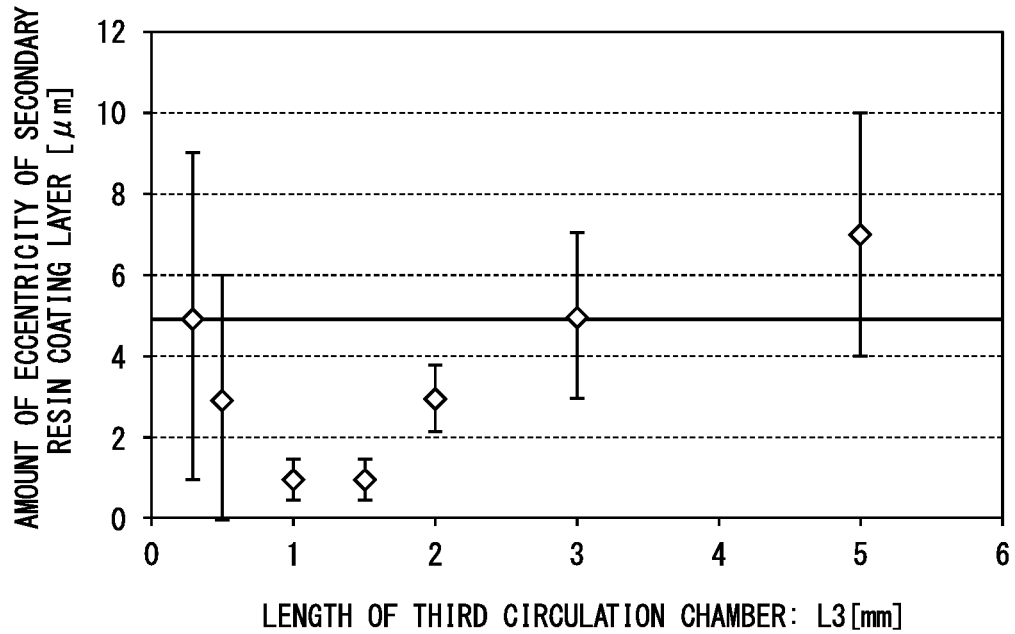
FIG. 20 is a graph showing the relationship between the length L3 of a third resin circulation chamber and the amount of eccentricity as experimental results in Example 8.

From Example 7 described above, the optimal ranges of the lengths L1 and L2 of the respective circulation chambers were obtained. Therefore, in Example 8, only the length L3 of the third resin circulation chamber 39C was changed independently in order to check the optimal range. That is, the length L3 of the third resin circulation chamber 39C was changed to be within a range of 0.3 mm to 5.0 mm in a state in which the length L1 of the first resin circulation chamber 39A was fixed to 2 mm and the length L2 of the second resin circulation chamber 39B was fixed to 30 mm, and the amount of eccentricity and the variation for the secondary resin coating layer were examined. The result is shown in FIG. 20. Here, for the amount of eccentricity of the secondary resin coating layer, a difference between the maximum thickness and the minimum thickness of a secondary resin coating layer in the cross-section of the optical fiber 24 obtained by forming the coating layer of two-layer collective coating on the bare optical fiber was set as the amount of eccentricity according to the amount of eccentricity Ec shown in FIG. 6.

Common coating parameters are shown in Tables 2 and 3. Other drawing conditions and evaluation items were the same as those in Example 7.

As shown in FIG. 20, it became clear that, when the length L3 of the third resin circulation chamber 39C was within a range of 1.0 mm to 2.0 mm, the amount of eccentricity of the secondary resin coating layer including variation was less than 5 μm and accordingly good coating was possible. In contrast, it became clear that, when the length L3 of the third resin circulation chamber 39C was 0.5 mm and when the length L3 of the third resin circulation chamber 39C was larger than 2.0 mm, the amount of eccentricity of the secondary resin coating layer including a variation was 5 μm or more and accordingly the coating condition became worse. When the length L3 of the third resin circulation chamber 39C is less than 1.0 mm, the circulation flow is too short. Accordingly, the length of contact between the secondary resin and the primary resin coating layer in a liquid state in the third resin circulation chamber 39C is too short due to the influence of the high drawing speed. Therefore, since the circulation flow in the resin circulation chamber 39C is not stable, it is considered that the variation in the amount of eccentricity of the secondary resin coating layer is large and the amount of eccentricity itself is large. When the length L3 of the third resin circulation chamber 39C is larger than 2.0 mm, the distance of the circulation chamber is too long. Accordingly, the length of contact between the secondary resin and the primary resin coating layer in a liquid state becomes too long. It is considered that, as a result, the primary resin coating layer is adversely affected and the coating conditions become worse. Here, when the length L3 is 0.5 mm, the length of the third resin circulation chamber 39C also becomes the same as that of the gap of the third resin supply passages 43C. Accordingly, this case can be said to be a state in which there is no substantial circulation chamber (correspond to a conventional example). Also in this case, at the high drawing speed, such as a drawing speed of 2500 m/min, if there is a difference even slightly in the flow of the resin in the circumferential direction, the influence on the amount of eccentricity is increased. Accordingly, the amount of eccentricity including a variation is increased.

Therefore, from the result of Example 8 described above, it became clear that the optimal range of the length L3 of the third resin circulation chamber 39C was within a range of 1.0 mm to 2.0 mm.

Example 9

Example 9 is an example to examine the influence of the inner diameter D1 of the first resin circulation chamber 39A and the inner diameter D2 of the second resin circulation chamber 39B.

Also in Example 9, in the same manner as in Example 7 described above, as shown in FIG. 24, a two-layer collective coating method was applied in which coating and curing were performed in one place using one resin coating device 20C and one UV curing device 22C.

Here, the optimal ranges of the lengths L1 and L2 of the respective circulation chambers were obtained by Example 7 described above. Therefore, in Example 9, in the same manner as in Example 2 described above, the inner diameters D1 and D2 of the first and second resin circulation chambers 39A and 39B were changed independently in order to check the optimal ranges. That is, the inner diameter D1 of the first resin circulation chamber 39A was changed to be within a range of 2 mm to 10 mm in a state in which the inner diameter D2 of the second resin circulation chamber 39B was fixed to ϕ3 mm. The inner diameter D2 of the second resin circulation chamber 39B was changed to be within a range of 1 mm to 10 mm in a state in which the inner diameter D1 of the first resin circulation chamber 39A was fixed to ϕ5 mm. Common coating parameters are shown in Tables 2 and 3. Other drawing conditions and evaluation items were the same as those in Example 7.

The measurement results of the amount of eccentricity of the primary resin coating layer when changing the inner diameter D1 of the first resin circulation chamber 39A in a state in which the inner diameter D2 of the second resin circulation chamber 39B was fixed were substantially the same as the results of Example 2 shown in FIG. 9. In addition, the measurement results of the amount of eccentricity of the primary resin coating layer when changing the inner diameter D2 of the second resin circulation chamber 39B in a state in which the inner diameter D1 of the first resin circulation chamber 39A was fixed were substantially the same as the results of Example 2 shown in FIG. 10.

Therefore, according to Example 9, similar to the evaluation in Example 2 of the first embodiment for the independent coating method, also in the second embodiment for the two-layer collective coating method, it became clear that the optimal range of the inner diameter D1 of the first resin circulation chamber 39A was within a range of 3 mm to 7 mm (that is, ϕ5 mm±ϕ2 mm) and the optimal range of the inner diameter D2 of the second resin circulation chamber 39B was within a range of 2 mm to 4 mm (that is, ϕ3 mm±ϕ1 mm).

Example 10

Example 10 is an example to examine the influence of the inner diameter D3 of the third resin circulation chamber 39A.

Figure 21:
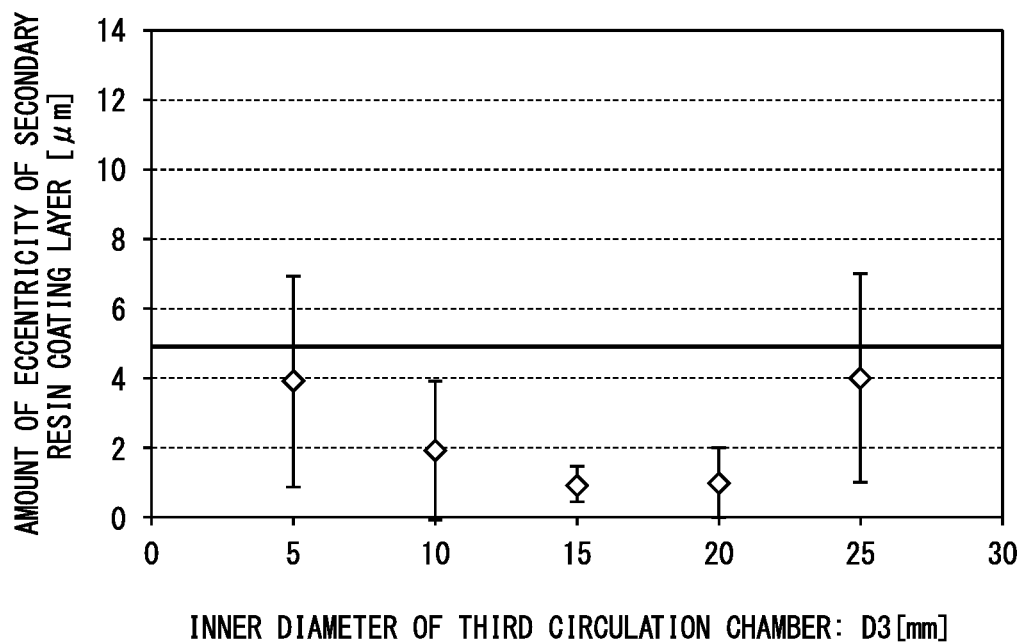
FIG. 21 is a graph showing the relationship between the inner diameter D3 of the third resin circulation chamber and the amount of eccentricity as experimental results in Example 10.

The optimal ranges of the inner diameter D1 of the first resin circulation chamber 39A and the inner diameter D2 of the second resin circulation chamber 39B were obtained using Example 9 described above. Therefore, in Example 10, only the inner diameter D3 of the third resin circulation chamber 39A was changed independently in order to check the optimal range. That is, the inner diameter D3 of the third resin circulation chamber 39C was changed to be within a range of 5 mm to 25 mm in a state in which the inner diameter D1 of the first resin circulation chamber 39A was fixed to φ5 mm and the inner diameter D2 of the second resin circulation chamber 39B was fixed to φ3 mm, and the amount of eccentricity and the variation for the secondary resin coating layer were examined. The result is shown in FIG. 21. Common coating parameters are shown in Tables 2 and 3. Other drawing conditions and evaluation items were the same as those in Example 7.

As shown in FIG. 21, it became clear that, when the inner diameter D3 of the third resin circulation chamber 39C was within a range of 10 mm to 20 mm (that is, φ15 mm±φ5 mm), the amount of eccentricity including a variation was less than 5 μm for the secondary resin coating layer and accordingly good coating conditions were obtained. On the other hand, it became clear that, when the inner diameter D3 of the third resin circulation chamber 39C was less than 10 mm and when the inner diameter D3 of the third resin circulation chamber 39C was larger than 20 mm, the amount of eccentricity including a variation was 5 μm or more for the secondary resin coating layer and accordingly the coating conditions became worse. The length L3 of the third resin circulation chamber 39C is in a range shorter than the length L1 of the first resin circulation chamber 39A and the length L2 of the second resin circulation chamber 39B. Therefore, when the inner diameter D3 of the third resin circulation chamber 39C is less than 10 mm, the amount of the circulation flow in the third resin circulation chamber 39C is small. Accordingly, resistance against the circulation of the secondary resin is increased, and this has an influence on the unstable circulation. On the other hand, when the inner diameter D3 of the third resin circulation chamber 39C is larger than 20 mm, it is thought that the circulation flow in the third resin circulation chamber 39C becomes unstable since the circulation chamber is too large. In some cases, it can also be considered that two circulation flows are generated in the third resin circulation chamber 39C.

From Example 10 described above, it became clear that the optimal range of the inner diameter D3 of the third resin circulation chamber 39C was within a range of 10 mm to 20 mm (that is, 15 mm±5 mm).

Example 11

Example 11 is an example used to examine the influence of the internal pressure of the first and second resin circulation chambers 39A and 39B.

That is, in the optimal size of each circulation chamber determined in Examples 7 to 11 described above, the amount of eccentricity and the variation when changing the difference between the resin pressure applied to the first circulation chamber and the resin pressure applied to the second circulation chamber were examined.

Also in Example 11, in the same manner as in Example 7 described above, as shown in FIG. 24, a two-layer collective coating method was applied in which coating and curing were performed in one place using one resin coating device 20C and one UV curing device 22C.

Here, when supplying the primary coating resin, in the same manner as in Example 3 described above, a system was used that supplied the primary resin in a liquid state toward the first and second resin circulation chambers 39A and 39B in the resin coating device from the same resin supply source 30 and supplied the resin to each of the resin circulation chambers 39A and 39B through branching in the resin coating device. Resin supply pressure to the first resin circulation chamber 39A and resin supply pressure to the second resin circulation chamber 39B were adjusted by applying a pressure loss intentionally by adjusting the flow path sectional area or the flow path length in the resin flow path before the supply of resin to the resin supply passage (mainly until the resin reservoir chamber). Common coating parameters are shown in Tables 2 and 3. Other drawing conditions and evaluation items were the same as those in Example 7. The changeable range of primary resin pressure was set such that the pressure difference P1, that is, the value of P1, which is calculated by [pressure of first resin circulation chamber 39A] minus [pressure of second resin circulation chamber 39B], was within a range of −0.1 MPa to 0.1 MPa. As a result, it was confirmed that the result was substantially the same as the result of Example 3 shown in FIG. 11.

Therefore, according to Example 11, similar to the evaluation in Example 3 of the first embodiment for the independent coating method, also in the second embodiment for the two-layer collective coating method, it was confirmed that, when the value of the pressure difference P1 was within a range of 0 MPa to 0.02 MPa (that is, 0.01 MPa±0.01 MPa), the amount of eccentricity including a variation was less than 5 μm and good coating conditions were thereby obtained.

From Example 11 described above, it became clear that the optimal range of the pressure difference P1, which is calculated by, [pressure of first resin circulation chamber 39A] minus [pressure of second resin circulation chamber 39B], was within a range of 0 MPa to 0.02 MPa (that is, 0.01 MPa±0.01 MPa).

Example 12

Example 12 is an example used to examine the influence of the gap S1 of the first resin supply passage 43A, the gap S2 of the second resin supply passage 43B, and the gap S3 of the third resin supply passages 43C.

Also in Example 12, in the same manner as in Example 7 described above, as shown in FIG. 24, a two-layer collective coating method was applied in which coating and curing were performed in one place using one resin coating device 20C and one UV curing device 22C.

In Example 12, in the optimal size of each circulation chamber determined in Examples 7 to 10 described above, the amount of eccentricity and the variation when changing the gap S1 of the first resin supply passage 43A, the gap S2 of the second resin supply passage 43B, and the gap S3 of the third resin supply passages 43C were examined. Here, the gap S1 of the first resin supply passage 43A, the gap S2 of the second resin supply passage 43B, and the gap S3 of the third resin supply passages 43C are independent from each other. For this reason, all of the gaps were set to have the same size, and the changeable range was set within a range of 0.1 mm to 2 mm. Common parameters are shown in Tables 2 and 3. Other drawing conditions and evaluation items were the same as those in Example 7.

As a result, it was confirmed that the influence the gap S1 of the first resin supply passage 43A and the gap S2 of the second resin supply passage 43B the amount of eccentricity of the primary resin coating layer was substantially the same as the result of Example 4 shown in FIG. 12. In addition, the influence of the gap S3 of the third resin supply passages 43C on the amount of eccentricity of the secondary resin coating layer was the same as that shown in FIG. 22.

Figure 22:
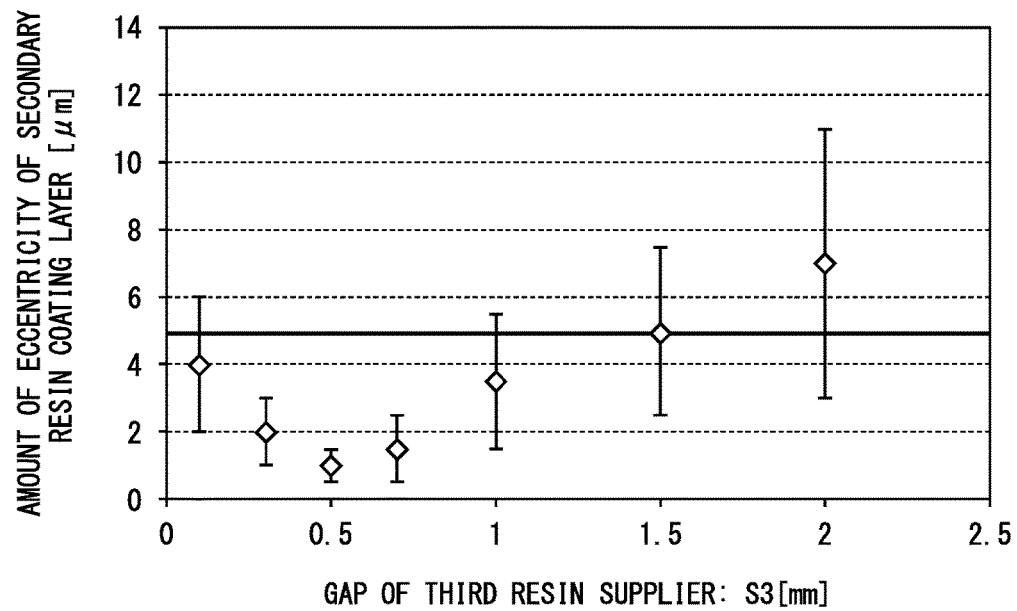
FIG. 22 is a graph showing the relationship between a gap S3 of the third resin supply passage and the amount of eccentricity in the experimental results in Example 12.

From the results shown in FIGS. 12 and 22, it became clear that, when the gaps S1, S2, and S3 of the first, second, and third resin supply passages 43A, 43B, and 43C were within a range of 0.3 mm to 0.7 mm (that is, 0.5 mm±0.2 mm), the amount of eccentricity including variation was less than 5 µm and thereby good coating conditions were obtained. On the other hand, when the gaps S1, S2, and S3 of the first, second, and third resin supply passages 43A, 43B, and 43C were less than 0.3 mm and when the S1, S2, and S3 of the first, second, and third resin supply passages 43A, 43B, and 43C exceeded 0.7 mm, it was found that the amount of eccentricity including a variation became large. When the gaps S1, S2, and S3 of the first, second, and third resin supply passages 43A, 43B, and 43C are less than 0.3 mm, a pressure loss occurring when the resin passes through the gaps is large. Accordingly, the non-uniformity of the pressure distribution in the circumferential direction is thought to be the cause of an increase in the amount of eccentricity including a variation. On the other hand, when the gaps S1, S2, and S3 of the first, second, and third resin supply passages 43A, 43B, and 43C exceed 0.7 mm, the pressure loss occurring when the resin flows into each circulation chamber is too small. For this reason, the effect of making the flow of the resin in the circumferential direction uniform in each resin supply passage is reduced, and accordingly, the flow rate distribution in the circumferential direction becomes non-uniform. The non-uniformity of the flow rate distribution is thought to be the cause of an increase in the amount of eccentricity including variation.

From Example 12 described above, it became clear that the optimal ranges of the gaps S1, S2, and S3 of the first, second, and third resin supply passages 43A, 43B, and 43C were within a range of 0.3 mm to 0.7 mm (that is, 0.5 mm±0.2 mm).

Example 13

Example 13 is an example used to examine the influence of the presence of the first and second resin reservoir chambers 41A and 41B.

Also in Example 13, in the same manner as in Example 7 described above, as shown in FIG. 24, a two-layer collective coating method was applied in which coating and curing were performed in one place using one resin coating device 20C and one UV curing device 22C.

In Example 13, the amount of eccentricity of the primary resin coating layer and the variation were examined in a case where the first and second resin reservoir chambers 41A and 41B were provided and a case where the first and second resin reservoir chambers 41A and 41B were not provided. Common coating parameters are shown in Tables 2 and 3. Other drawing conditions and evaluation items were the same as those in Example 7.

As a result, it was confirmed that the result was substantially the same as in Example 5 in the case of the independent coating method. That is, when the first and second resin reservoir chambers 41A and 41B are provided, the primary resin coating layer has an amount of eccentricity of about 1 µm including variation of a standard deviation of about 0.5 µm, as in each example described above. In contrast, when the first and second resin reservoir chambers 41A and 41B were not provided, the primary resin coating layer had an amount of eccentricity of about 3 µm including variation of a standard deviation of about 2 µm. Each of the first and second resin reservoir chambers 41A and 41B has an effect of dispersing the non-uniform resin pressure before the resin reservoir chamber. Accordingly, the uniformity of the pressure in each of the first and second resin supply passages 43A and 43B is also achieved by forming the first and second resin reservoir chambers 41A and 41B.

Example 14

Example 14 is an example used to examine the influence of the presence of the third resin reservoir chamber 41C.

That is, the amount of eccentricity of the secondary resin coating layer and the variation were examined for a case where the third resin reservoir chamber 41C is provided and a case where the third resin reservoir chamber 41C is not provided. Common coating parameters are shown in Tables 2 and 3. Other drawing conditions and evaluation items were the same as those in Example 7.

As a result, when the third resin reservoir chamber 41C was provided, the amount of eccentricity of the secondary resin coating layer was about 1 µm including a variation of a standard deviation of about 0.5 µm, as in each example described above. Meanwhile, when the third resin reservoir chamber 41C was not provided, the amount of eccentricity of the secondary resin coating layer was about 3 µm including a variation of a standard deviation of about 2 µm. The third resin reservoir chamber 41C has an effect of dispersing the non-uniform resin pressure before the secondary resin flows into the resin reservoir chamber. Accordingly, the uniformity of the pressure in the third resin supply passages 43C is further achieved by forming the third resin reservoir chamber 41C.

Example 15

Example 15 is an example used to examine the influence of the nipple hole diameter ϕdn and the intermediate die hole diameter ϕdm. Also in Example 9, in the same manner as in Example 7 described above, as shown in FIG. 24, a two-layer collective coating method was applied in which coating and curing were performed in one place using one resin coating device 20C and one UV curing device 22C.

In Example 15, the nipple hole diameter ϕdn and the intermediate die hole diameter ϕdm were changed independently in order to check the optimal ranges. In addition, the first coating die hole diameter ϕdp and the second coating die hole diameter ϕds depend on the characteristics (viscosity) of the resin to be used, bare optical fiber diameter, bare optical fiber temperature, and drawing speed. For this reason, the above diameters are limited by the target product diameter, and cannot be arbitrarily selected. Therefore, in Example 15, as fiber diameter/primary coating diameter/secondary coating diameter, ϕ125/200/250 µm was set as the finish target, and the target finish outer diameter was finished with the first coating die hole diameter ϕdp as 0.25 mm and the second coating die hole diameter ϕds as 0.35 mm.

Common coating parameters are shown in Tables 2 and 3. Other drawing conditions and evaluation items were the same as those in Example 7.

Specifically, first, the intermediate die hole diameter ϕdm was fixed to ϕ0.2 mm and the nipple hole diameter ϕdn was changed in the range of ϕ0.15 mm to ϕ0.6 mm, and the amount of eccentricity of the primary resin coating layer and the variation were examined. As a result, it was confirmed that the result was substantially the same as the result of Example 6 shown in FIG. 13.

That is, it became clear that, when the nipple hole diameter ϕdn was within a range of ϕ0.3 mm to ϕ0.5 mm, the amount of eccentricity including variation was less than 5 µm and thereby good coating conditions were obtained. On the other hand, when the nipple hole diameter ϕdn was less than ϕ0.3 mm, the bare optical fiber was in contact with the inner wall of the nipple hole 31B due to blurring of the bare optical fiber because of the high-speed fiber drawing, and a phenomenon that the bare optical fiber was broken during the fiber drawing was seen. Accordingly, it became clear that this range was not desirable in terms of manufacturability. On the other hand, when the nipple hole diameter ϕdn exceeded ϕ0.5 mm, the stability of the meniscus became worse since the upper surface of the meniscus became wide. As a result, the amount of eccentricity including variation became 5 µm or more, which was a bad result.

Then, the nipple hole diameter ϕdn was fixed to ϕ0.4 mm and the intermediate die hole diameter ϕdm was changed to ϕ0.15 mm to ϕ0.3 mm. As a result, it was confirmed that the result was substantially the same as the result of Example 6 shown in FIG. 14.

Therefore, it became clear that, when the intermediate die hole diameter ϕdm was within a range of ϕ0.17 mm to ϕ0.23 mm (that is, ϕ0.2 mm±ϕ0.03 mm), the amount of eccentricity including a variation was less than 5 µm and accordingly good coating conditions were obtained. On the other hand, when the intermediate die hole diameter ϕdm was less than ϕ0.17 mm and when the intermediate die hole diameter ϕdm exceeded ϕ0.23 mm, the amount of eccentricity including variation became 5 µm or more, which was a bad result.

According to Example 15, also in the second embodiment for the two-layer collective coating method, similar to the case of the first embodiment for the independent coating method, it was confirmed that the optimal range of the nipple hole diameter ϕdn was within a range of ϕ0.3 mm to ϕ0.5 mm and the optimal range of the intermediate die hole diameter ϕdm was within a range of 0.17 mm to 0.23 mm (that is, ϕ0.2 mm±ϕ0.03 mm).

While the preferred embodiments and examples of the present invention have been described, it is needless to say that the present invention is not limited to these embodiments and examples. That is, additions, omissions, and replacement of the configuration and other modifications could be made without departing from the spirit and scope of the present invention.

What is claimed is:

1. A bare optical fiber coating device, comprising:
   a nipple having a nipple hole through which a bare optical fiber is inserted vertically from above;
   an intermediate die that has an intermediate die hole through which the bare optical fiber after passing through the nipple hole is inserted and that is disposed vertically below the nipple;
   a first coating die that has a first coating die hole through which the bare optical fiber after passing through the intermediate die hole is inserted and that is provided vertically below the intermediate die;
   a first resin circulation chamber that comprises the nipple and the intermediate die, the first resin circulation chamber being disposed between the nipple hole and the intermediate die hole in an annular shape surrounding the bare optical fiber after passing through the nipple hole, and being configured to circulate liquid resin;
   a second resin circulation chamber that comprises the intermediate die and the first coating die, the second resin circulation chamber being disposed between the intermediate die hole and the first coating die hole in an annular shape surrounding the bare optical fiber passing through the intermediate die hole, and being configured to circulate liquid resin;
   a first resin supply passage configured to supply liquid resin to the first resin circulation chamber;
   a second resin supply passage configured to supply liquid resin to the second resin circulation chamber;
   at least one resin supply source which supplies a resin to one or both of the first resin supply passage and the second resin supply passage,
   a first resin reservoir chamber provided on an inlet side of the first resin supply passage and being divided from the first resin circulation chamber by a first inner intermediate wall; and
   a second resin reservoir chamber provided on an inlet side of the second resin supply passage and being divided from the second resin circulation chamber by a second inner intermediate wall;
   wherein a first resin circulation chamber side of the first inner intermediate wall is parallel to a traveling direction of the bare optical fiber and a second resin circulation chamber side of the second inner intermediate wall is parallel to the traveling direction of the bare optical fiber, and
   the first and second resin supply passages are provided separately and independently from each other, and a first resin path from the first resin supply passage to the intermediate die hole through the first resin circulation chamber and a second resin path from the second resin supply passage to the first coating die hole through the second resin circulation chamber are independent of each other.

2. The bare optical fiber coating device according to claim 1, further comprising:
   a second coating die that has a second coating die hole through which the bare optical fiber after passing through the first coating die hole is inserted and that is provided vertically below the first coating die;
   a third resin circulation chamber that comprises the first coating die and the second coating die, is formed between the first coating die hole and the second coating die hole in an annular shape surrounding the bare optical fiber after passing through the first coating die hole, and is configured to circulate the liquid resin;
   a third resin supply passage configured to supply the liquid resin to the third resin circulation chamber,
   a third resin reservoir chamber provided on an inlet side of the third resin supply passage and divided from the third resin circulation chamber by a third inner intermediate wall;
   wherein a third resin circulation chamber side of the third inner intermediate wall is parallel to the traveling direction of the bare optical fiber and,
   the first resin supply passage, the second resin supply passage, and the third resin supply passage are provided separately and independently from each other, and the first resin path, the second resin path, and a third resin path from the third resin supply passage to the second coating die hole through the third resin circulation chamber are formed independently of each other.

3. The bare optical fiber coating device according to claim 1, wherein
the first resin reservoir chamber has an annular shape with a center on a traveling position of the bare optical fiber,
the second resin reservoir chamber has an annular shape with the center on the traveling position of the bare optical fiber,
wherein a resin inlet through which liquid resin is introduced from an outside is disposed in each of the first and second resin reservoir chambers, and the first and second resin supply passages are continuous in an annular shape with a center on the traveling position of the bare optical fiber.

4. The bare optical fiber coating device according to claim 2, wherein
the first resin reservoir chamber has an annular shape with a center on a traveling position of the bare optical fiber;
the second resin reservoir chamber has an annular shape with the center on the traveling position of the bare optical fiber; and
a third resin reservoir chamber has an annular shape with the center on the traveling position of the bare optical fiber,
wherein a resin inlet through which the liquid resin is introduced from an outside is formed in each of the first resin reservoir chamber, the second resin reservoir chamber, and the third resin reservoir chamber, and the first resin supply passage, the second resin supply passage, and the third resin supply passage are continuous in an annular shape with a center on the traveling position of the bare optical fiber.

5. The bare optical fiber coating device according to claim 1,
wherein a length of the second resin circulation chamber along the traveling direction of the bare optical fiber is greater than a length of the first resin circulation chamber along the traveling direction of the bare optical fiber.

6. The bare optical fiber coating device according to claim 5,
wherein the length of the first resin circulation chamber along the traveling direction of the bare optical fiber is 1.5 mm to 10 mm, and the length of the second resin circulation chamber along the traveling direction of the bare optical fiber is 20 mm to 40 mm.

7. The bare optical fiber coating device according to claim 2,
wherein a length of the first resin circulation chamber along the traveling direction of the bare optical fiber is 1.5 mm to 10 mm, a length of the second resin circulation chamber along the traveling direction of the bare optical fiber is 20 mm to 40 mm, and a length of the third resin circulation chamber along the traveling direction of the bare optical fiber is 1.0 mm to 2.0 mm.

8. The bare optical fiber coating device according to claim 1,
wherein, in a plane perpendicular to the traveling direction of the bare optical fiber, an inner diameter of the first resin circulation chamber is $\Phi 5$ mm$\pm\Phi 2$ mm, and an inner diameter of the second resin circulation chamber is $\Phi 3$ mm$\pm\Phi 1$ mm.

9. The bare optical fiber coating device according to claim 2,
wherein, in a plane perpendicular to the traveling direction of the bare optical fiber, an inner diameter of the first resin circulation chamber is $\Phi 5$ mm$\pm\Phi 2$ mm, an inner diameter of the second resin circulation chamber is $\Phi 3$ mm$\pm\Phi 1$ mm, and an inner diameter of the third resin circulation chamber is $\Phi 15$ mm$\pm\Phi 5$ mm.

10. The bare optical fiber coating device according to claim 1,
wherein, a hole diameter of an outlet in the nipple hole is $\Phi dn$, a hole diameter of an outlet in the intermediate die hole is $\Phi dm$, and a hole diameter of an outlet in the first coating die hole is $\Phi dc$, the hole diameters satisfy conditions of $\Phi dn > \Phi dc > \Phi dm$.

11. The bare optical fiber coating device according to claim 2,
wherein, a hole diameter of an outlet in the nipple hole is $\Phi dn$, a hole diameter of an outlet in the intermediate die hole is $\Phi dm$, a hole diameter of an outlet in the first coating die hole is $\Phi dp$, and a hole diameter of an outlet in the second coating die hole is $\Phi ds$, the hole diameters satisfy conditions of $\Phi dn > \Phi dp > \Phi dm$ and $\Phi ds > \Phi dp > \Phi dm$.

12. The bare optical fiber coating device according to claim 1,
wherein, in each of the first and second resin supply passages, an inner size in a direction along the traveling direction of the bare optical fiber is 0.5 mm$\pm$0.2 mm.

13. The bare optical fiber coating device according to claim 2,
wherein, in each of the first resin supply passage, the second resin supply passage, and the third resin supply passage, an inner size in a direction along the traveling direction of the bare optical fiber is 0.5 mm$\pm$0.2 mm.

14. The bare optical fiber coating device according to claim 1,
wherein a resin outlet to each of the resin circulation chambers in each of the resin supply passages is located above each of the resin circulation chambers.

15. The bare optical fiber coating device according to claim 1,
wherein pressure of liquid resin supplied to the first resin circulation chamber is equal to or higher than pressure of liquid resin supplied to the second resin circulation chamber.

16. The bare optical fiber coating device according to claim 15,
wherein, the pressure of liquid resin supplied to the first resin circulation chamber is P1 and the pressure of liquid resin supplied to the second resin circulation chamber is P2, a resin pressure difference [P1-P2] is within a range of 0.01 MPa$\pm$0.01 MPa.

17. The bare optical fiber coating device according to claim 1,
wherein a hole diameter of an outlet in the intermediate die hole is within a range of 0.17 mm to 0.23 mm.

18. The bare optical fiber coating device according to claim 1,
wherein a hole diameter of an outlet in the intermediate die hole is within a range of 0.25 mm to 0.27 mm.

19. The bare optical fiber coating device according to claim 2,
wherein a hole diameter of an outlet in the intermediate die hole is within a range of 0.17 mm to 0.23 mm.

20. A bare optical fiber coating method for performing resin coating on a bare optical fiber, the method comprising:
providing the bare optical fiber coating device according to claim 1,
causing a circulation flow of liquid resin in each of the first and second resin circulation chambers when performing resin coating on the bare optical fiber by:

making the bare optical fiber pass through the nipple hole, the first resin circulation chamber, the intermediate die hole, the second resin circulation chamber, and the first coating die hole in this order from a side above the nipple;

supplying liquid resin to the first resin circulation chamber from the first resin supply passage so that liquid resin in the first resin circulation chamber flows into the intermediate die hole; and supplying liquid resin to the second resin circulation chamber from the second resin supply passage so that liquid resin in the second resin circulation chamber flows into the first coating die hole.

21. The bare optical fiber coating method according to claim 20, further comprising causing only a single circulation flow in each of the first and second resin circulation chambers.

22. A bare optical fiber coating method for performing resin coating on a bare optical fiber, the method comprising:

providing the bare optical fiber coating device according to claim 2, causing a circulation flow of liquid resin in each of the first resin circulation chamber, the second resin circulation chamber, and the third resin circulation chamber when performing resin coating on the bare optical fiber by:

making the bare optical fiber pass through the nipple hole, the first resin circulation chamber, the intermediate die hole, the second resin circulation chamber, the first coating die hole, the third resin circulation chamber, and the second coating die hole in this order from a side above the nipple;

supplying liquid resin to the first resin circulation chamber from the first resin supply passage so that the liquid resin in the first resin circulation chamber flows into the intermediate die hole;

supplying liquid resin to the second resin circulation chamber from the second resin supply passage so that liquid resin in the second resin circulation chamber flows into the first coating die hole; and supplying liquid resin to the third resin circulation chamber from the third resin supply passage so that liquid resin in the third resin circulation chamber flows into the second coating die hole.

23. The bare optical fiber coating method according to claim 22, further comprising causing only a single circulation flow in each of the first resin circulation chamber, the second resin circulation chamber, and the third resin circulation chambers.

24. The bare optical fiber coating device according to claim 2, wherein a resin outlet to each of the resin circulation chambers in each of the resin supply passages is located above each of the resin circulation chambers.

25. The bare optical fiber coating device according to claim 2, wherein pressure of liquid resin supplied to the first resin circulation chamber is equal to or higher than pressure of liquid resin supplied to the second resin circulation chamber.

26. The bare optical fiber coating device according to claim 25, wherein, the pressure of liquid resin supplied to the first resin circulation chamber is P1 and the pressure of liquid resin supplied to the second resin circulation chamber is P2, a resin pressure difference [P1-P2] is within a range of 0.01 MPa±0.01 MPa.

27. The bare optical fiber coating method according to claim 22, wherein liquid resin supplied to the third resin circulation chamber is different from liquid resin supplied to the first and second resin circulation chambers.

28. The bare optical fiber coating method according to claim 22, wherein liquid resin supplied to the third resin circulation chamber is the same liquid resin supplied to the first and second resin circulation chambers.

* * * * *